US011475101B2

(12) United States Patent
Catthoor et al.

(10) Patent No.: US 11,475,101 B2
(45) Date of Patent: Oct. 18, 2022

(54) CONVOLUTION ENGINE FOR NEURAL NETWORKS

(71) Applicant: IMEC VZW, Leuven (BE)

(72) Inventors: Francky Catthoor, Temse (BE); Praveen Raghavan, Los Gatos, CA (US); Dimitrios Rodopoulos, Leuven (BE); Mohit Dandekar, Heverlee (BE)

(73) Assignee: Imec VZW, Leuven (BE)

( * ) Notice: Subject to any disclaimer, the term of this patent is extended or adjusted under 35 U.S.C. 154(b) by 491 days.

(21) Appl. No.: 16/685,892

(22) Filed: Nov. 15, 2019

(65) Prior Publication Data

US 2020/0159809 A1 May 21, 2020

(30) Foreign Application Priority Data

Nov. 15, 2018 (EP) .................................... 18206621

(51) Int. Cl.
*G06F 17/15* (2006.01)
*G06N 3/04* (2006.01)
*G06N 3/08* (2006.01)

(52) U.S. Cl.
CPC ............. *G06F 17/153* (2013.01); *G06N 3/04* (2013.01); *G06N 3/08* (2013.01)

(58) Field of Classification Search
CPC ....... G06F 15/825; G06F 17/153; G06N 3/04; G06N 3/0454; G06N 3/063; G06N 3/08
See application file for complete search history.

(56) References Cited

U.S. PATENT DOCUMENTS

2011/0119215 A1* 5/2011 Elmegreen ........... G06N 3/0635
706/37
2015/0117760 A1* 4/2015 Wang ................... G06V 30/194
382/157

(Continued)

FOREIGN PATENT DOCUMENTS

EP    1742154 A2    1/2007
EP    1742154 A3    7/2007

OTHER PUBLICATIONS

Yu Hsin Chen ,: "Eyeriss: A Spatial Architecture for Energy Efficient Data flow for Convolutional Neural Networks," Jun. 18, 2016, 2016 ACM/IEEE 43rd Annual International Symposium on Computer Architecture, ACM SIGARCH Computer Architecture News, vol. 44,Issue 3,Jun. 2016, pp. 367-376.*

(Continued)

*Primary Examiner* — Omar S Ismail
(74) *Attorney, Agent, or Firm* — McDonnell Boehnen Hulbert & Berghoff LLP

(57) ABSTRACT

A method and hardware system for mapping an input map of a convolutional neural network layer to an output map are disclosed. An array of processing elements are interconnected to support unidirectional dataflows through the array along at least three different spatial directions. Each processing element is adapted to combine values of dataflows along different spatial directions into a new value for at least one of the supported dataflows. For each data entry in the output map, a plurality of products from pairs of weights of a selected convolution kernel and selected data entries in the input map is provided and arranged into a plurality of associated partial sums. Products associated with a same partial sum are accumulated on the array and accumulated on the array into at least one data entry in the output map.

20 Claims, 24 Drawing Sheets

(56) References Cited

U.S. PATENT DOCUMENTS

| | | | | |
|---|---|---|---|---|
| 2017/0083762 | A1* | 3/2017 | Segalovitz | G06T 5/009 |
| 2018/0173676 | A1 | 6/2018 | Tsai et al. | |
| 2018/0268220 | A1* | 9/2018 | Lee | G06V 10/26 |
| 2019/0147335 | A1* | 5/2019 | Wang | G05D 1/0257 |
| | | | | 706/20 |
| 2019/0147341 | A1* | 5/2019 | Rabinovich | G06N 3/08 |
| | | | | 382/156 |
| 2019/0192880 | A1* | 6/2019 | Hibbard | A61N 5/1039 |
| 2019/0303743 | A1* | 10/2019 | Venkataramani | G06F 9/30145 |
| 2019/0306385 | A1* | 10/2019 | Sharma | B42D 25/324 |

OTHER PUBLICATIONS

Fengbin Tu "Deep Convolutional Neural Network Architecture With Reconfigurable Computation Patterns," Apr. 12, 2017, IEEE Transactions on Very Large Scale Integration (VLSI) Systems (vol. 25, Issue: 8, Aug. 2017),pp. 2220-2228.*

Zhen Zuo, "Learning Contextual Dependence With Convolutional Hierarchical Recurrent Neural Networks," Mar. 29, 2016, IEEE Transactions on Image Processing, vol. 25, No. 7, Jul. 2016,pp. 2983-2990.*

F. L. Kreyssig,"Improved TDNNS Using Deep Kernels and Frequency Dependent GRID-RNNS,"Sep. 13, 2018,2018 IEEE International Conference on Acoustics, Speech and Signal Processing (ICASSP),pp. 4864-4867.*

Jae-Jin Lee,"Implementation of the Super-Systolic Array for Convolution," Jan. 21, 2003, ASP-DAC '03: Proceedings of the 2003 Asia and South Pacific Design Automation ConferenceJan. 2003,pp. 491-493.*

Zhiling Luo,"Deep Learning of Graphs with Ngram Convolutional Neural Networks," Jun. 28, 2017,IEEE Transactions on Knowledge and Data Engineering, vol. 29, No. 10, Oct. 2017,pp. 2125-2137.*

Priyanka Raina,"An Energy-Scalable Accelerator for Blind Image Deblurring," Apr. 4, 2017,IEEE Journal of Solid-State Circuits, vol. 52, No. 7, Jul. 2017 , pp. 1849-1859.*

European Search Report, European Patent Application No. 18/206,621, dated Jun. 6, 2019, 5 pages.

Chen, Yu-Hsin et al., "Eyeriss: An Energy-Efficient Reconfigurable Accelerator for Deep Convolutional Neural Networks", in ISSCC 2016, IEEE International Solid-State Circuits Conference, Jan. 31-Feb. 4, 2016, 4 pages.

Lee, Jae-Jin et al., "Implementation of the Super-Systolic Array for Convolution", Proceedings of the 2003 Asia and South Pacific Design Automation Conference. ACM, 2003, pp. 491-494.

Chen, Yu-Hsin et al., "Eyeriss: A Spatial Architecture for Energy-Efficient Dataflow for Convolutional Neural Networks", MIT and NVIDIA, Powerpoint Presentation, 53 slides.

Chen, Yu-Hsin et al., "Eyeriss: An Energy-Efficient Reconfigurable Accelerator for Deep Convolutional Neural Networks", IEEE Journal of Solid-State Circuits, 2016, 12 pages.

Tu, Fengbin et al., "Deep Convolutional Neural Network Architecture With Reconfigurable Computation Patterns", IEEE Transactions on Very Large Scale Integration (VLSI) Systems, vol. 25, No. 8, Aug. 2017, pp. 2220-2233.

Lee, Ching-En et al., "Stitch-X: An Accelerator Architecture for Exploiting Unstructured Sparsity in Deep Neural Networks", SysML Conference. 2018, pp. 1-3.

Raina, Priyanka et al., An Energy-Scalable Accelerator for Blind Image Deblurring, IEEE Journal of Solid-State Circuits, vol. 52, No. 7, Jul. 2017, pp. 1849-1862.

Luo, Zhiling et al., "Deep Learning of Graphs With Ngram Convolutional Neural Networks", IEEE Transactions on Knowledge and Data Engineering, vol. 29, No. 10, 2017, 14 pages.

* cited by examiner

CONVOLUTION ENGINE FOR NEURAL NETWORKS

CROSS-REFERENCE TO RELATED APPLICATIONS

The present application is a non-provisional patent application claiming priority to EPO Patent Application No. EP 18206621.7, filed Nov. 15, 2018, the contents of which are hereby incorporated by reference.

FIELD OF THE DISCLOSURE

The present example relates to the field of purpose-specific hardware acceleration architectures, in particular for neural network applications which involve computationally intensive convolutional network layers.

BACKGROUND

With the increasing success of machine learning applications based on neural network architectures, in particular convolutional deep neural networks and deep recurrent neural networks, there is a growing development of dedicated hardware architectures which can cope, in an efficient manner, with the tremendous amount of data and computations that is involved in a simple interference pass in these networks. Not only should the latency be passably low and the achievable throughput sufficiently high, but also the energy cost should be minimal. This is particularly true if a large-scale use of convolutional deep neural networks or deep recurrent neural networks, for example in data centers or in portable devices with limited battery power, is envisioned. A current limitation in terms of energy efficiency, challenging a large-scale deployment of convolutional deep neural network technology, is given by the fact that large quantities of input data and weights are frequently and repeatedly accessed from an external memory, for example DRAM, or, more recently, from smaller, distributed on-chip buffers, e.g. SRAM. The frequent request for data and the writeback of computation outputs are characterized by a large energy overhead and latency in the case of external memory access, but even for the smaller on-chip buffers, repeated buffer access is still the dominating contribution to overall energy consumption. Although memory is made available at continuously increasing densities, current on-chip SRAM buffer technology in machine learning oriented hardware solutions is still using total buffer sizes of the order of hundreds of kilobytes, taking up large areas of the final chip.

Document Chen et al. Eyeriss: An Energy-Efficient Reconfigurable Accelerator for Deep Convolutional Neural Networks. In: IEEE International Conference on Solid-State Circuits (ISSCC), February 2016, pp. 262-264, discloses a hardware accelerator, Eyeriss, for convolutional deep neural networks. Eyeriss reduces off-chip data movement and DRAM access by proposing a row-stationary dataflow for an energy-efficient mapping the computations of a convolutional network layer onto an array of processing elements. The disclosed mapping algorithm reuses data locally by using the low-cost memory hierarchy level provided by the SRAM and registers of each processing element on the one hand, and the inter-processing element communication via vertical interconnects of the local network on the other hand. In Eyeriss, however, primitives are assigned to each processing element according to the row-stationary dataflow. Hence, each processing element still requires relatively large local storage, including I/O FIFO buffers, and only a small number of them, e.g. 168, is implemented in a 65 nm CMOS process. In consequence, multiple passes are required to carry out a full multi-dimensional convolution, which requires a large global data buffer with frequent accesses and repeated retrieval of the same filter coefficients therefrom.

Therefore, there is a need for energy-efficient, high-throughput hardware acceleration systems for neural network architectures involving large numbers of convolution operations, particularly for convolutional and deep neural network architectures.

SUMMARY

It is an object of embodiments of the present example to provide an energy-efficient method and hardware system for mapping of an input map to an output map in a convolutional neural network.

The above objective is accomplished by a method and device according to embodiments of the present example.

In a first aspect of the present example, a method for mapping an input map of a convolutional neural network layer to an output map is disclosed, which uses a set of convolution kernels. In a first step, the method is providing an array of locally interconnected processing elements which are arranged on a regular two-dimensional grid. The grid is defining at least three different spatial directions of the array along which unidirectional dataflows on the array are supported. Each processing element in the array is adapted for storing, during at least one computation cycle, a value carried by each unidirectional dataflow traversing or originating at that processing element, and is further adapted for combining values carried by unidirectional dataflows traversing that processing element in different spatial directions into a new value carried by at least one of the supported unidirectional dataflows. In a next step, a plurality of products from pairs of weights of a selected convolution kernel and data entries in the input map addressed by the weights are provided for each data entry in the output map. A data entry position in the output map is determining the selected convolution kernel and its position relative to the input map. Next, the plurality of products is arranged, for each data entry in the output map, into a plurality of partial sums to be computed, wherein each partial sum is including at least the products associated with a first dimension of the selected convolution kernel and different partial sums are associated with at least a second dimension of the selected convolution kernel. Thereafter, the data entries in the output map are computed by performing at least once the steps of: determining at least one parallelogram set of processing elements, corresponding to at least one data entry in the output map; storing each product of the plurality of products associated with at least one data entry in the output map in a processing element of the at least one corresponding parallelogram set in such a way that stored products associated with a same partial sum are distributed along a first spatial direction of the array and different partial sums are distributed along a second spatial direction of the array; accumulating, in a first accumulation phase, products associated with a same partial sum on the array; and accumulating, in a second accumulation phase, partial sums on the array into at least one data entry in the output map. Each parallelogram set comprises a first side pair parallel to a first spatial direction of the array and a second side pair parallel to second spatial direction of the array. One side of the second side pair defines a parallelogram base. During the first accumulation step first unidirectional dataflows are started by moving the values stored in the processing elements associated with each parallelogram base to the next connected processing element along a pre-determined first flow direction. Furthermore, second unidirectional dataflows are also started by moving the values stored in the remaining processing elements of each parallelogram set to the next connected processing element along a pre-determined second flow direction. An incomplete partial sum is combined, during the first accumulation phase also, with a product, wherein the incomplete partial sum corresponds to a value of a first unidirectional dataflow passing through a processing element of the array and the product corresponds to a value of a second unidirectional dataflow also passing through that same processing element. The combination of the incomplete partial sum with the product is generating a new value for the first unidirectional dataflow if the product belongs to and further completes the partial sum. Partial sums are completed if the first and second unidirectional dataflows have collapsed each parallelogram set to its base. During the first accumulation phase, the first and second flow direction are selected from the third spatial direction and one of the first or second spatial direction. During the second accumulation phase, third unidirectional dataflows are started by moving the values stored in the processing elements associated with one of the parallelogram base vertices of each collapsed parallelogram to the next connected processing element along a pre-determined third flow direction. Furthermore, fourth unidirectional dataflows are started by moving the values stored in the remaining processing elements of each collapsed parallelogram to the next connected processing element along a pre-determined fourth flow direction. During the second accumulation phase, an incomplete data entry in the output map is also combined with a partial sum, wherein the incomplete data entry in the output map corresponds to a value of a third unidirectional dataflow passing through a processing element of the array and the partial sum corresponds to a value of a fourth unidirectional dataflow also passing through that same processing element. The incomplete data entry in the output map when combined with the partial sum, is generating a new value for the third unidirectional dataflow if the partial sum belongs to and further completes the data entry in the output map. Each data entry in the output map is completed if the third and fourth unidirectional dataflows have reduced each collapsed parallelogram to one of its vertices., During the second accumulation phase, the third and fourth flow direction are selected from the third spatial direction and the other one of the first or second spatial direction, not selected for the first and second flow direction.

Embodiments of the disclosure allow partial results of a convolutional neural network layer mapping to be accumulated on an array of processing elements in an energy-efficient manner, avoiding a frequent access of an external memory device or of internal distributed buffers for reading or writing of intermediate mapping results.

Embodiments of the disclosure support unidirectional dataflows on the array, which avoids the control overhead associated with controlling the access to and a direction for dataflows on bi-directional interconnections.

Embodiments of the disclosure can allow data entries in the input map to be streamed and consumed continuously for computations of convolutions, avoiding the buffering thereof in dedicated storage devices.

Embodiments of the disclosure can allow different convolution kernels to be selected and computed in parallel on the array of processing elements., which provides an enhanced throughput.

Embodiments of the disclosure can allow data entries in the input map and/or weights of selected convolution kernels to be reused across computations of convolutions, whereby the energy-efficiency is further improved.

Embodiments of the disclosure can allow at least some steps to be implemented as stages in a pipeline process, thereby increasing the throughput associated with the array-mapped computation and also increasing an average usage efficiency of the processing elements (actively used, not idle). Computational pipelining, e.g. via pipelines, also ensure synchronization of the processing elements of the array with respect to the different method steps, e.g. computational pipelining (e.g. computation pipelines) may contribute to the synchronization of the array.

According to some embodiments of the disclosure, a plurality of products of more than one data entry in the output map may be stored in the processing elements of the corresponding parallelogram and each parallelogram set of processing elements may be partially empty; different parallelogram sets may be interleaved into at least one larger, non-empty parallelogram set in a further step for computing a pre-determined number of contiguous data entries in the output map associated with a same selected convolution kernel. This can allow a plurality of convolutions to be performed in parallel for a same selected convolution kernel, but in respect of different positions in the input map, which further increases a data throughput.

According to some example embodiments, a plurality of different parallelogram sets may be interleaved into a plurality of larger, non-empty parallelogram sets, wherein each of the larger, non-empty parallelogram sets is associated with a different selected convolution kernel. This can allow a plurality of convolutions to be performed in parallel for a plurality of selected convolution kernels.

According to some example embodiments, a plurality of products may be provided in such a way that each product is generated by the processing element storing the same product. This can allow the higher computation cost relative to multiplications to be distributed over the processing elements of at least one parallelogram set, which may run in parallel.

According to some example embodiments, the processing elements may be interconnected according to a two-dimensional torus topology to support circular unidirectional dataflows on the array. This can be particularly useful for finite-sized arrays for which the accumulation phases are completed only after a number of computation cycles which would lead to at least one unidirectional dataflow encountering a boundary of the finite array. Circular unidirectional dataflows on the array avoid the storing of intermediate computational results and their writeback to the array in a subsequent step, which is further saving energy and computation time.

In a second aspect, example embodiments relate to a hardware system for performing mappings in convolutional neural network layers. The hardware system comprises a synchronized two-dimensional array, which may be planar, of locally interconnected processing elements regularly organized on a grid. The grid is defining three different flow directions of unidirectional dataflows between connected neighboring processing elements on the array. Each processing element comprises a first logical level and a second logical level. The first logical level includes at least three inputs for receiving partial results of incoming unidirectional dataflows, an addition unit adapted for accumulating received partial results of two different unidirectional dataflows, thereby providing updated partial results, at least three synchronized output registers for temporarily storing partial results during a computation cycle, stored partial results of three output registers corresponding to values of outgoing unidirectional dataflows, and output selection means for selecting, for each output register, a partial result to be stored from one of a received partial result, an updated partial result or a generated partial result. The second logical level comprises a storage element for selectively storing a received weight and selectively storing a data entry in the input map and a multiplication unit for generating a partial result based on the stored weight and the stored data entry in the input map, wherein the storage element is adapted to propagate a stored weight and/or a data entry in the input map to the storage element of a neighboring connected processing element. The hardware system further includes a global control logic for generating synchronization signals and control signals for each processing element, as well as global input means for receiving, at most once per neural network layer, data entries in the input map and weights of selected convolution kernels and for applying them to a subset of processing elements at a boundary of the array. The applied weights are stored in the storage elements of the processing elements for reuse for as long as new data entries of the input map are applied and the received data entries in the input map are reused for a plurality of data entries in the output depending thereon. The hardware system also comprises global output means for reading out, from a subset of processing elements at a boundary of the array, fully accumulated results as data entries in the output map of a convolutional neural network layer.

According to some example embodiments relating to the second aspect, the data entries in the output map may be computed simultaneously in a vectorized manner and multiple, accessed rows of the input map are re-used for improved energy-efficiency, avoiding repeated reading of these rows. Vectorized data entries in the output map may be computed column-wise under the sliding action of a selected convolution kernel, whereby already read columns of the input map, made available from preceding vectorized data outputs, are re-used without accessing them again.

According to some example embodiments relating to the second aspect, the array of processing elements may be characterized by a 2D-torus interconnection topology.

According to some example embodiments relating to the second aspect, the processing elements of the array may be folded and interleaved along on or two spatial directions of the array.

According to some example embodiments relating to the second aspect, each processing element may be characterized by a vertical 3D structure extending in a direction perpendicular to the array plane. The second logical level of each processing element may be comprised by a first portion of the 3D structure and the first logical level of each processing element may be comprised by a second portion of the 3D structure, the second portion being stacked on top of the first portion. Vertical 3D structures may be implemented as TFT layer stacks.

According to some example embodiments relating to the second aspect, the output selection means may comprise a reconfigurable routing unit. The reconfigurable routing unit may be a segmented bus node. The hardware system may further comprise a reconfigurable external output selection means associated with each processing element of the array for selectively connecting an output register of one processing element to an input of a neighboring processing element, thereby enabling a supported unidirectional dataflow on the array. The reconfigurable external output selection means may comprises a switching matrix or a network-on-chip.

According to some example embodiments relating to the second aspect, each processing element may comprise more than three output registers and partial results selected by the output selection means may comprise each of the three received partial results at the inputs, the generated partial result if available, and the updated partial result if available.

According to some example embodiments relating to the second aspect, the global input means and the global output means may comprise vector registers. Global input means and global output means of the hardware system may be arranged at a same boundary of the array or may be arranged at opposite boundaries of the array.

According to some example embodiments relating to the second aspect, a weight and/or a data entry in the input map may be stored as charges on a transistor gate inside the storage element of each processing element. The storage element of each processing element may further comprises factor selection means for selecting a received weight and/or a received data entry in the input map for storage in that storage element. Weights and data entries in the input map may be at least eight bits long for example embodiments computing convolutions at good precision, or may be one bit long for example embodiments computing binary convolutions.

According to some example embodiments relating to the second aspect, the hardware system may further comprise a control plane configured to support wave-pipelining for moving a weight and/or a data entry in the input map to the second logical level of an addressed processing element.

According to some example embodiments relating to the second aspect, an addition unit may comprise one adder and a data selector for selecting two from the three received unidirectional dataflow values at the inputs., or may comprise two adders and a data selector for selecting one from the two updated partial results.

According to some example embodiments relating to the second aspect, the selection means of each processing element may comprise at least three multiplexers.

Aspects of the disclosure are set out in the accompanying independent and dependent claims. Features from the dependent claims may be combined with features of the independent claims and with features of other dependent claims as appropriate and not merely as explicitly set out in the claims.

The above and other aspects of the disclosure will be apparent from and elucidated with reference to the embodiment(s) described hereinafter.

BRIEF DESCRIPTION OF THE FIGURES

The above, as well as additional, features will be better understood through the following illustrative and non-limiting detailed description of example embodiments, with reference to the appended drawings.

Figure 1:
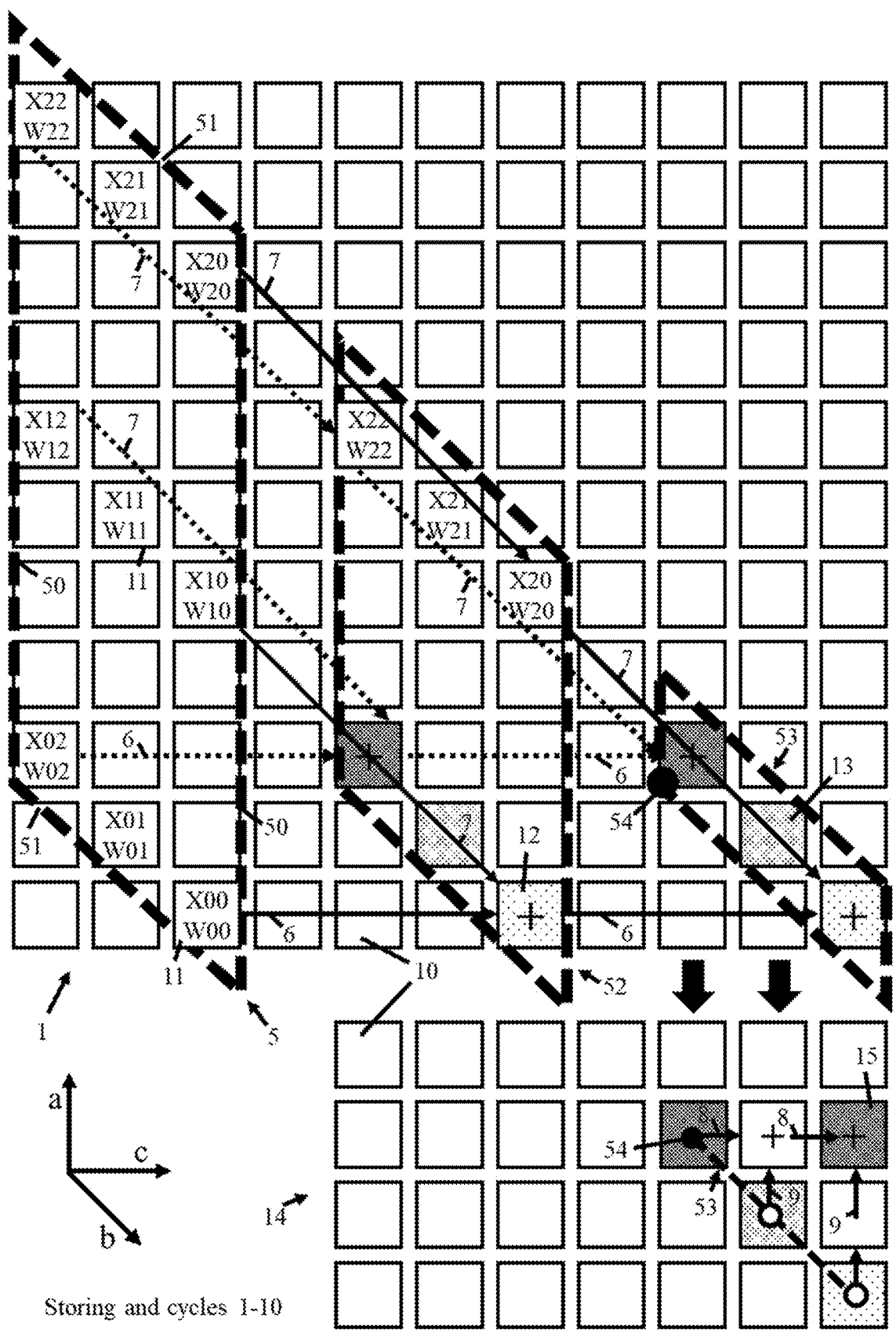
FIG. 1 illustrates the distribution of generated temporarily stored products (initial partial results), unidirectional dataflows and accumulation phases on a square array of processing elements for mapping data entries of an input map to a data entry of an output map in a convolutional layer of a neural network, according to an example embodiment. It also shows a typical parallelogram present when data is moved in the array during the accumulation phases, according to an example embodiment.

The drawings are only schematic and are non-limiting. In the drawings, the size of some of the elements may be exaggerated and not drawn on scale for illustrative purposes. The dimensions and the relative dimensions do not necessarily correspond to practical implementations of the disclosed embodiments.

Any reference signs in the claims shall not be construed as limiting the scope.

In the different drawings, the same reference signs refer to the same or analogous elements.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Example embodiments will be described with respect to particular embodiments and with reference to certain drawings but the disclosed embodiments are not limited thereto.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the example embodiments described herein are capable of operation in other sequences than described or illustrated herein.

Moreover, directional terminology such as top, bottom, under, over and the like in the description and the claims is used for descriptive purposes with reference to the orientation of the drawings being described, and not necessarily for describing relative positions. Because components of embodiments of the present example can be positioned in a number of different orientations, the directional terminology is used for purposes of illustration only, and is in no way intended to be limiting, unless otherwise indicated. It is, hence, to be understood that the terms so used are interchangeable under appropriate circumstances and that the example embodiments described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present example, the only relevant components of the device are A and B.

Reference throughout this specification to "one embodiment" or "an embodiment" means that a particular feature, structure or characteristic described in connection with the embodiment is included in at least one embodiment of the present example. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary example embodiments, various features are sometimes grouped together in a single embodiment, figure, or description thereof for the purpose of streamlining the disclosure and aiding in the understanding of one or more of the various described aspects. This method of disclosure, however, is not to be interpreted as reflecting an intention that the claimed embodiments require more features than are expressly recited in each claim. Rather, as the following claims reflect, disclosed aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Definitions

Convolutional deep neural networks are neural networks comprising many stacked layers, at least one of which convolutional, meaning that an input-to-output map of that layer involves the mathematical convolution operation. Usually a convolutional deep neural network comprises more than just one convolutional layer, e.g. may have five or more convolutional layers.

Figure 14:
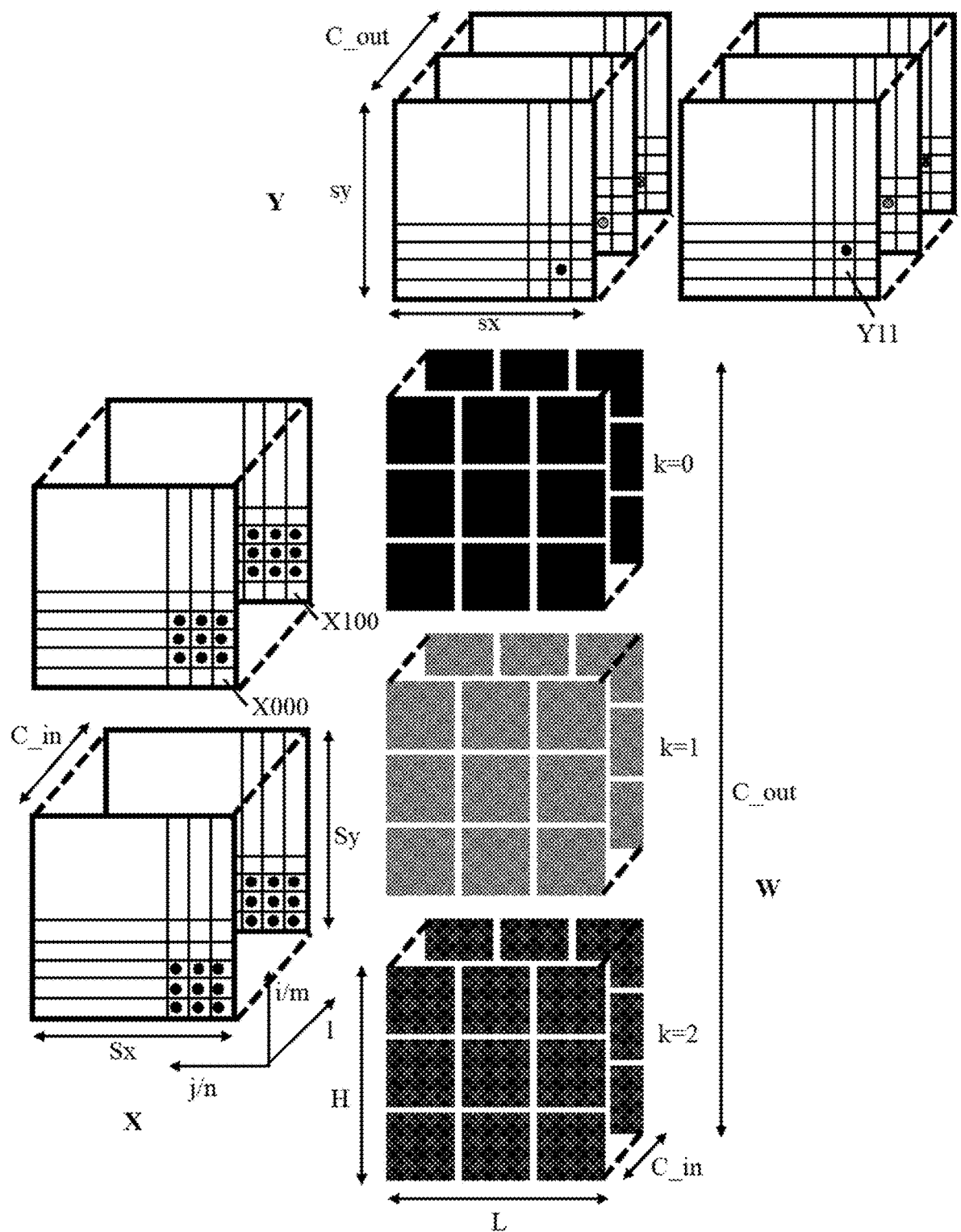
FIG. 14 illustrates a 3D+1 convolution operation based on an input map and a set of selectable convolution kernels yielding data entries in an output map, according to an example embodiment.

Multidimensional or higher-dimensional convolutions, in the context of the present example, are a combination or group of conventional 2D convolutions, wherein conventional 2D convolutions are performed for a two-dimensional data record, e.g. an image, and a two-dimensional filter or weight kernel. Typically, the higher dimensions are two in number, one extra dimension for the number of input map channels (e.g. image RGB color channels, alpha channel, or more abstract feature channels occurring for deeper layers, etc.), and another extra dimension for the number of output map channels, representing a set of different 2D filters (e.g. edge filters of different orientation or scaling, filters for different shapes, e.g. letters of the alphabet, etc.). As a result, both input maps and output maps of convolutional layers of a neural network may be three-dimensional (a 1D stack of 2D images), which defines a 4D (tensor) objects for the weights. However, this 4D weight object stacks conventional 2D filter or weight kernels along the dimensions of input map channels and output map channels. Therefore, the corresponding conventional 2D convolutions are grouped along these extra dimensions. As the convolution operation of a 4D weight object with a 3D input map yields a 1D output vector for each point in the 3D input map, the resulting 4D output space is typically reduced to a 3D output space by summing components over the number of input map channels. FIG. 14 also underlines these facts.

A neighborhood or local neighborhood to a processing element in a grid or array of processing elements, in the context of the present example, is defined by its interconnection topology, meaning that immediate neighbors to each processing element are those processing elements which are directly connected thereto, e.g. it takes exactly one link or physical interconnect (e.g. wire connection) to reach an immediate topological neighbor of a processing element. In terms of connection graphs, this would correspond to one edge joining two vertices of the connection graph. The processing elements and its immediate topological neighbors form a local neighborhood. Only a few, typically three, other processing elements of the array are immediate neighbors of each processing element in embodiments of the present example. This sparse connectivity is in contrast to global interconnect networks. In the latter, each processing element can communicate with all the other processing elements of the array (e.g. via a shared bus system). Nevertheless, for the sake of short physical interconnect delays, smaller wiring area and smaller intercommunication energy costs, the processing elements of the array are typically arranged in such a manner that the topological local neighborhood, in most cases, also defines a physical, spatial local neighborhood. This is achieved by arranging topologically interconnected processing elements spatially close one to each other on a grid, e.g. as neighbors on a regular grid or lattice comprising rows and columns. A spatial (local) neighborhood may be a subset of the Moore neighborhood, but some embodiments may deviate therefrom. Therefore, in many places of the following description, a local neighborhood refers to both the topological and the spatial neighborhood. A difference between these two definitions of local neighborhood, however, may occur, for some embodiments of the present example, at the spatial boundaries of the array of processing elements where local topological neighbors to a processing element are located at an opposite edge of the array.

Flow directions for the accumulation of partial results will be designated by terms like horizontal, vertical and oblique (or diagonal) with respect to a two-dimensional array of processing elements having a first and second spatial axis which are perpendicular to each other. In consequence, a horizontal flow direction may be associated with a flow directed along the first spatial axis and a vertical flow direction with a flow directed along the second spatial axis. An oblique flow direction is then associated with a flow directed along linear combination of the first and second spatial directions designated by the first and second spatial axis. Naturally, the flow directions may be interchanged according to a suitable rule under a rotation and/or reflection of the spatial array of processing elements, e.g. a horizontal flow direction may be turned into a vertical flow direction, and vice versa, under a ninety degree rotation of the array.

For embodiments providing circular interconnections across a boundary of the two-dimensional array of processing elements, e.g. a two-dimensional array of processing elements with a global 2D torus interconnection topology, and/or for embodiments providing folding of a grid/array of spatially mapped processing elements along one or more spatial axes, particular flow directions, labeled as left/right, up/down, west/east (W/E), north/south (N/S), south-east (SE), north-west (NW), may change in terms of physical interconnect directions between local topological neighbors, but any apparent conflict in the labels for flow directions is resolved by properly identifying the changed physical interconnect directions with the original interconnect directions before applying the folding operation and/or the mapping operation of a 2D torus onto a 2D plane.

When referring to a parallelogram or a parallelogram shape in an embodiment of the present example, reference will be made to a quadrilateral geometric shape having two sets of opposite sides which are parallel to each other. This also includes special cases of a more regular parallelogram such as rhombus, rectangle or square. A collapsed parallelogram or a parallelogram that has been collapsed to a line, e.g. the line corresponding to one its bases or sides, refers to scaled version of an original parallelogram, wherein scaling is obtained by shrinking the original parallelogram along one of its two parallel directions. A parallelogram that has been collapsed to a line, in the context of the present example, refers to a shrunken parallelogram of which one parallel side pair is distinguished by a minimal physical length, e.g. the parallelogram collapsed to a line has a minimal physical width associated with it, wherein a minimal physical length is related to the characteristic width of a processing element in the array of processing elements. As the parallelograms on the array are conceptual geometric figures, they may be equally well defined by sides that cross a center point of one or more processing elements on the array rather than a corner point on the boundary of one or more processing elements on the array. In such case, a parallelogram that has been collapsed to a single line is still understood to have an associated physical width, a physical line width, which is again related to the characteristic width of a processing element in the array of processing elements.

In a first aspect the present example relates to a method for mapping an input map of a convolutional neural network layer onto an output map. The method is now explained in relation to FIG. 1 and FIG. 2, in which data entries into the output map of a convolutional neural network layer are computed on a two-dimensional array 1 of processing elements 10 arranged on the sites of a regular square lattice providing a regular grid. The square grid defines three different spatial directions of the array: a first spatial direction 'a' being vertical, a second spatial direction 'b' being diagonal and a third spatial direction 'c' being horizontal. Neighboring processing elements on the square grid are interconnected as in FIG. 2, whereby unidirectional dataflows along the three different spatial directions 'a', 'b' and 'c' are supported.

Figure 2:
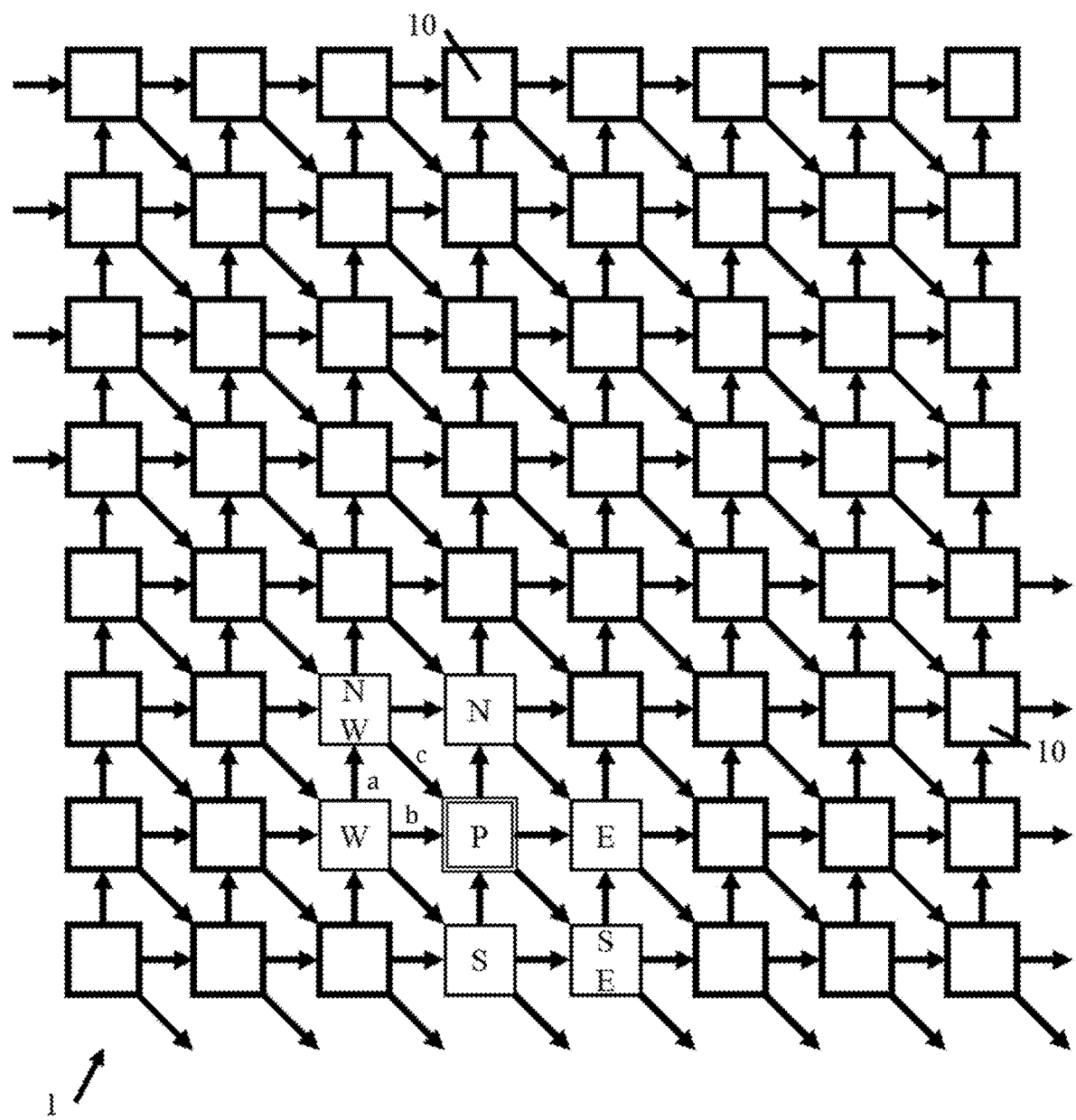
FIG. 2 shows a two-dimensional array of processing elements, arranged on the sites of a regular square lattice serving as grid, and their local interconnections, according to an example embodiment.

Referring briefly to FIG. 2, a two-dimensional array 1 of locally interconnected processing elements 10 is shown, wherein processing elements 10 are regularly organized on a grid, e.g. all the processing elements 10 are centered at the sites of a square lattice. For the particular array 1, its processing elements 10 are arranged on a regular, Cartesian grid, and topological neighborhoods are mapped onto spatial neighborhoods of the array 1. In embodiments of the present example, each processing element 10 typically comprises three inputs and three outputs, thereby enabling physical interconnections and at least three distinct unidirectional dataflows (indicated by arrows) between neighboring processing elements 10. Processing elements 10 located at an edge of the array 1 may not receive signals representative of a unidirectional dataflow at all their inputs or may not send signals representative of a unidirectional dataflow to other processing elements at their outputs, e.g. these inputs or outputs may be inactive. However, the bulk of processing elements 10 of the array 1 makes use of all their inputs and outputs, connecting to six neighboring processing elements. The local topological connections between processing elements 10 are oriented, and so are the physical interconnections of the array 1. In FIG. 2, the unidirectional dataflows between neighboring processing elements 10 are displayed as arrows. As an example, one may consider the processing element carrying the label 'P' (drawn with a double-line border). Processing element 'P' has a Moore neighborhood that counts eight other processing elements 10, but only six of them (drawn with a thinner border) are connected to it. In this example, processing element 'P' receives at its inputs data signals from processing elements labelled as 'W', 'S' and 'NW', corresponding to unidirectional dataflows along a horizontal row direction (west-east), a vertical column direction (south-north) and an oblique, here diagonal, direction (northwest-southeast), respectively. At its outputs, processing element 'P' delivers data signals to processing elements labelled as 'E', 'N' and 'SE', equally corresponding to unidirectional dataflows along a horizontal row direction (west-east), a vertical column direction (south-north) and an oblique, here diagonal, direction (northwest-southeast). Data signals and dataflow is used in general terms here, but during the accumulation stage they effectively represent partial results of a (multi-)dimensional convolution operation which are accumulated over the array 1 as they propagate, from processing element to processing element, along aforementioned flow directions. During a load or distribution stage, however, a flow of data entries in the input map (e.g. pixel values of an image) or a flow of weights of a selected convolution kernel may also be manifestations of unidirectional dataflows on the array 1. Since each processing element 10 is processing received data signals independently, massive parallel computation and distributed storage functionality without internal buffers (beyond the local registers in the individual processing elements 10) are enabled by virtue of the provided array 1.

Figure 15:
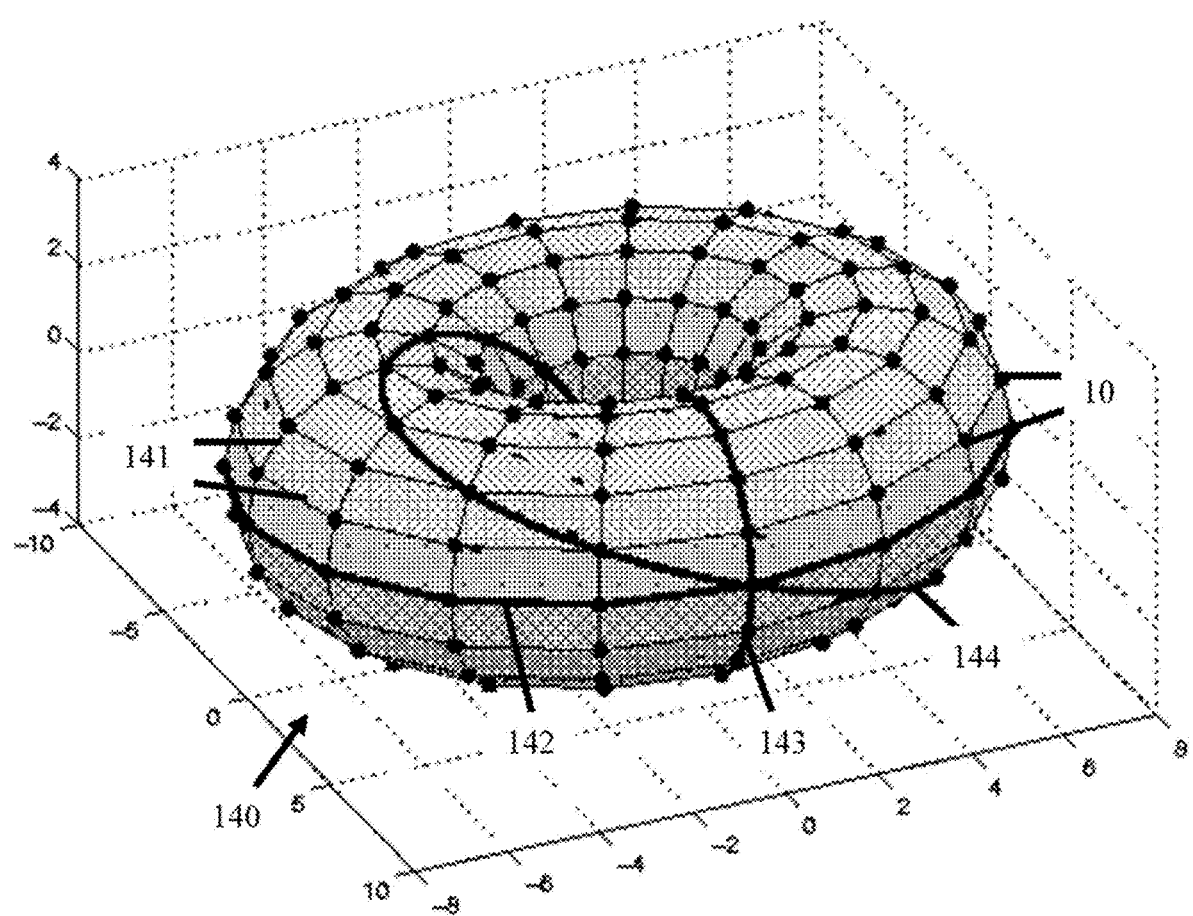
FIG. 15 shows a non-planar array of processing elements arranged on the grid points of a 2D torus, according to an example embodiment.

The array 1 may be of larger size and comprise more processing elements 10 than what is shown in FIG. 1, yet array 1 as shown in FIG. 1 proves to be sufficient for explaining the method. Embodiments of the present example are not limited to the examples disclosed hereinafter and particular numbers referring to sizes or dimensions of arrays, input maps, output maps or convolution kernels may be significantly larger than the ones that are indicated in the following specifications, primarily because a clear visualization and a concise notation would be suffer from too big such numbers. As a matter of fact, the array size, when disclosing the details of the method, may be assumed to be infinite such that issues related to boundaries do not emerge. This assumption may be effectively valid if the array comprises enough processing elements in all flow directions of started unidirectional dataflows to obtain the computed data entries in the output map before any boundary of the array is encountered by any of the unidirectional dataflows on the array. Alternatively, one may provide a regular two-dimensional grid, and arrange the processing elements of the array on its grid points, which covers the curved surface of a 2D torus. An example thereof is illustrated in FIG. 15, showing a non-planar two-dimensional array of 16×16 processing elements 10 arranged on the sites/grid points of a regular two-dimensional grid 141 on a 2D torus 140 (e.g. regularly spaced grid points determined by 16 regularly spaced toroidal angle coordinates and 16 regularly spaced poloidal angle coordinates parametrizing the torus surface. The 2D torus topology ensures that unidirectional dataflows on the torus surface are never meeting a boundary. For instance, the lines 142 (toroidal direction), 143 (poloidal direction) and 144 (cycle on torus) are corresponding to three distinct flow directions on the array 1, e.g. horizontal, vertical and diagonal/oblique. The skilled person will understand that the assumptions are made to simplify the following description and are not limiting. Indeed, ways to overcome practical difficulties related to too large array sizes or arrangement of processing elements on a non-flat surface of a torus will be addressed in some embodiments of the disclosure hereinbelow.

In this example each convolution kernel has two dimensions, e.g. a kernel height H and a kernel width W, and different convolution kernels, corresponding to different output channels of the output map, may be stacked together along a third dimension. Although FIG. 1 is further described for a quadratic convolution kernel with kernel height H and kernel length L being equal to three, the skilled person will appreciate that the present method is not limited to this particular quadratic kernel size. Frequently used kernel sizes in convolutional neural networks, e.g. 1×1, 2×2, 4×4, 5×5, . . . , 11×11, are other non-limiting examples. Moreover, the present method may be performed with non-quadratic convolution kernels, e.g. with rectangular convolution kernels, e.g. of size 3×5, 9×7, etc.

Assuming that the a data entry position Y_ij is indexed by the row index 'i' and the column index 'j' of the data entry in the 2D input map X on which the sliding 2D convolution kernel W of size 3×3 is currently centered, a first data entry in the output map may be computed for i=j=1 (e.g. a data entry at a corner of the output map). This data entry in the output map, Y_11, is completely determined by summing up the following nine products: Y_11=X_00*W_00+ X_01*W_01+X_02*W_02+X_10*W_10+X_11*W_11+ X_12*W_12+X_20*W_20+X_21*W_21+X_22*W_22. In more general terms, a data entry in an output map comprising a plurality of output channels, C_out, is obtained by summing up the products of below equation, which also takes into account a possible depth of the input map X, e.g. the input map may comprise a plurality of input channels C_in. This means that convolution kernels, $W_{lmn}$, are at most three-dimensional but an additional index 'k' is introduced to denote the selection of a particular output channel in the output map, thereby selecting an associated convolution kernel from the set of convolution kernels.

$$Y_{ij}^k = \sum_{l=0}^{C_{in}-1} \sum_{m=0}^{H-1} \sum_{n=0}^{L-1} X_{l\{i-\lfloor\frac{H-1}{2}\rfloor+m\}\{j-\lfloor\frac{L-1}{2}\rfloor+n\}} W_{lmn}^k \quad k = 0, \ldots, C_{out}-1$$

According to the present method, these products are provided, e.g. by means of individual processing elements 11 of the array 14, as shown in FIG. 1, each of which receives an input pair comprising a kernel weight and a data entry in the input map for generating one product. Alternatively, individual processing elements 101 of the array 1 may receive a pre-generated product.

It is observed that in FIG. 1 only the nine previously mentioned products with regard to the first data entry in the output map, Y_11, are provided since the present method is not limited to embodiments for which the plurality of products of all data entries in the output map are provided at once. Indeed, in practical situations where the number of available processing elements 10 may be more restricted, it is useful to provide (e.g. generate) the plurality of products associated with different data entries in the output map sequentially. For example, a plurality of products associated with a particular position of the data entry in the output map may be provided each time this position changes, e.g. each time a selected convolution kernel is shifted, relative to the input map, along the first or second dimension of the input map. A plurality of products associated with a particular position of the data entry in the output map may thus be provided via a dynamic input loading mapping, at each iteration step of a selected convolution kernel to be shifted, and this plurality of products is typically provided as a plurality of generated products that are generated and temporarily stored (e.g. during a dedicated storing cycle preceding the computation cycles one to ten associated with the accumulation phases) at a respective processing element of the array.

Next, the plurality of products is arranged into a plurality of partial sums such that each partial sum includes at least the products associated with a first dimension of the convolution kernel W, e.g. S11={(X_00*W_00+X_10*W_10+ X_20*W_20); (X_01*W_01+X_11*W_11+X_21*W_21); (X_02*W_02+X_12*W_12+X_22*W_22)} with the kernel rows being the first dimension of size H=3 (e.g. height). Different partial sums are associated with at least a second dimension of the convolution kernel W, e.g. the kernel columns being a second dimension of size L=3 (e.g. width or length) for the partial sums in S11. The provided products are then stored at the level of individual processing element 11 during at least one computation cycle, e.g. during at least one clock cycle in a synchronous array in which products are latched into the output registers of processing elements. It is a characteristic feature of the present method that the provided products are stored in the processing elements 11 of a parallelogram set 5 of processing elements of the array 1. A parallelogram set 5 has two side pairs 50, 51, and each side pair comprises two parallel edges of the parallelogram. As shown in FIG. 1, the parallelogram set 5 of processing elements may be partially empty, meaning that it may also contain processing elements to in which no product has been stored, e.g. no pre-generated product has been delivered to those processing elements or those processing elements do not generate a product and temporarily store it. Although a parallelogram may be partially empty, e.g. comprise temporarily inactive processing elements, it is generally preferable to have a high degree of activity throughout all the processing elements of the array; it will be explained hereinunder how output parallelization and/or folding may be used to this end. One of the two side pairs of the parallelogram 5 is oriented along/parallel to a first spatial direction of the array 1 and the other one is oriented along a second spatial direction of the array 1. For example, the side pair 50 is oriented along the first spatial direction 'a' of the array 1 and the side pair 51 is parallel to the second spatial direction 'b' of the array 1. According to the present method, products associated with a same partial sum are distributed along a first spatial direction 'a' of the array 1, parallel to a first side pair 50 of the parallelogram 5, and different partial sums are distributed along a second spatial direction 'b' of the array 1, parallel to a second side pair 51 of the parallelogram 5. The products X_00*W_00, X_10*W_10 and X_20*W_20, for example, are distributed along a vertical edge of the parallelogram 5 and are the constituents of the first partial sum in S11. Likewise, the products X_01*W_01, X_11*W_11 and X_21*W_21 are distributed along a vertical direction 'a' of the array 1, being parallel to an edge of the side pair 50 of the parallelogram 5, and are the constituents of the second partial sum in S11. Eventually, the constituents of the third partial sum in S11, viz. the products X_02*W_02, X_12*W_12 and X_22*W_22, are also distributed along a vertical edge of the parallelogram 5. Moreover, inspecting FIG. 1, it is observed that the products stored in processing elements 11 which are associated with a base of the parallelogram 5, e.g. the three products X_00*W_00, X_01*W_01 and X_02*W_02, are diagonally offset and are associated with different partial sums. Thus, the feature stating that products are stored in the processing elements of the parallelogram set 5 such that different partial sums are distributed along a second spatial direction 'b' of the array 1 is verified. It is noted that the one or more parallelogram sets described so far in relation to the (initial) distribution of the plurality of products are not static, but move on the array of processing elements under the action of the unidirectional dataflows for each computation cycle. This movement of the one or more parallelogram sets is accompanied by a scaling, e.g. shrinking, of the one or more parallelogram sets as the unidirectional dataflows continue. Nevertheless, the one or more parallelogram sets remain 'geometric' parallelograms even under the action of the dataflows, e.g. the dataflows are conformal and preserve the shape but not the size of the one or more parallelogram sets. Moving and scaled parallelogram sets are identifiable on the array at each computation cycle, e.g. they are identifiable as the convex hull of processing elements of the array that carry partial information on the data entry in the output map to be computed; the partial information being provided as an associated product, an associated incomplete or associated complete partial sum, or an associated incomplete data entry in the output map, all of which are contributing to the computation of the final data entry in the output map.

At this stage the accumulation cycle which combines the plurality of products into a data entry in the output map, e.g. the data entry Y_11, is started. This accumulation cycle comprises two phases. During a first phase, the plurality of products of the parallelogram 5 are accumulated into the plurality of partial sums into which the contributions to every data entry in the output map have been arranged, e.g. into the elements of S11 for the data entry Y_11 in the output map. In the second phase, the plurality of partial sums are accumulated into the final data entry in the output map, e.g. the elements of S11 are combined to the data entry Y_11 in the output map. At the start of the first accumulation phase, first dataflows 6 are started by moving, once per computation cycle, the values stored in the processing elements associated with each parallelogram base, being one side of the second side pair, to the next connected processing element along a pre-determined first flow direction. First dataflows 6 are thus unidirectional horizontal dataflows (of which only two out of three are indicated by horizontal arrows) along the third spatial direction 'c' of the array 1 for the present embodiment, originating at the processing elements which are associated with the base of the parallelogram 5, e.g. at the processing elements located at the lower edge of the side pair 51 storing the products X_00*W_00, X_01*W_01 and X_02*W_02. Additionally to the first dataflows, second dataflows 7 are started by moving, once per computation cycle, the values stored in the remaining processing elements of each parallelogram to the next connected processing element along a pre-determined second flow direction. Second dataflows 7 are thus unidirectional diagonal dataflows (of which only four out of many are indicated by oblique arrows) along the second spatial direction 'b' of the array 1 for the present embodiment, originating at the processing elements which are not associated with the base of the parallelogram 5. During the first three computation cycles, the values of each incoming dataflow at any processing element 10 of the array 1 are crossing the processing element without being altered and are passed to the next connected processing element along the incoming dataflow direction. It is therefore possible that any of the first dataflows 6 crosses any of the second dataflows 7 at a particular processing element without their flow values being modified. This is achieved by providing processing elements which are adapted to receive (e.g. load) and store, during at least one computation cycle, the values of each of the differently oriented dataflows supported on the array, e.g. by providing each processing element of the array with gated output registers for each supported dataflow direction. It is of advantage of embodiments of the disclosure that processing elements of the array may only comprise a few registers for storing the different dataflow values, whereby the less energy-efficient and larger-sized buffers are avoided at the level of individual processing elements. There are instances, however, where a first and a second dataflow do not cross each other without being altered. These instances constitute update events and a ruled by updating rules. In FIG. 1 for example, there are update events occurring in the processing elements 12 (shown as filled with a pattern, different patterns corresponding to different partial sums) during the fourth computation cycle. The processing element 12 are distinguished by the fact that a value carried by a first, horizontal dataflow 6 reaching the processing element 12 and a value carried by a second, diagonal dataflow 7 also reaching the processing element 12 are both corresponding to previously stored products in the parallelogram set 5 that are associated with the same partial sum. An update event then takes place for which a new value is assigned to the first dataflow 6, the new value being a combination, e.g. sum, of the incoming values of the first and second dataflow 6, 7. For example, following the horizontal and diagonal arrows for the first dataflow 6 and the second dataflow 7 in FIG. 1, one can observe that an initially incomplete partial sum of S11 associated with values of the first dataflow 6, e.g. the products X_00*W_00 or X_02*W_02, are updated by combining them with the products, belonging to the same partial sum, associated with values of the second dataflow 7, e.g. the respective products X_10*W_10 and X_12*W_12. Therefore processing elements 10 of the array 1 need to be adapted to combine values of dataflows along different spatial directions into a new value for at least one of the supported dataflows, e.g. by providing each processing elements with summation means (e.g. adders). In the present embodiment of FIG. 1, the distinguished processing elements 12 thus further complete (indicated by plus signs) the incomplete partial sum of S11 during the fourth computation cycle, e.g. by forming the sum X_00*W_00+X_10*W_10 or X_02*W_02+X_12*W_12 and then placing the sum as a value to pass on the first, horizontal dataflow 6. Both the actions of the dataflows and the updating of incomplete partial sums lead to a size reduction of the initial parallelogram 5; the initial parallelogram 5 is progressively collapsing during the first accumulation phase. For example, the resulting intermediate parallelogram 52 is drawn in FIG. 1 for the fourth computation cycle for which the distinguished processing element 12 form a base. Then the first phase of accumulation continues and during computation cycles five to seven the first, horizontal dataflow 6 and the second, diagonal dataflow 7 traverse the processing elements 10 of the array 1 without being modified. In consequence, updated but still incomplete partial sums associated with values of the first dataflow 6 are pushed along the third spatial direction 'c' of the array 1 and products associated with values of the second dataflow 7, not yet consumed by the updates of meeting first and second dataflow, are pushed along the second spatial direction 'b' of the array 1. At computation cycle eight of the present embodiment in FIG. 1, update events occur again at distinguished processing elements 13 (shown as filled with a pattern, different patterns corresponding to different partial sums), distinguished by the fact that they are spatially located at grid points at which incomplete partial sums associated with values of the first dataflow 6 encounter products associated with values of the second dataflows 7 that are belonging to the same partial sum and are further completing it (indicated as a plus sign in some of the processing elements 13). For example, the previously formed incomplete partial sums during computation cycle four, $X\_00*W\_00+X\_10*W\_10$, $X\_02*W\_02+X\_12*W\_12$ or $X\_01*W\_01+X\_11*W\_11$, are meeting the respective products $X\_20*W\_20$, $X\_22*W\_22$ and $X\_21*W\_21$, and processing elements 13 are combining them into the complete partial sums of S11. As a result, the first accumulation phase is finished and all of the plurality of partial sums for the at least one data entry in the output map Y\_11 are obtained. It is also noted that at the end of the first accumulation phase, the intermediate parallelogram 52 has further shrunk (under the action of the dataflows) to an extent that it has collapsed to a single line parallelogram 53, the single line being its base oriented along the second spatial direction 'b' of the array 1.

In a following step, the second accumulation phase is started and progressively accumulates the different partial sums so far obtained into the at least one data entry in the output map. The steps of the second accumulation phase resemble the steps of the first accumulation phase and will therefore be described in a more succinct way. According to the present method, third dataflows 8 are started by moving, once per computation cycle, the values stored in the processing elements associated with one of the parallelogram base vertices 54 of each collapsed parallelogram 53, to the next connected processing element along a pre-determined third flow direction. This is illustrated in the bottom part of FIG. 1 which shows a portion 14 of the array 1 of processing element 10 on which the plurality of partial sums is accumulated for the present embodiment in FIG. 1. Third dataflows 8 are thus unidirectional vertical dataflows along the third spatial direction 'c' of the array 1 for the present embodiment, originating at the processing element which is associated with the parallelogram base vertex 54 of the collapsed parallelogram 53, e.g. at the processing element 13 that previously completed the partial sum $X\_02*W\_02+X\_12*W\_12+X\_22*W\_22$. In addition to the third dataflows, fourth dataflows 9 are started by moving, once per computation cycle, the values stored in the remaining processing elements of each collapsed parallelogram 53 to the next connected processing element along a pre-determined fourth flow direction. Fourth dataflows 9 are thus unidirectional vertical dataflows along the first spatial direction 'a' of the array 1 for the present embodiment, originating at the remaining processing elements which are associated with base of the collapsed parallelogram 53, e.g. at the processing element 13 that previously completed the remaining partial sums $X\_00*W\_00+X\_10*W\_10+X\_20*W\_20$ and $X\_01*W\_01+X\_11*W\_11+X\_21*W\_21$. As for the first accumulation phase, it may be the case that third and fourth dataflows meet at a processing element of the array and cross each other without being altered. However, for the present embodiment in FIG. 1 this is not the case because at each of the two subsequent computation cycles nine and ten an update of the incomplete data entry in the output map occurs at the processing elements marked by a plus-sign. Update events are caused if a third and a fourth unidirectional dataflow meet at a processing element of the array and if their respective values, associated with an incomplete data entry in the output map and a with a partial sum, belong to and further complete a same data entry in the output map. The update events during the second accumulation phase are characterized in that the updating processing element replaces the received value of the third dataflow 8 by a combination of the received values of the third dataflow 8 and the fourth dataflow 9. In the example of FIG. 1, the first update of the third dataflow 8 is generating the further completed data entry in the output map by combining the two partial sums, $X\_02*W\_02+X\_12*W\_12+X\_22*W\_22+X\_01*W\_01+X\_11*W\_11+X\_21*W\_21$, and is placing the result onto the third dataflow 8, passing it to the next connected processing element 15 during the tenth computation cycle. This tenth computation cycle terminates the second accumulation phase because processing element 15 is updating the value of the third dataflow 8 to the completed data entry in the output map Y\_11. More generally, it is observed that the second accumulation phase is terminated if the plurality of partial sums associated with a same data entry in the output map have been added up. In this case, the at least one initial parallelograms 5, in which the plurality of products defining the at least one data entry in the output map had been stored, has entirely collapsed, under the accumulative action of the dataflows, to a single point being one of its vertices. In some embodiments the third unidirectional dataflow may be sustained in order to move the final result to a processing element located at an edge of a finite, planar grid where it may be read out more easily.

Until to this point, a single data entry Y\_11 in the output map has been computed. As the present method is conceived to provide a full mapping of an input map to an output map of a convolutional neural network, the remaining data entries in the output map are determined by repeating the previous steps for a new data entry in the output map, e.g. a contiguous data entry map Y\_12 in the output with index-position i=1, j=2. It is pointed out that according to some embodiments of the present example, rather than repeating the steps to obtain a single data entry in the output map at a time, this repetition of steps may take place spatially, e.g. embodiments of the disclosure may perform two or more of these steps in parallel so as to produce more than just a single data entry in the output map at a time. The contiguous data entry Y\_12 is obtained by shifting the center of the selected convolution kernel W to the next column data entry of the same row in the input map, i.e. the convolution kernel W is applied with a stride parameter being one. However, the embodiments of the disclosure are not limited to stride parameters being one, other choices also being supported by the method (e.g. stride parameters being two, three, etc., or first stride parameter being one for the first dimension of the input map and a second stride parameter being two for the second dimension of the input map). It may be advantageous to choose a stride parameter greater than one if a size reduction (e.g. down-sampling) of the output map is desired. The plurality of partial sums associated with this new data entry in the output map may be given as $S\_12=\{(X\_01*W\_00+X\_11*W\_10+X\_21*W\_20); (X\_02*W\_01+X\_12*W\_11+X\_22*W\_21); (X\_03*W\_02+X\_13*W\_12+X\_23*W\_22)\}$.

Figure 3:
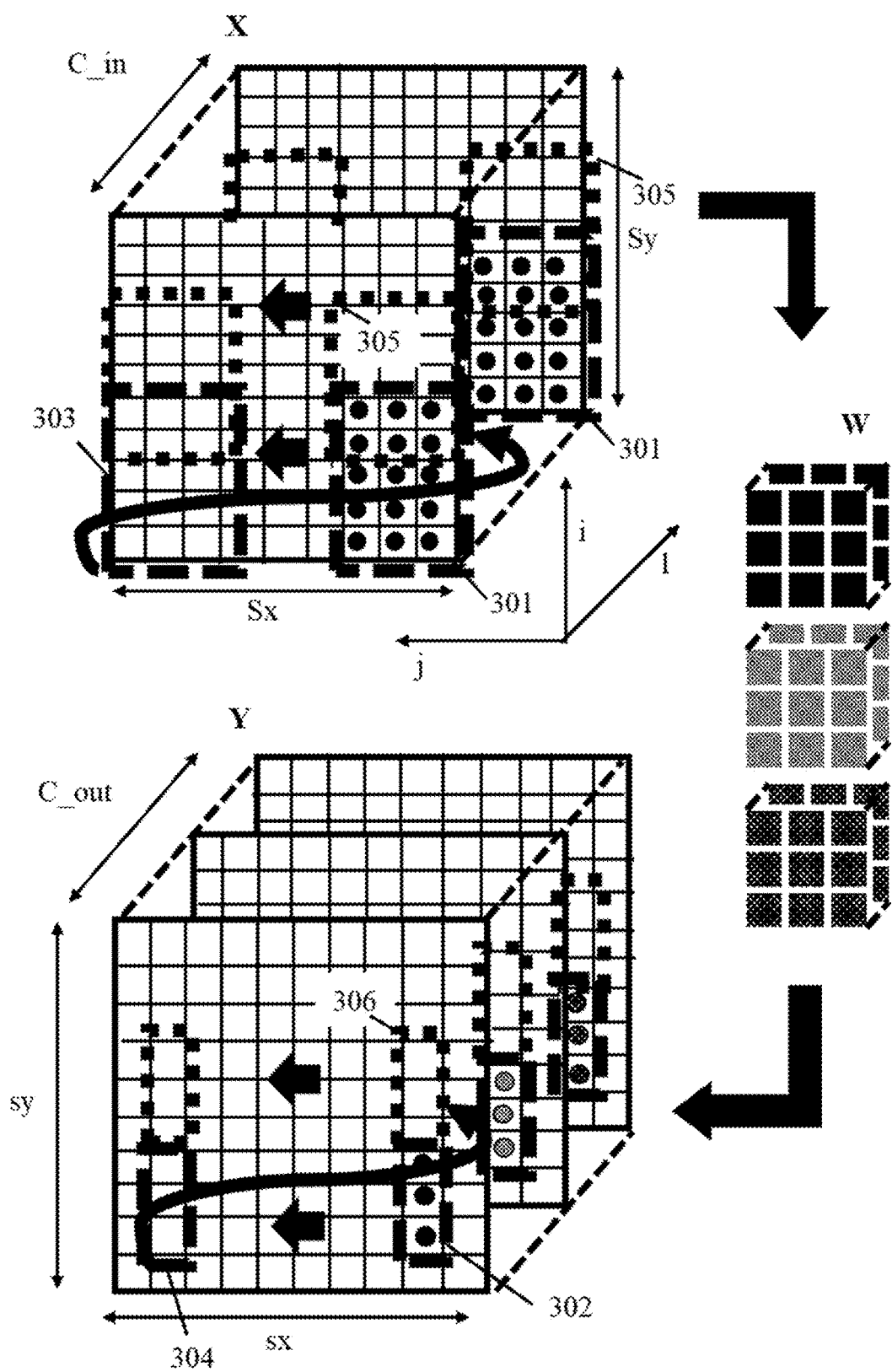
FIG. 3 illustrates the way contiguous data entries in the output map are obtained under the sliding action of a selected convolution kernel for an array of processing elements of limited size, in which convolutional operations are at least partly time-multiplexed, next to the parallelization afforded by the array itself, according to an example embodiment.

The sliding action of the one or more selected convolution kernels, thereby computing contiguous data entries in the output map, is illustrated in FIG. 3 for a three-dimensional input map having two input channels and a set of three selectable convolution kernels W, each being of size 3×3 and applied with a stride of one in each direction 'i' and 'j'. In a first iteration, the first and second accumulation phase address a portion 301 of the input map X for computing a portion 302 of the output map Y comprising three contiguous data entries. In the present example, these three data entries in the output map are row-contiguous, which implies that five rows of the input map are addressed simultaneously, e.g. rows i={0, 1, 2, 3, 4}. This is of advantage because it guarantees row re-use for the input map, e.g. a selected 3×3 convolution kernel generates products that address rows i={0, 1, 2} of the input map for a column index j=1, and row i=2 of the input map is also addressed if the position (e.g. center position) of the selected 3×3 convolution kernel, relative to the input map, is shifted to the new row indices i=2 or i=3. Therefore, it is more energy-efficient to only load, e.g. stream, row i=2 of the input map once from an external memory device, e.g. DRAM, and re-use if for the computation of other data entries in the output map Y whenever possible. This is achieved by accessing more rows of the input map (e.g. output vectorization achieved by input vectorization relative to rows in the input map) than there are rows in the selected convolution kernel, e.g. reading in data entries from five contiguous rows of the input map for a selected convolution kernel of height three. It is an advantage of embodiments of the present example that multiple rows are accessible simultaneously for re-use in the computation of other data entries in the output map Y without requiring (distributed) internal buffers to be available (e.g. no FIFO buffers required for each processing element). Different convolution kernels of the (tensor) set of convolution kernels may be evaluated in parallel or sequentially at different locations on the array, defined by the different parallelogram sets of processing elements associated therewith, or may be evaluated sequentially at a same location (e.g. parallelogram set) on the array if the previously applied weights at that location are updated. It is noted that also the sequential or parallel evaluation of different convolution kernels by the array of processing elements is possible in embodiments of the present example without having to provide internal (distributed) buffers. According to an embodiment of the example shown in FIG. 3, the relative position of a selected convolution kernel is progressively sliding along a column direction 'j' of the input map in second and subsequent iterations, spanning its complete width 'Sx'. Hence, a mapping of an input map to an output map of a convolutional neural network layer also advances progressively. At each sliding step/iteration given that there is only limited overlap of rows in the input map between consecutive row sweeps of a selected convolution kernel. For instance, portions 301 and 305 of a consecutive row sweep of a selected 3×3 convolution kernel only overlap in two rows in the input map, but span a total of eight rows in the input map when taken together. In contrast thereto, consecutive column sweeps of a selected 3×3 convolution kernel would overlap in two columns in the input map while only spanning a total of four columns in the input map taken together. A non-limiting example of such on-chip buffer may be an optimized on-chip SRAM-type buffer of a pre-defined size, e.g. a pre-defined size derived from a pre-determined load/store pattern for the plurality of products arranged in parallelogram set(s) associated with a convolution kernel size and an output vectorization size; an estimated sufficient buffer size for alexnet, for example, amounts to about 12 kilowords (4+4 kilowords for weights 2+2 kilowords for activations/data entries of the input map). Dual buffering techniques may be implemented to further increase data throughput rates of the array.

Figure 4:
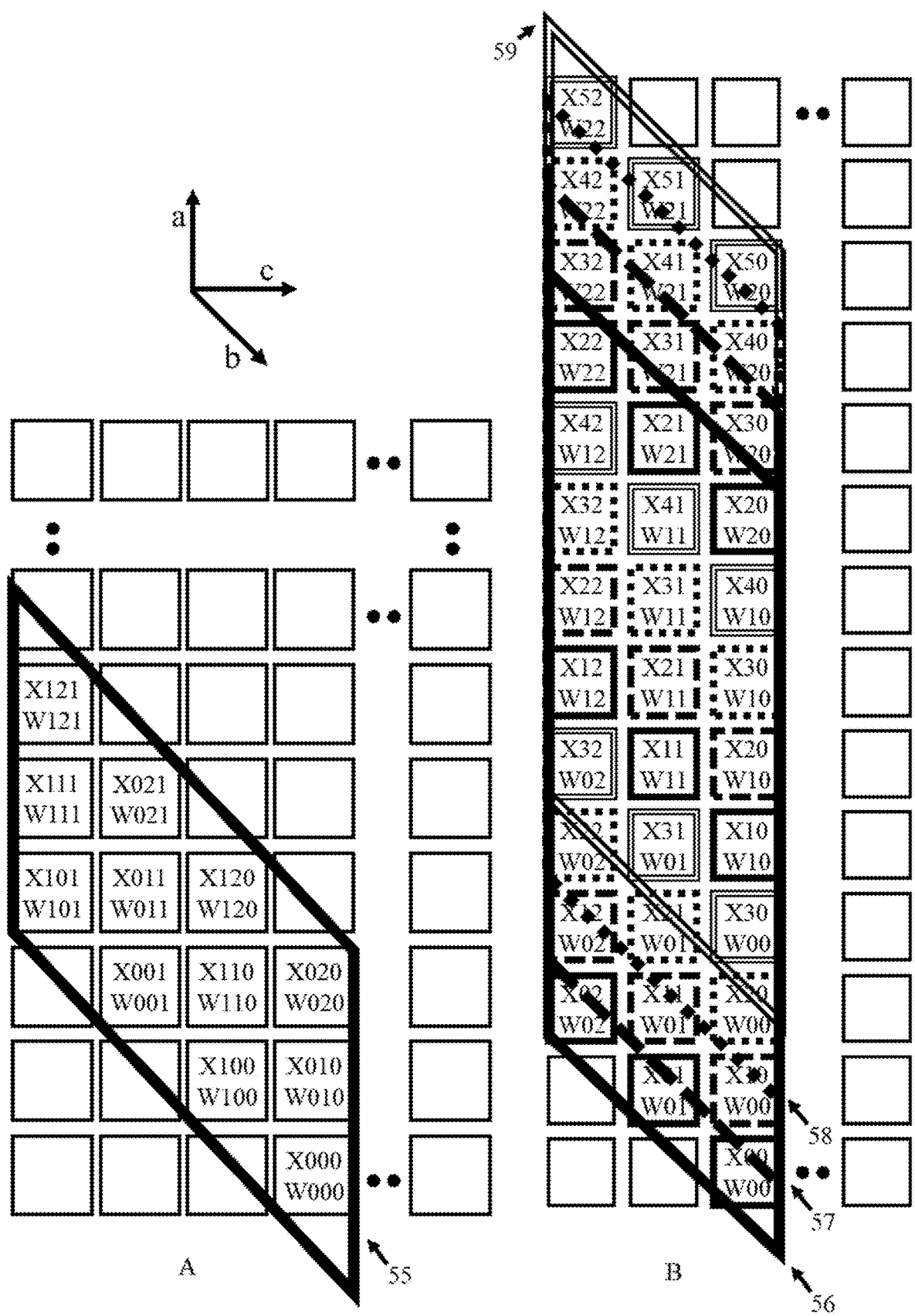
FIG. 4 illustrates different initial distributions for temporarily stored products on a square array of processing elements, according to an example embodiment.

Turning now to FIG. 4, the parallelogram sets of two different embodiments are shown. In the first case A, the input map X, comprising two input channels, is three-dimensional and a selected convolution kernel W is of size 2×3×2, i.e. W has depth two, corresponding to the two input channels of X, height three and length two. A single fully filled (e.g. non-empty) parallelogram set 55 contains the twelve stored products required for a single data entry Y_11 in the output map. Comparing this case A to the previously described embodiment in FIG. 1, the skilled person will understand that products associated with a first dimension of the convolution kernel, given by its rows, are distributed along a first spatial direction 'a' of the array when stored. Likewise, products associated with a second dimension of the convolution kernel, given by its columns, are distributed along a second spatial direction 'b' of the array when stored. A distinctive feature of case A, as compared to the previously described embodiment in FIG. 1, resides in the fact that also products associated with a further, third dimension of the convolution kernel, given by its depth, are distributed along a second spatial direction 'b' of the array when stored. The rows of the parallelogram 55, each oriented along the second spatial direction 'b' of the array and multiple rows of the parallelogram 55 being stacked along the first spatial direction 'a' of the array, will be consumed after the first three computation cycles of the first accumulation phase and the remaining base of the collapsed version of the initial parallelogram set 55 will be collapsed into a single vertex after another three computation cycles dedicated to the second accumulation phase, provided that unidirectional dataflow directions are not changed in respect of FIG. 1. Starting from case A, it is possible to stack a plurality of non-empty parallelograms along the first or second spatial direction to obtain yet another example for which multiple data entries in the output map are computed in parallel, each data entry being associated with one of the stacked, non-empty parallelogram sets. In the second case B, the input map X, comprising a single input channel, is two-dimensional and a selected convolution kernel W is of size 1×3×3, i.e. W is effectively two-dimensional with height three and length three. A distinctive feature of case B, as compared to the previously described embodiment in FIG. 1, resides in the fact that four partially filled parallelogram sets 56, 57, 58 and 59 contain each nine stored products (identified by their distinct border outlines in case B of FIG. 4) required for a single data entry Y_ij in the output map. All four partially filled parallelogram sets 56, 57, 58 and 59 are interleaved into one large parallelogram set along the first spatial direction 'a' of the array, wherein each of the partially filled, interleaved parallelogram set 56, 57, 58 and 59 includes products associated with a first dimension of the convolution kernel, given by its rows, and which are distributed along a first spatial direction 'a' of the array when stored. Likewise, each of the partially filled, interleaved parallelogram set 56, 57, 58 and 59 includes products associated with a second dimension of the convolution kernel, given by its columns, and which are distributed along a second spatial direction 'b' of the array when stored. However, the skilled person will recognize that each one of the four partially filled, interleaved parallelogram set 56, 57, 58 and 59 is associated with a different data entry in the output map, the association being parallelogram set 56 with data entry Y_11, parallelogram set 57 with data entry Y_21, parallelogram set 58 with data entry Y_31 and parallelogram set 59 with data entry Y_41.

Figure 5:
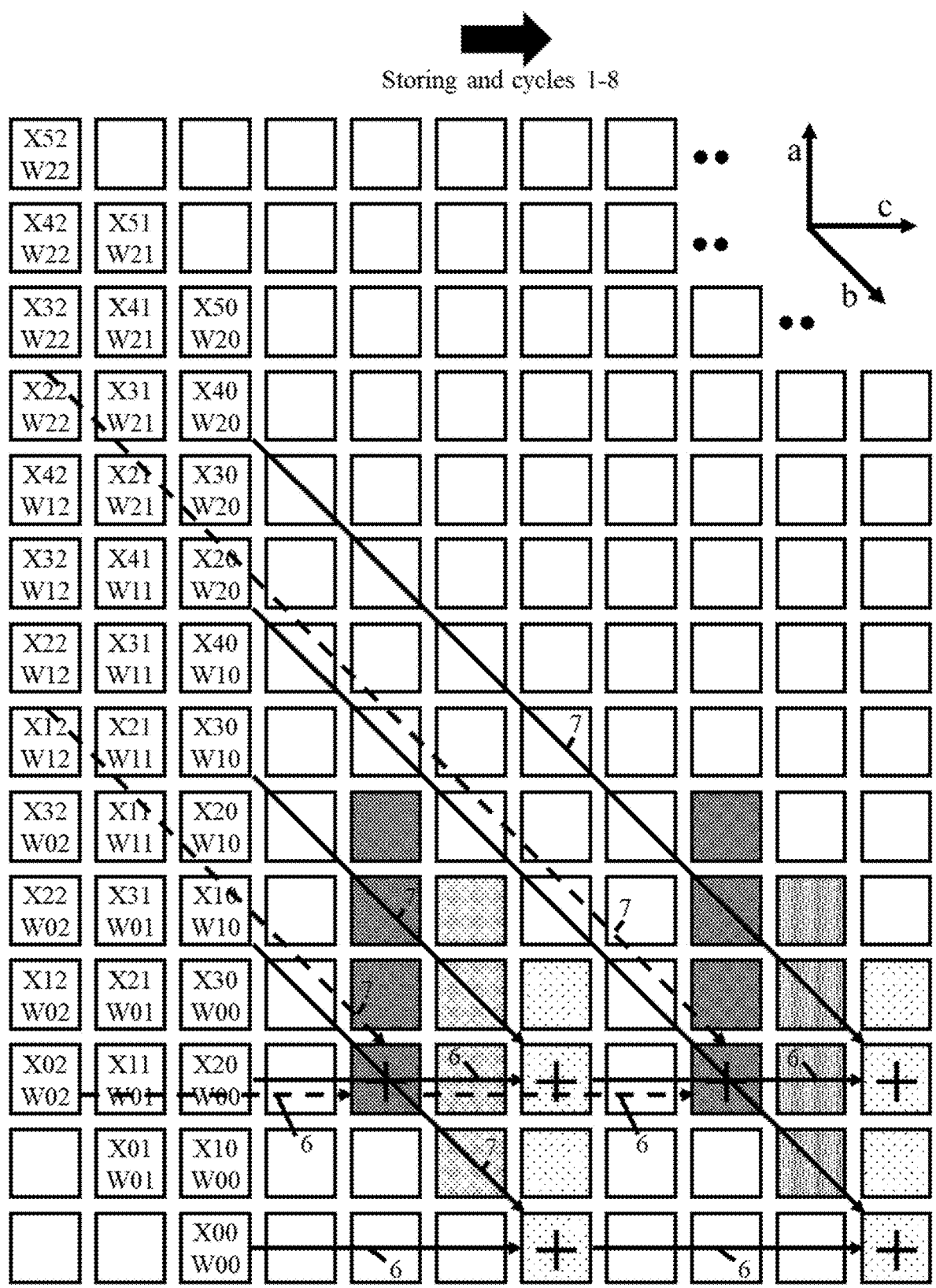
FIG. 5 and FIG. 6 illustrate unidirectional dataflows of the first and second accumulation phase for interleaved parallelogram sets of processing elements used for temporarily storing generated products on a square array of processing elements, according to an example embodiment.
Figure 6:
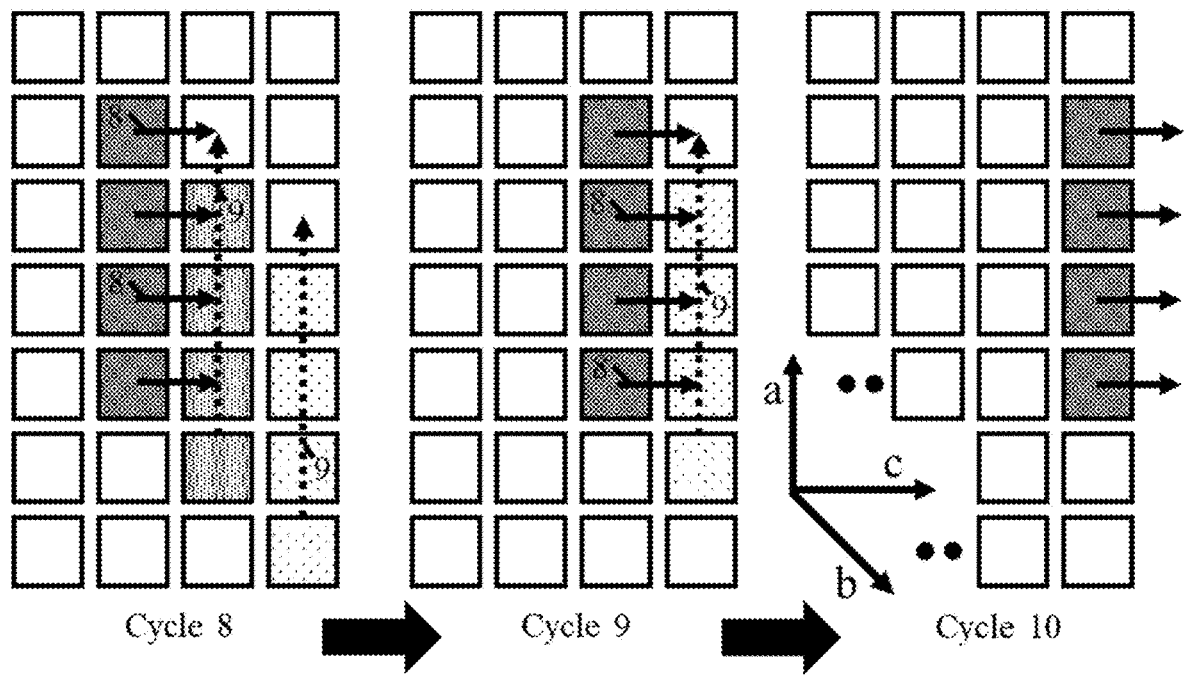

Hence, this mapping of stored products onto four interleaved, partially filled parallelogram sets results in the parallel computation of four contiguous data entries in the output map during the two accumulation phases. Similar to the embodiment in FIG. 1, the first accumulation phase consumes the rows of each of the four partially filled, interleaved parallelogram set 56, 57, 58 and 59 during two times four computation cycles, at the end of which all four partially filled, interleaved parallelogram set 56, 57, 58 and 59 are collapsed to their respective bases (each collapsed parallelogram base oriented along the second spatial direction 'b' and the four collapsed parallelogram bases being stacked along the first spatial direction 'a'). This is illustrated schematically in FIG. 5. It takes then another two computation cycles in the second accumulation phase to reduce each one of the collapsed parallelogram bases to a single vertex under the actions of the third and fourth unidirectional dataflows on the array, as shown in FIG. 6. It is understood that, in the present example, the number of interleaved parallelograms, e.g. four, determines the number of simultaneously computed data entries in the output map, e.g. a vectorized output of four data entries in the output map is obtained simultaneously. Likewise, it is apparent that, in the present example, the number of interleaved parallelograms, e.g. four, also determines the number of bottom rows (rows here being slanted lines along the second spatial direction 'b') of the bigger non-empty parallelogram, containing the four interleaved initial mappings to parallelograms 56, 57, 58 and 59, the processing elements of which are configured to start first unidirectional dataflows 6 horizontally along the third spatial direction 'c' during the first accumulation phase.

It has been pointed out that in practice some embodiments of the present example may provide a finite, flat array comprising a limited number of processing elements arranged on the sites/points of a regular two-dimensional grid on a flat surface and that one has to consider unidirectional dataflows reaching a boundary of the array. It is an advantage of some embodiments of the disclosure to provide circular unidirectional dataflows on finite, flat arrays. This avoids the readout of values (e.g. partial computation results not being a completed data entry in the output map) carried by the unidirectional dataflows that reach a boundary, their transfer/write back and temporary storage on an external memory device, e.g. DRAM, or in distributed internal buffers, e.g. SRAM, and the subsequent reload of the temporarily stored results when the array is ready for a further accumulation cycle by re-applying the reloaded values of one or more unidirectional dataflows at and/or distributing to a subset of processing elements located at a boundary opposite to the boundary where the one or more unidirectional dataflows left the finite array. Avoiding these additional steps greatly reduces latency, increases throughput and reduces energy costs caused by the write back and reload of data to an external memory device or to internal, distributed buffers (e.g. SRAM). Even if an external memory device is co-integrated on a same chip, e.g. as distributed internal buffers (e.g. SRAM), it has to be sufficiently large in size, thus contributing to an increased area and energy cost. It appears natural to implement circular unidirectional dataflows on the finite and flat array in a manner similar to the circular unidirectional dataflows that exist on the surface of a 2D torus 140 as shown in FIG. 15, e.g. the three distinct unidirectional dataflows along the lines 142 (e.g. horizontal), 143 (e.g. vertical) and 144 (e.g. diagonal). This is referred to as 2D torus topology or 2D torus interconnection. A flattened (planar) 2D torus preserving its topology may be obtained by cutting the 2D torus 140 in FIG. 15 first along a poloidal direction, e.g. along the line 143, and then cutting the resulting cylinder surface along a toroidal direction of the 2D torus 140, e.g. along the line 142. If then opposite edges of the rectangle or square are identified with each other (this "stitching back together" of edges can be considered as undoing the previous cuts), the topology of the 2D torus is restored. For embodiments of the present example using circular unidirectional dataflows in in a 2D torus topology, the new data entries in the input map obtained under the sliding action of a selected convolution kernel may not be received in one continuous stream, but may be time-multiplexed into a plurality of shorter continuous streams. For instance, the fresh data entries in the input map may not be received or applied to the finite array of processing elements for being distributed/used for generating a plurality of products as long as a previous pipeline stage has not yet been terminated, e.g. a previously generated plurality of products has not been stored yet on the individual processing elements (e.g. in the output registers) of a parallelogram set at the start of a new accumulation phase because unfinished (e.g. not entirely accumulated) circular dataflows during a previous accumulation stage have re-entered the finite array of processing elements at one of its physical boundaries and overlap with processing elements of that parallelogram set.

Figure 16:
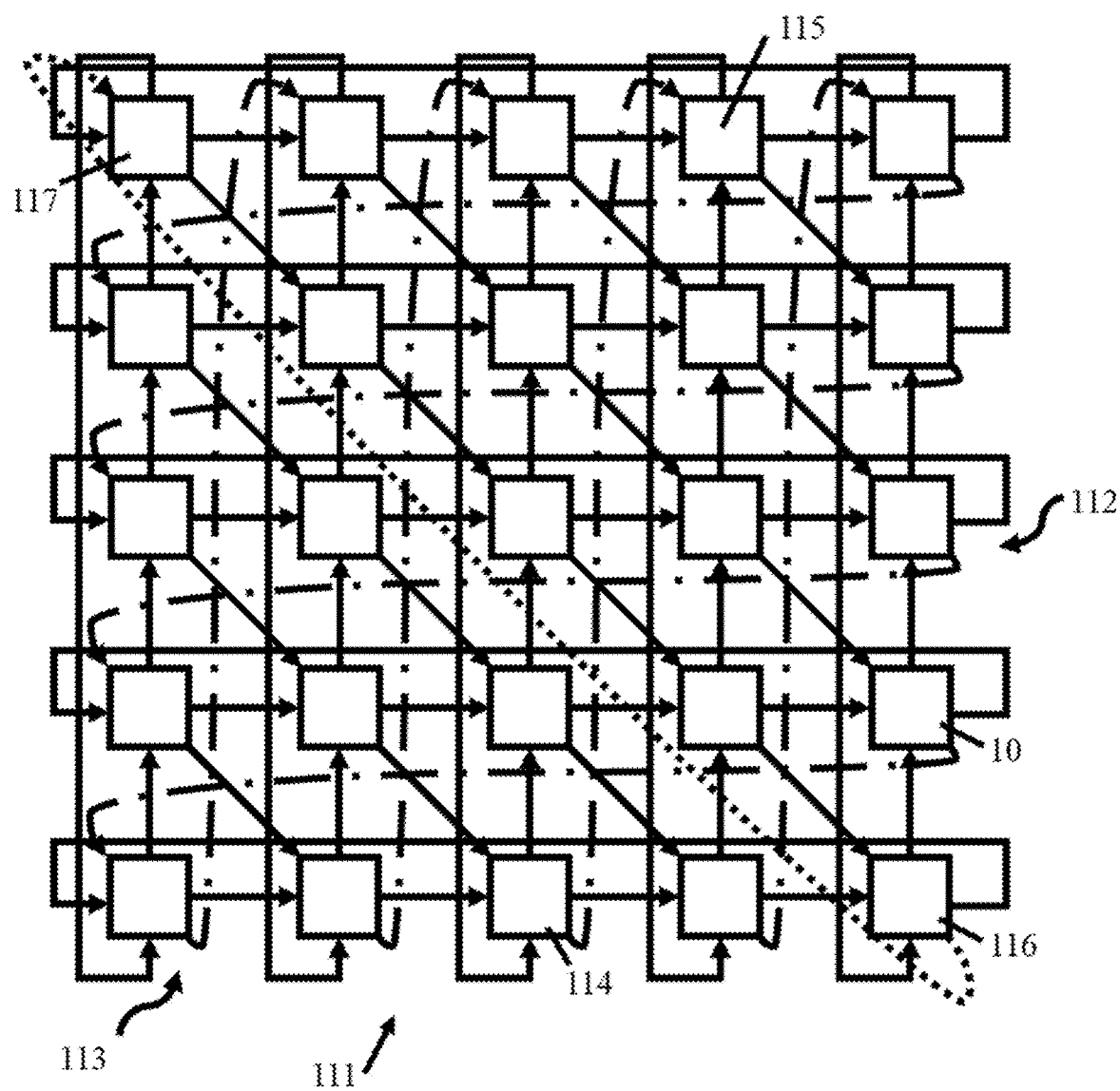
FIG. 16 shows a planar array of processing elements with 2D torus interconnection topology suitable for projection onto a practical physical layout, according to an example embodiment.

FIG. 16 shows an exemplary array 111 of 5×5 processing elements 10 which is endowed with a 2D torus interconnection topology. In consequence, the processing elements 10 of a same row 112 are cyclically connected, and so are the processing elements 10 of a same column 113. Furthermore, the northwest-southeast unidirectional dataflow mentioned in relation with FIG. 2 now connects a processing element at the lower edge of the array 111 (e.g. processing element 114) to its topological southeast neighbor, which under the present spatial mapping corresponds to the processing element found in the top row of the next column to the right (e.g. processing element 115) since the lower edge and the upper edge of the array 111 are now identified as being one and the same edge. Analogously, the processing element 116 in the bottom right corner of the array 111 is connected to its 'southeast' topological neighbor, which is spatially mapped to the top left corner processing element 117. This has the advantage that the planar array 111 with 2D torus interconnection topology is free of boundaries, at least to the extent that dataflow processing on it is concerned, even if its processing elements 10 are spatially mapped onto a planar 2D grid. Therefore, unidirectional dataflows may be maintained as long as it takes for an accumulation stage to finish, whereby unnecessary data movement to and from an external memory device, e.g. DRAM, is avoided. Besides, the number of processing elements 10 may be reduced in those embodiments, saving energy and area costs as well as non-recurrent energy costs. The exemplary array 111 is described at a conceptual level, meaning that the interconnections therein are conceptual and not yet corresponding to a physical layout. However, the skilled person will appreciate the teaching even at a conceptual level, which is suitable for a projection onto a physical layout.

Although embodiments of the present example exploiting the 2D torus interconnection topology are preferable, larger planar arrays are facing increasingly longer wire connections and propagation delays between topological neighboring processing elements that are located at opposite edges of the array. In these cases, some example embodiments of the present example additionally provide a folded grid for the array of processing elements. A folded grid is folding the planar array along a fold line at its center such that the edges of the array that were opposite to each other before are now aligned. Overlapping processing elements being the result of the fold, the so folded grid is further modified by interleaving the overlapping processing elements to again result in a planar array. However, embodiments of the present example are not limited to provide a planar, two-dimensional projection of the array of processing elements. Much like the three-dimensional projection of a two-dimensional array of processing elements in FIG. 15 is showing a non-limiting example of a non-planar embedding of the array on a 2D torus surface, the embodiments of the present example relating to a folded grid, e.g. a folded planar array, may also realize a three-dimensional projection as a result of the folding process, e.g. the locally planar leaves of the folded two-dimensional array of processing elements together form a three-dimensional structure in which the two-dimensional leaves of the fold are stacked vertically. Example embodiments that provide such a vertical stack of planar array leaves may be implementing the stack in a 3D back end of line (BEOL) process, e.g. in a 3D BEOL stack of TFT layers.

Figure 17:
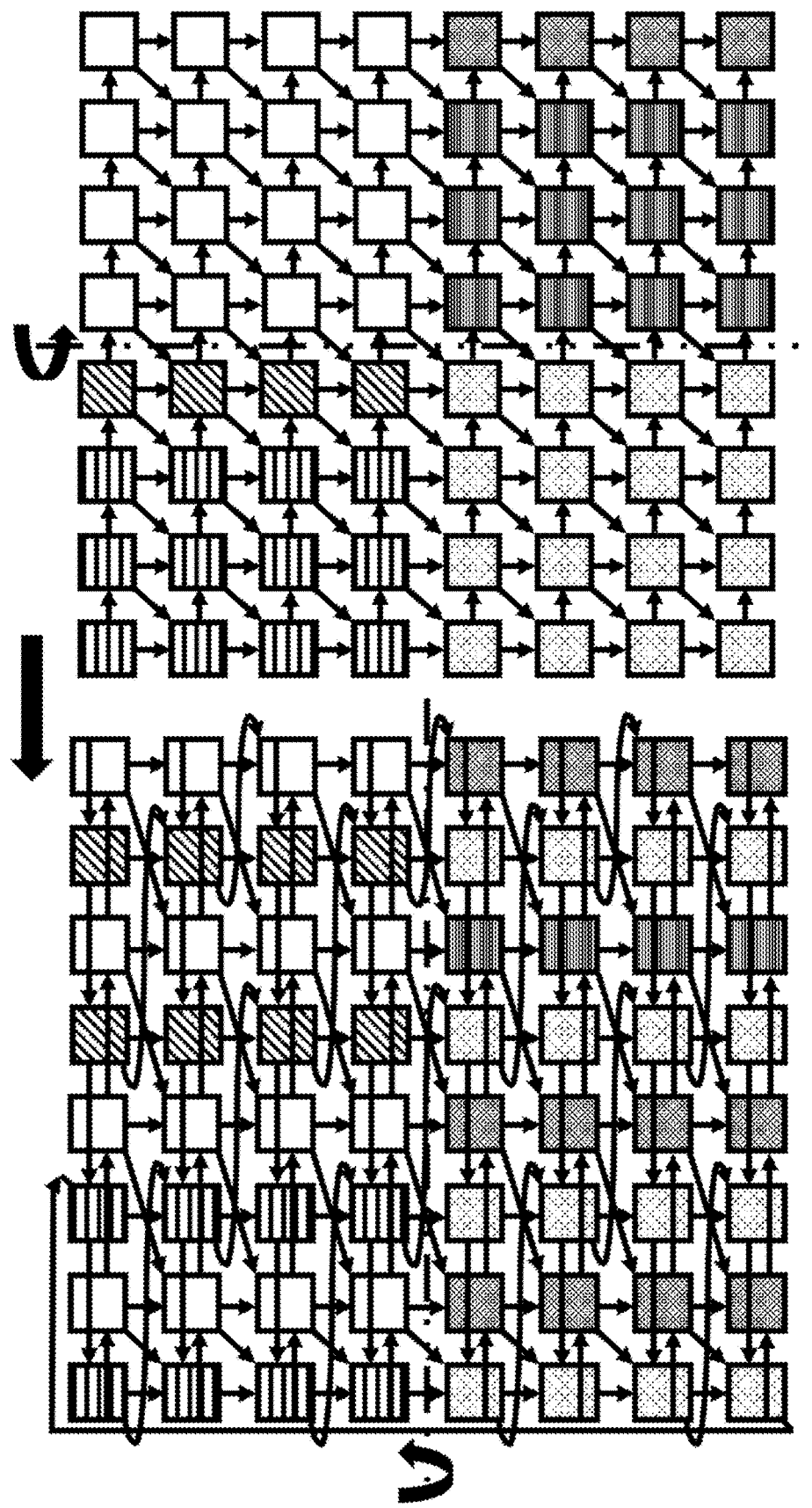
FIG. 17 and FIG. 18 illustrate folding of a planar array of processing elements with 2D torus interconnection topology, according to an example embodiment.
Figure 18:
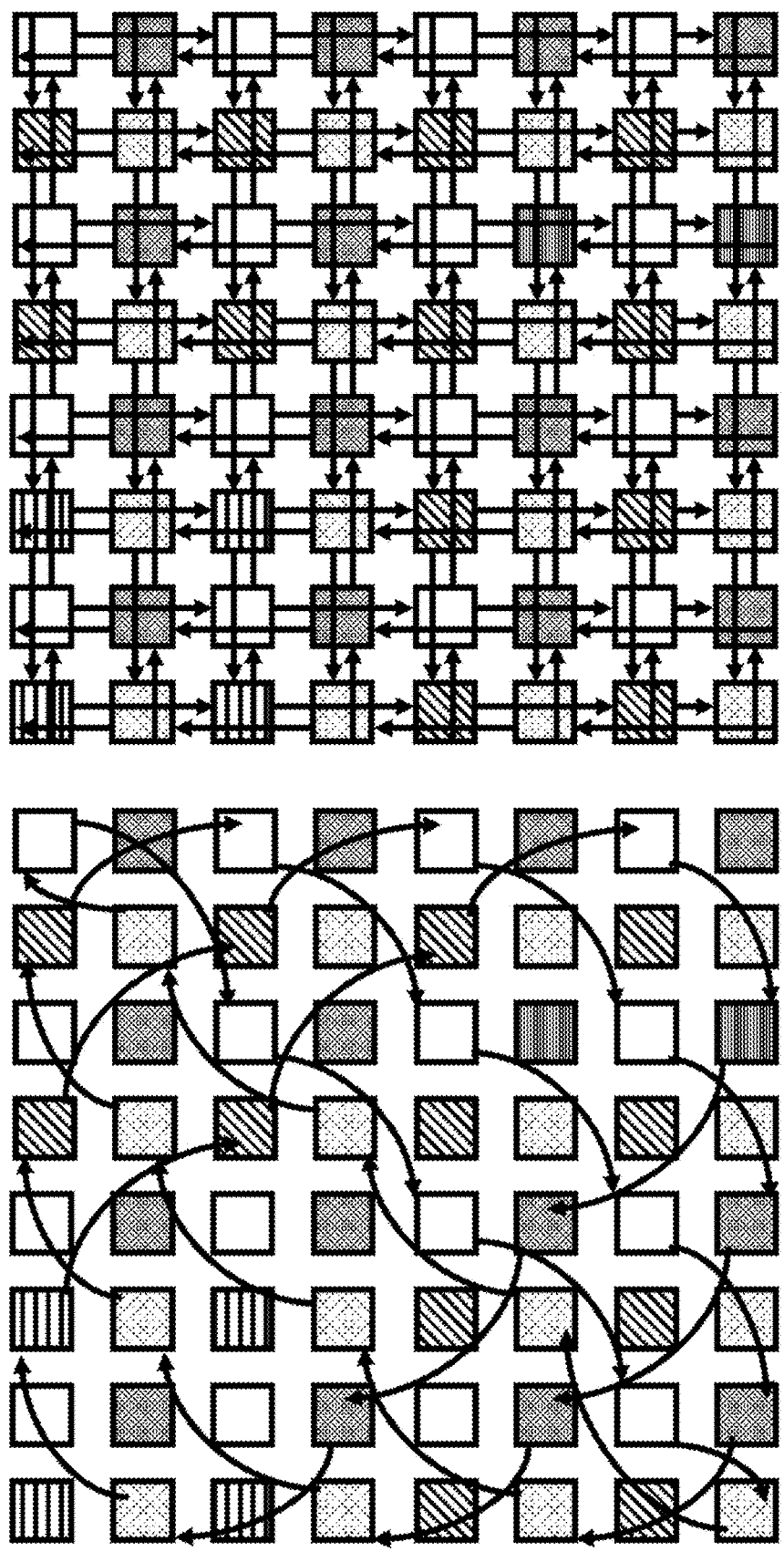

FIG. 17 and FIG. 18 illustrate the folding process for an array of 8×8 processing elements. In FIG. 17, the four quadrants of the array, each comprising a block of 4×4 processing elements identified by their respective filling patterns, is folded along a horizontal line such that a bottom edge of the array is aligned with a top edge of the array. Processing elements which overlap after the horizontal fold are offset into the (widened) interstitial regions between each adjacent row pair of the array, thereby achieving an interleaved and horizontally folded grid, as seen in the lower half of FIG. 17, e.g. by recognizing the changing filling patterns of processing elements of the folded array when stepping form one row to the next. For better visibility only some of the oblique/diagonal interconnections between (topologically) neighboring processing elements are shown. This horizontally folded array/grid may serve as an intermediate array which is folded a second time, e.g. along a vertical center line of the intermediate array. This second fold yields a folded (in both horizontal and vertical direction), interleaved array/grid with 2D torus interconnection topology for the processing elements supporting the unidirectional dataflows. This is shown in the upper half of FIG. 18 for the horizontal and vertical interconnections between the processing elements and for the oblique/diagonal interconnections between the processing elements in the lower half. The horizontal and vertical interconnections have been drawn separately from the oblique/diagonal interconnections for the sake of good visibility but the embodiments of present example providing such folded array are understood to have all interconnection types (horizontal, vertical and oblique/diagonal interconnections) combined in a single array. Bi-directional folding, e.g. horizontally and vertically, of an embodiment of the present example providing an array endowed with 2D torus interconnection topology may have the practical advantage of providing the array with shorter wire interconnects and propagation delays between neighboring processing elements, when implemented in a device. Better uniformity of the array may be achieved, as well as shorter latencies and decreased energy costs.

It shall be understood that an input map, in any embodiment of the present example, may be increased by sufficient padding in order to compute all the contributions to a data entry in the output map in situations in which the selected convolution kernel is centered on or near the edges of the input map, e.g. near the edges of an image or image stack. Alternatively, one may discard or equate to zero the products that would be associated with non-existing (because out of bounds) data entries in the input map. It is noted that computation overhead due to sufficient padding does not have a noticeable effect in practice because the amount of input data (e.g. interior region of an image) is typically much larger than a typical size of a convolution kernel and much larger than the added padding data (e.g. an added boundary around an image, e.g. only a few pixels wide), e.g. larger by at least two to three orders of magnitude for many applications. Also practical sizes of an array of processing elements are typically much larger than the above example of an 8×8 array chosen for the purpose of illustration, hence only a relatively small portion of such practical array may be processing padding-related data.

If, in embodiments of the present example, two unidirectional dataflows join at a processing element and that processing updates and/or starts at least one of the supported unidirectional dataflows on the array by combining the values of the two joining unidirectional dataflows, the non-updated unidirectional dataflows may be stopped, e.g. not transmitting any value to a connected processing element along that flow direction, may be updated too by resetting a transmitted value to zero or may continue flowing by moving the same incoming value to the next connected processing element along that flow direction.

Embodiments of the present example are not limited to convolutional layers in neural networks in the strict sense of providing two-dimensional or three-dimensional input maps but they may also be adapted to a recurrent LSTM layer comprising a plurality of LSTM cells, for example, for which weighted sums of delayed LSTM cell output states are fed back to the LSTM cell inputs. In this case, an input map is given by the set of LSTM cell output states at a time t and is mapped onto an output map given by the new LSTM cell inputs at time t+1 being the weighted sum of delayed LSTM cell output states. Likewise, embodiments of the present example may be adapted to dense layer transformations in (deep) neural networks, comprising fully connected neurons of the input and output layer. The N input layer neurons (or LSTM cell output states) may be arranged as a 1×1×N input map and the M output layer neurons (or next iteration LSTM cell input states) may be arranged in a 1×1×M output map. In consequence, a convolution kernel may be selected from a set of M convolution kernels, each being a 'degenerate' three-dimensional 1×1×N kernel, e.g. of width dimension one, height dimension one and depth dimension M. It is also possible to define a larger selected convolution kernel, e.g. of dimensions 3×3×N, if a minimum width and height for a selected convolution kernel has been defined for practical reasons (e.g. due to hardware reconfiguration restrictions). Then the convolution kernels may still be applied to the 1×1×N input map by using padding.

Furthermore, embodiments of the present example may also be adapted for performing sparse convolutions, e.g. in the framework of sparse convolutional neural networks. For sparse convolutions, a number of 'zero' weight factors in the convolution kernels is generally increased by a suitable constraint during learning and/or by network quantization techniques. In consequence, some of the weight factors in the selected convolution kernels do not need to be loaded and distributed to the corresponding processing element of the array and a default 'zero' initial partial result is output by the respective multiplication unit. Alternatively, the multiplication step between a distributed 'zero' weight factor of a selected convolution kernel and a data entry in the input map may be omitted at an individual processing element, whereby energy is saved at the cost of identifying 'zero' weights upfront. This sparsity with respect to weights may be extended to data entries in the input map, e.g. by quantizing a stream of incoming data entries in the input map so as to produce a greater number of 'zero'-valued data entries.

In a second aspect the present example related to a hardware system that is adapted for carrying out the steps of embodiments of the first aspect.

Figure 19:
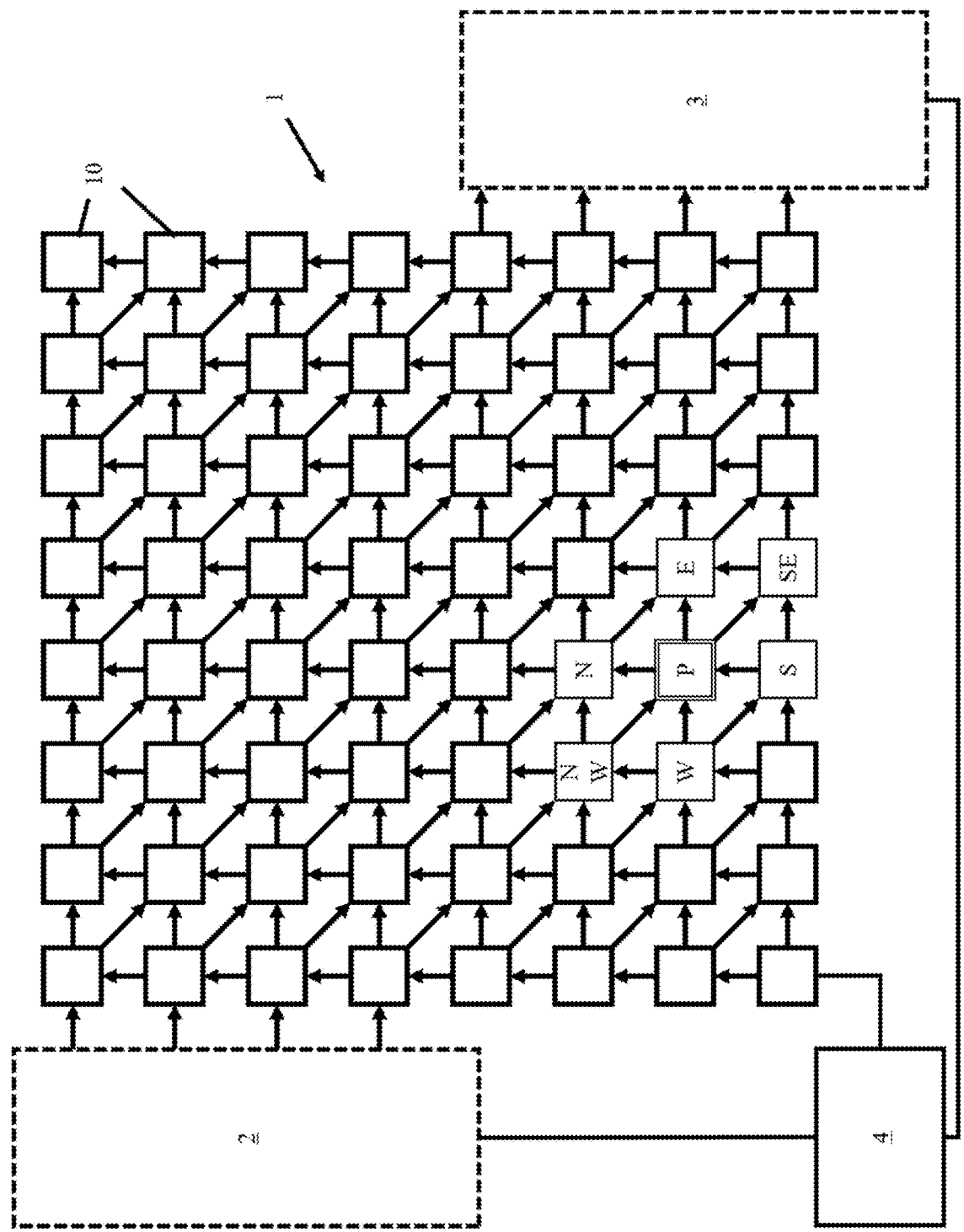
FIG. 19 shows the conceptual connections of a possible hardware system for mapping of a convolutional neural network layer, according to an example embodiment.

FIG. 19 conceptually shows a possible energy-efficient hardware system which is suitable for performing the (multi-)dimensional convolution mappings between input map and output map of a convolutional neural network layer during an interference pass, e.g. a convolution engine. The possible hardware system comprises a two-dimensional, planar array 1 of locally interconnected processing elements 10, regularly organized on a grid, e.g. all the processing elements 10 are centered at the sites of a square lattice. For the particular array 1, processing elements 10 are arranged on a regular, Cartesian grid, and topological neighborhoods are mapped onto spatial neighborhoods of the array 1. In embodiments of the present example, each processing element 10 comprises three inputs and three outputs, thereby enabling physical interconnections and unidirectional dataflows (indicated by arrows) between neighboring processing elements 10. The interconnections shown in FIG. 19 are drawn at a conceptual level and do not necessarily correspond to the physical interconnection they are enabling, e.g. the trace of a physical interconnection does not necessarily follow a straight line. In this example, processing elements 10 located at an edge of the array 1 may not receive data signals at all their inputs or may not send data signals to other processing elements at their outputs, e.g. these inputs or outputs may be inactive. Here data signal may refer to received unidirectional dataflows, to a weight factor or to an input data factor, e.g. for generating a product. However, the bulk of processing elements 10 of the array 1 makes use of all their inputs and outputs, connecting to six neighboring processing elements. The local topological connections between processing elements 10 are oriented, and so are the physical interconnections of the array 1. In FIG. 19, the unidirectional dataflows between neighboring processing elements 10 are displayed as arrows. As an example, one may consider the processing element carrying the label 'P'. Processing element 'P' has a Moore neighborhood that counts eight other processing elements 10, but only six of them (drawn with a thinner border) are connected to it. In the example, processing element 'P' receives at its inputs data from processing elements labelled as 'W', 'S' and 'NW', corresponding to unidirectional dataflows along a horizontal row direction (west-east), a vertical column direction (south-north) and an oblique, here diagonal, direction (northwest-southeast), respectively. At its outputs, processing element 'P' delivers data to processing elements labelled as 'E', 'N' and 'SE', equally corresponding to unidirectional dataflows along a horizontal row direction (west-east), a vertical column direction (south-north) and an oblique, here diagonal, direction (northwest-southeast). Although each processing element 10 is processing received data independently, thereby enabling massive parallel computation and distributed memory functionality, the communication between processing elements 10, and consequentially the unidirectional dataflows over the array 1, is subject to accurate timing. This ensures that each processing element 10 receives the correct data signals at all its connected inputs over a long enough period of time, that processing is accomplished and that a correct processing result is delivered at its output(s). Accurate timing may be achieved by an adequate global synchronization control, which takes into account factors like processing latencies and interconnection propagation delays. On the one hand, asynchronous arrays may control synchronization via strict design rules and low variability in propagation delays, latencies, etc. On the other hand, synchronous arrays achieve synchronization control through a shared clock signal delivered to all the processing elements of the array. This clock signal may trigger, for instance, a controlled update of the outputs of all processing elements in near synchrony and at regular time intervals. There exist also arrays which may not be fully synchronous and in which outputs of processing elements or groups of processing elements are updated in a controlled fashion, but sequentially instead of synchronously. In the embodiment relating to FIG. 19, the synchronization of the array 1 is handled by a global control logic 4, which is electrically connected to the processing elements 10 of the array 1. Only a connection to one processing element is shown in for better visibility but there may be more connections, e.g. one or more column busses with row branches connecting to all the processing elements 10. Alternatively, the clock signal may propagate along local clock line connections between neighboring processing elements 10 (not shown), different from the interconnections for inputs and outputs. Therefore, it is possible to broadcast or distribute a shared clock signal to all the processing elements 10 of the array 1. As an example of a synchronized array 1 which is not fully-synchronous, e.g. its processing elements 10 are not receiving a common clock signal, an array 1 employing wave-pipelining may be of advantage in cases for which synchronization signals generated by the global control logic 4 may be less frequent as compared to a clock cycle or for which generated synchronization signals may be routed to only a relevant subset or region of interest of the array 1 without a significant control overhead, rather than distributing them to all the processing elements of the array. In such cases, a more energy-efficient hardware system may be obtained.

The global control logic 4 is also electrically connected to global input means 2 and global output means 3. Global input means 2 generally provide an interface to an external memory device, e.g. DRAM or SRAM, on which the weights of the 3D+1 set of convolution kernels and the input map data, e.g. multi-channel images or multi-channel outputs from preceding network layers, are stored. Likewise, global output means 3 provide an interface to an external memory device, e.g. DRAM, on which the computed data entries in the output map of the convolution operation are stored. Both global input means 2 and global output means 3 interface a subset of processing elements 10 of the array 1 located at a boundary of the array 1. This boundary may be an edge of the array 1 that is common to both global input means 2 and global output means 3. Alternatively, a boundary may be different for global input means 2 and global output means 3, e.g. global input means 2 and global output means 3 interface the array 1 at two opposite edges. Moreover, in some embodiments of the present example, global input means 2 and/or global output means 3 may interface the array 1 in vectorized form, e.g. global input means 2 providing and applying to a subset of processing elements, located at a boundary of the array 1, one or more vectors comprising sequences of addressed data entries in the input map or global output means 3 collecting a vector comprising contiguous data entries in the output map at an edge of the array 1. Global input means 2 may include a buffer for temporarily buffering requested data entries in the input map which may be re-used during the accumulation stage of a consecutive row sweep of a selected convolution kernel. The requested input map data or convolution kernel weights being fetched from an external storage device, which may also include a network link to a distributed storage facility, the global input means 2 applies them to a subset of processing elements 10 at a boundary of the array 1, thereby starting a loading stage of the array 1 with fresh addressed data entries in the input map and/or selected convolution kernel weights. Within examples, the global input means 2 is conceived to receive streamed addressed data entries in the input map and/or selected convolution kernel weights. Depending on the target application, for example in the field of body area networks (BAN), vision or automotive, a stream of addressed data entries in the input map may last between one millisecond and tens of milliseconds before being interrupted and/or updated. A loading stage, parallel processing by the array 1 (e.g. generation of products based on pairs of weights and addressed data entries in the input map, first and second accumulation phases) and the readout stage may be run concurrently, e.g. they can be stages of a computation pipeline, which achieves higher throughput and better usage efficiency for the processing elements.

Although array 1 is more easily visualized as a 15×15 array of processing elements 10 in FIG. 19, more generally, array 1 comprises a lot more processing elements 10, e.g. of the order of thousands, tens of thousands, or even more. In some example embodiments of the disclosure, the array 1 of processing elements 10 are provided on a semiconductor substrate, e.g. as a single chip. Within examples, the whole hardware system is provided as an integrated chip. This may be achieved for a large number of processing elements because each processing element only requires very limited local storage capacities, which has the merit of reducing an area and an energy cost (recurrent and non-recurrent) of the array.

Figure 20:
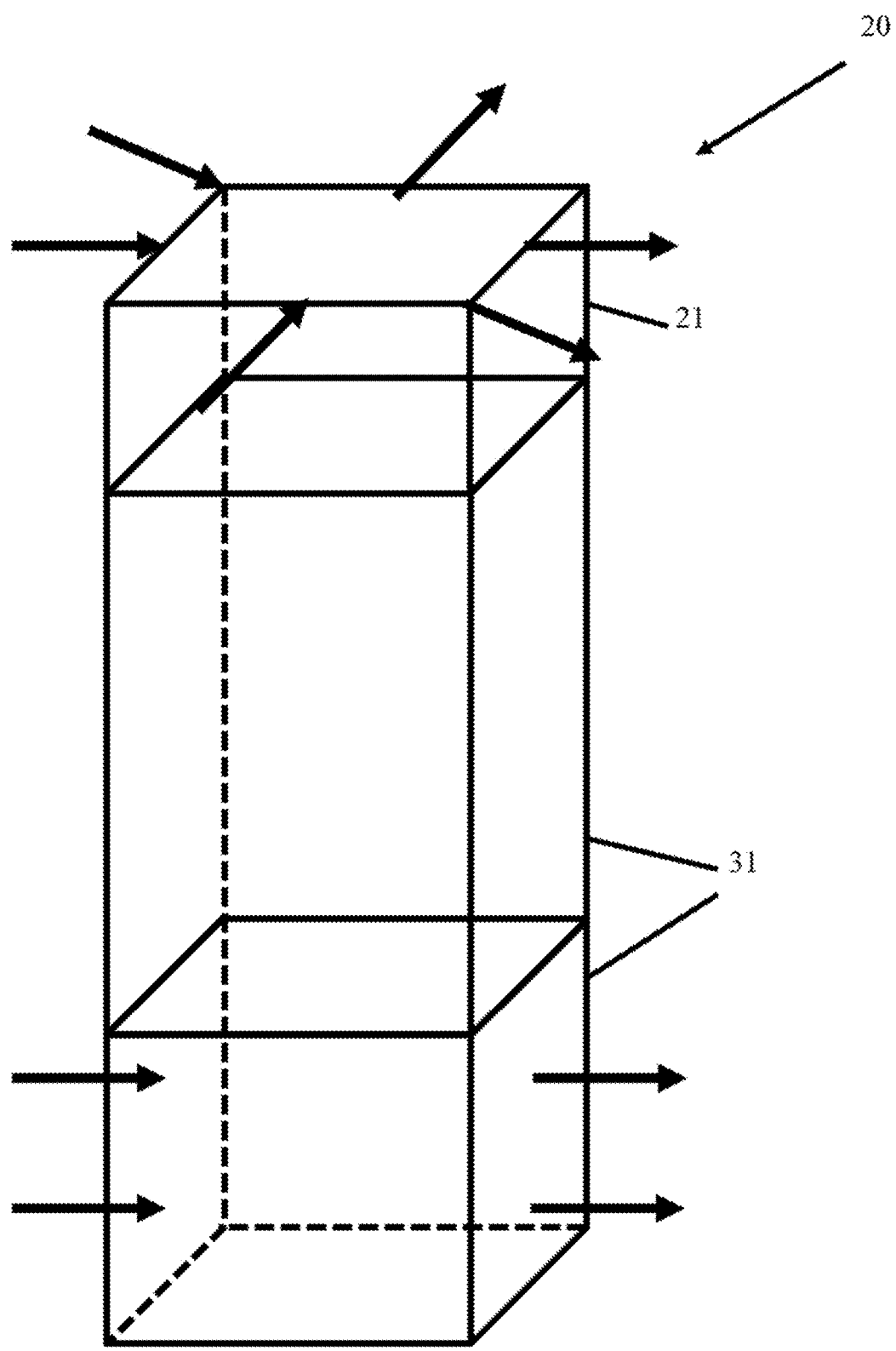
FIG. 20 shows an embodiment of a possible hardware system in which a processing element of the array has a 3D pillar structure, according to an example embodiment.

According to some embodiments of the disclosure, for example the one referred to in FIG. 20, the processing elements 20 are implemented as a 3D structure, in which functional blocks 21, 31 are stacked in a vertical direction, perpendicular to the plane of the array 1. This has the advantage of further decreasing area cost, at the benefit of stronger processing parallelism. For this embodiment, functional block 21 relates to a first logical level dealing with the accumulation of generated products and may be provided as a top tile, e.g. an all-digital top tile. Functional block 31 relates to a second logical level dealing with the generation of products based on received weight factors and input data factors representing addressed data entries in the input map. Block 31 also deals with the reception and/or interpretation (e.g. decoding) of control signal delivered by the global control logic 4 and with the reception of synchronization signals also generated by the global control logic 4. Implementing processing elements 20 as a 3D structure, e.g. a pillar, may comprise providing a back end of line (BEOL) stack, e.g. providing a BEOL stack comprising layers of TFTs on top of a semiconductor substrate, e.g. on top of a CMOS substrate. Different functional blocks may be implemented in different technology platforms, e.g. different transistor technologies such as CMOS and TFT.

In alternative embodiments of the disclosure, processing elements 10 are provided on a planar semiconductor substrate as substantially planar structures, e.g. on a CMOS chip.

Embodiments of the second aspect may comprise an array of processing elements which is characterized by a flattened 2D torus topology, e.g. a hardware system may comprise an array shown in FIG. 16, FIG. 17 or FIG. 18. This has the advantage that the array with 2D-torus connection topology is free of boundaries, at least to the extent that processing on it is concerned, even if its processing elements 10 are spatially mapped onto a planar 2D grid. Global input means 2 and global output means 3 retain their positions at the boundary of the (flattened) array. A 2D-torus interconnection topology offers the advantage of shorter latencies and higher sustainable bandwidth, as the unidirectional dataflows on such array may wind around 'the edges' many times during processing without ever leaving the array. In the absence of these cyclic interconnections, e.g. for tan array without 2D-torus interconnect topology, intermediate outputs, when they encounter a boundary of the array, would be read out by the global output means 3 at the output side, temporarily stored, and then re-applied by the global input means 2 at the input side to continue the processing.

Figure 21:
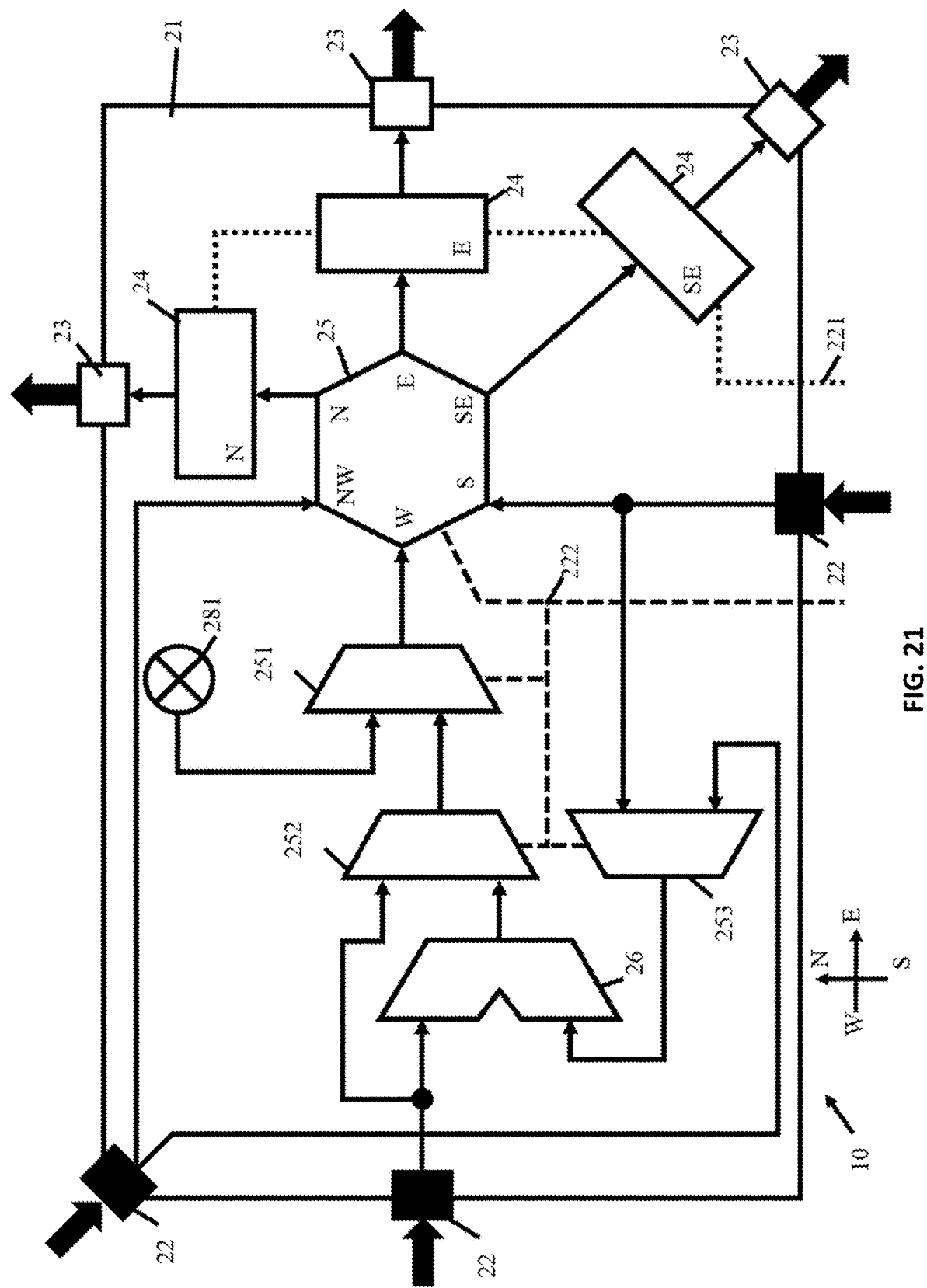
FIG. 21 shows an embodiment of a first logical level being part of a processing element in the accumulation plane, comprising a circuit for accumulating flows of partial results over the array, according to an example embodiment.

Each processing element of the array comprises a first and a second logical level. This is now described in reference to FIG. 21 and FIG. 22. A processing element 10 comprises a first logical level, e.g. a functional block 21 which may be a digital circuit, e.g. a digital circuit implemented as a top tile of a vertical 3D structure. The first logical level, e.g. functional block 21, includes three inputs 22 and three outputs 23, e.g. input and output connectors, for respectively receiving and delivering partial results during an accumulation stage. The three inputs 22 may be arranged respectively at a north-west edge, at a west edge and at a south edge of the processing element 10, as shown in FIG. 21. This corresponds to supported flow directions of unidirectional dataflows on the array 1 in FIG. 19. The at least three outputs 23 are each electrically coupled to an output of a corresponding output register 24. Values of unidirectional dataflows, being representative of partial results of the accumulation stage, are temporarily stored in the at least three output registers 24, e.g. during one computation cycle. A computation cycle may be determined by a clock cycle of a clock signal for the hardware system, or a multiple thereof. It may also be determined by two consecutive synchronization signals received by a processing element. Each output register 24 is controlled (e.g. gated) by a suitable synchronization signal 221 which is updating an internal, memorized state, e.g. a read signal which is updating the register state, also present at the register output, according to an applied input signal (e.g. high/low). The output registers 24 may temporarily store single bits or words or any other suitable representation of values carried by the unidirectional dataflows.

For the present embodiment relating to FIG. 21, processing elements are locally interconnected by direct point-to-point connections, e.g. these interconnections are hard-wired and are not configurable, which implies that values stored in the output registers 24 determine the outgoing values for each supported unidirectional dataflow, e.g. the values carried by each of the unidirectional dataflows leaving the processing element 10 immediately after having passed through it. These values may include a zero-signal, e.g. if no input signal or a zero input signal has been presented to an input of an output register, or may include a tristate-signal, e.g. if an output 23 and/or an output register 24 are effectively disconnected from a wire interconnection linking two neighboring processing elements of the array, e.g. via a received control signal requesting a tri-state. This has the advantage that unidirectional dataflows on the array may be initiated in the presence of partial results to be computed; otherwise a more energy-efficient state may be possible for a low-activity processing element. Values to be placed on the outgoing unidirectional dataflows and temporarily stored in corresponding output registers 24 may be selected, for each of the output registers 24, in a reconfigurable manner from one of the following:

- values carried by any of the incoming unidirectional dataflows received at the inputs 22 and representative of (moving) partial results of the accumulation stage,
- a generated product 281, if available, obtained by a multiplication unit 28 and being an initial partial result of the accumulation stage used to start or re-start a unidirectional dataflow,
- an updated partial result of the accumulation stage (e.g. a further completed partial sum or further completed data entry in the output map) obtained by an addition unit 26 and being a combination of two of the unidirectional dataflow values received at the inputs 22.

This selection of values for the outgoing unidirectional dataflows is governed by control signals 222 controlling a configuration state for a set of output selection means. For the present embodiment relating to FIG. 21, output selection means may comprise a reconfigurable segmented bus node 25, and two data selectors 251, 252, e.g. two multiplexers. In embodiments of the present example, control signals 222 generated by the global control logic 4 may be broadcast to the processing elements of the array or may be routed to and addressing individual processing elements via suitable control signal tags. Control signals 222 may be generated at each or some processing elements whose local control logic is adapted for executing local instruction code. Control signals 222 may be distributed by way of a dedicated control network being part of a control plane, e.g. a control plane implemented CMOS substrate at the bottom of a vertical 3D structure. The control network may mimic the flow directions of unidirectional dataflows in an accumulation plane of a first logical level when propagating between adjacent processing elements of the array. Control signals 222 in the control plane may be implemented through wave-pipelining, e.g. a control signal is admitted and received by the control logic of a processing element if a co-propagating enable signal is true and enables gating of the control signal into the control logic of the processing element.

Three outputs of the segmented bus node 25 are electrically coupled to respective inputs of the three output registers 24.

A 'south' input of the segmented bus node 25 may receive values carried by a unidirectional dataflow and applied to a 'south' input 22, e.g. values of a vertically 'S-N' oriented (e.g. along a first spatial direction 'a' of the array) fourth unidirectional dataflow 9 during a second accumulation phase illustrated in FIG. 1. Hence, a unidirectional dataflow value applied to the 'south' input 22 may be routed to the one or more output registers 24 via the segmented bus node 25, e.g. to a 'north' output register 24 for fourth unidirectional dataflows 9 during a second accumulation phase illustrated in FIG. 1. A product 281 generated by the multiplication unit 28, if available, may be directed via a first data selector 251 to a 'west' input of the segmented bus node 25 and may be routed to the one or more output registers 24, e.g. to an 'east' output register 24 for starting a first unidirectional dataflow 6 at a processing element 11 during a first accumulation phase illustrated in FIG. 1, using a stored product as initial dataflow value.

Values carried by a unidirectional dataflow and applied to a 'west' input 22, e.g. values of a horizontally 'W-E' oriented (e.g. along a third spatial direction 'c' of the array) first unidirectional dataflow 6 during a first accumulation phase illustrated in FIG. 1, may be directed via a first and second data selector 251 and 252 to a 'west' input of the segmented bus node 25 and may then be routed to the one or more output registers 24, e.g. to an 'east' output register 24 for moving values of a first unidirectional dataflow 6 between neighboring processing elements during a first accumulation phase illustrated in FIG. 1.

Values carried by a unidirectional dataflow and applied to a 'north-west' input 22, e.g. values of a diagonal 'NW-SE' oriented (e.g. along a second spatial direction 'b' of the array) second unidirectional dataflow 7 during a first accumulation phase illustrated in FIG. 1, may be directed via a 'north-west' input of the segmented bus node 25 to any of the output registers 24, e.g. to an 'south-east' output register 24 for moving values of a second unidirectional dataflow 7 between neighboring processing elements during a first accumulation phase illustrated in FIG. 1.

The functional block 21 of the first logical level further comprises an addition unit 26, e.g. an adder or adder tree (e.g. a 16-bit adder) for combining the values carried two received unidirectional dataflows received at inputs 22. An output of the addition unit 26 is selectively coupled to a 'west' input of the segmented bus node 25, via the configurable first and second data selector 251, 252, and may thus be directed to any of the output registers 24. A third data selector 253 provides one of the values received at the 'south' input 22 or the 'north-west' input 22 to an input of the addition unit 26; a second input to the addition unit 26 stems directly from a unidirectional dataflow value received at the 'east' input 22. In consequence, the processing element 10 is adapted to combine the values of two received unidirectional dataflows into a new value of any of the supported outgoing unidirectional dataflows.

For instance, in the embodiment referring to FIG. 21 and also to flow directions in FIG. 1, a value of a horizontally oriented 'W-E' dataflow (e.g. oriented along a third spatial direction 'c' of the array), being representative of a partial accumulation result (e.g. an incomplete partial sum), may be combined with a value of a diagonally oriented 'NW-SE' dataflow (e.g. oriented along a second spatial direction 'b' of the array), being representative of a partial accumulation result (e.g. a product further completing an incomplete partial sum). A resulting combination may then be routed to the 'east' output register 24, e.g. as an updated value of an outgoing 'W-E' dataflow. This describes the combination of the first and second unidirectional dataflows 6 and 7 at processing elements 12 in FIG. 1 during the first accumulation phase. Another example may be given by the combination of a value of a horizontally oriented 'W-E' dataflow (e.g. oriented along a third spatial direction 'c' of the array), being representative of a partial accumulation result (e.g. an incomplete data entry in the output map), with combined with a value of a vertically oriented 'S-N' dataflow (e.g. oriented along a first spatial direction 'a' of the array), being representative of a partial accumulation result (e.g. a partial sum further completing an incomplete data entry in the output map). Directing the resulting combination through the first and second data selector 251, 252 and the segmented bus node 25 and storing it in the 'east' output register 24 as a value to be carried by the 'W-E' dataflow leaving the processing element 10 at the next computation cycle, correctly describes the combination of the third and fourth unidirectional dataflows 8 and 9 at processing elements 15 in FIG. 1 during the second accumulation phase.

Figure 22:
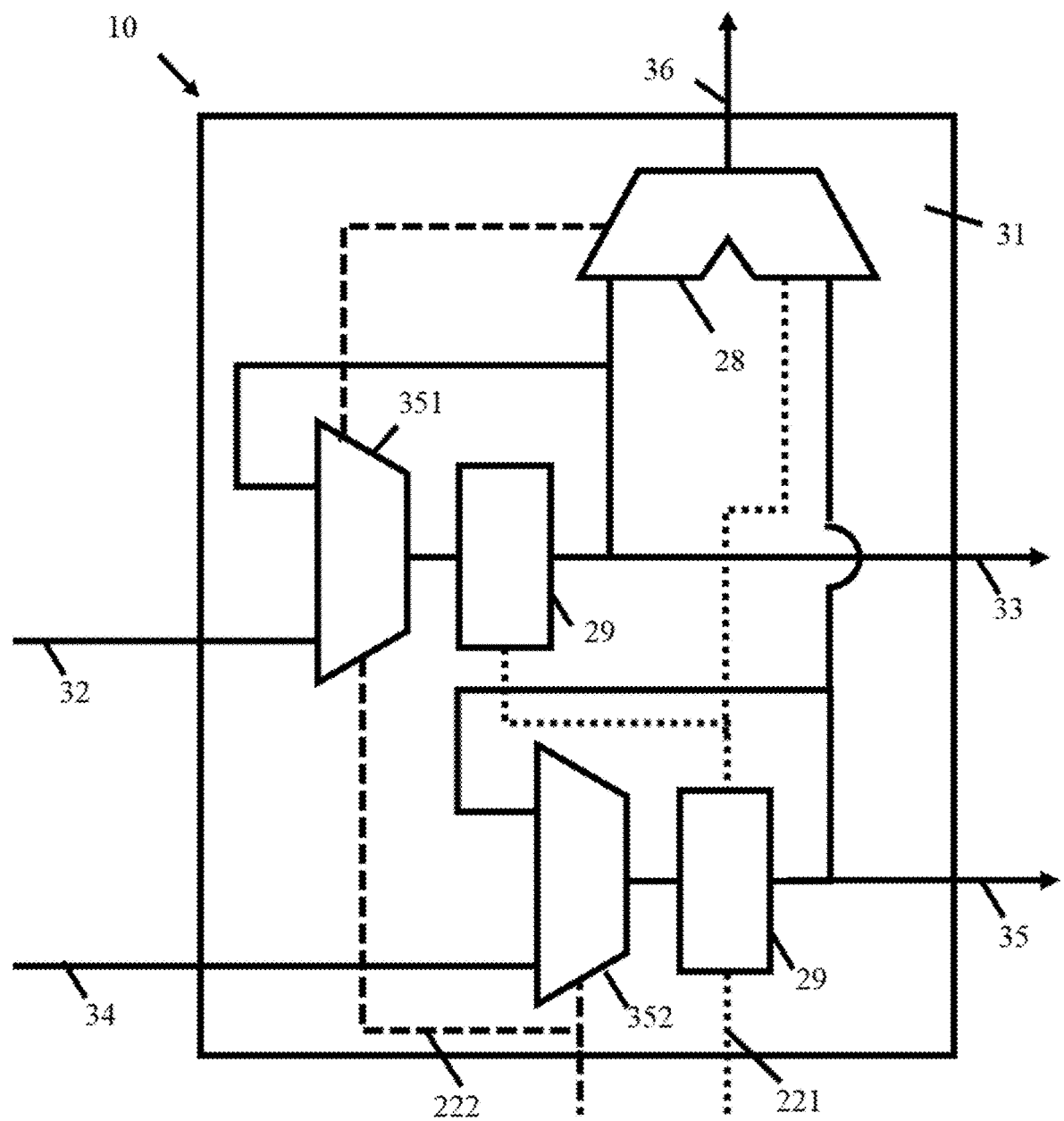
FIG. 22 shows a second logical level being part of a processing element, according to an example embodiment.

Referring now to FIG. 22, a second logical level included in a processing element 10 is shown. The second logical level may be provided as a functional block 31 comprising electronic devices, e.g. a digital circuit implemented in a vertical 3D structure, e.g. in a BEOL stack comprising TFT layers and a base on a semiconductor substrate. The second logical level, e.g. functional block 31, may comprises a weight input 34 for receiving a weight of a selected convolution kernel and an activation input 32 for receiving an addressed data entry in the input map. Both the weight input 34 and the activation input 32 may be connected to existing wire interconnects between neighboring processing elements, e.g. they may share the same interconnects that are used to move values of unidirectional dataflows related to the first logical level, e.g. oblique interconnects oriented along a 'NW-SE' direction (e.g. oriented along a second spatial direction 'b' of the array in FIG. 1) enabling 'NW-SE' dataflows (e.g. second unidirectional dataflows 7 in FIG. 1). Alternatively, the weight input 34 and the activation input 32 may be connected to dedicated wire interconnects between neighboring processing elements associated with the second logical level. These dedicated wire interconnects between neighboring processing elements may be oriented along a 'NW-SE' direction (e.g. oriented along a second spatial direction 'b' of the array in FIG. 1) enabling 'NW-SE' flows of weights and/or data entries in the input map. A storage element 29 of the second logical level is adapted for storing received weights and/or received addressed data entries in the input map during at least one computation cycle. For instance, storage element 29 may consist of two registers respectively coupled to the weight input 34 or the activation input 32. However, depending on a configuration state of a fourth data selector 351 or a fifth data selector 352, an internal feedback from an output of a register of the storage element 29 back to its input may be created. Therefore, a circular shift register may be effectively established and a previously received weight and/or addressed data entry in the input map may be stored by the storage element 29 longer than just a single computation cycle. For the present embodiment this configuration implies that another received weight and/or another data entry in the input map is stored in the storage element 29 cannot be stored any longer, unless the fourth and/or fifth data selector 351, 352 have their configuration changed by suitable control signals 221. But this does not have to be the case for different embodiments of the present example. Synchronization signals 221 generated by the global control logic 4 determine a moment in time at which a received or fed back weight and/or addressed data entry in the input map is stored in the storage element 29, e.g. by updating internal states of the two registers of the storage element 29 with an applied input signal, and made available at an output of the storage element 29. At the same time, since available outputs of the storage element 29 are coupled to weight output 35 and activation output 33, both may be included in the second logical level, the synchronization signals also determine the moments in time at which a stored weight and/or a stored addressed data entry in the input map is propagating, along an existing or dedicated wire interconnect, to a next connected processing element. In other embodiments, not relating to FIG. 22, wave-pipelining may be used to send and apply a weight and/or an addressed data entry in the input map to a receiving processing element, this wave-pipelining being orchestrated by the global control logic, e.g. by generating a sequence of enable signals co-propagating with a weight and/or an addressed data entry in the input map moving towards its destination processing element. In such alternative embodiments, the synchronization signals 221 may briefly gate a moving weight and/or a moving addressed data entry in the input map onto an otherwise floating transistor gate where they are stored as charges, e.g. onto a gate of a thin film transistor of the BEOL stack, e.g. a low-leakage TFT implemented in an IGZO material. Hence, a storage element 29 may also be provided by a transistor a gate of which can be made floating. This has the advantage that a weight and/or an addressed data entry in the input map may be stored for several computation cycles within the second logical level of a processing element of the array in a low-leakage manner, not needing a regular refresh cycle. This reduces energy costs and control complexity. Fourth and fifth data selectors 351 and 352, e.g. data multiplexers, are an example of factor selection means the second logical level may also include. They ensure that a particular weight is selected from a flow of many received weights and that a particular data entry in the input map addressed by this weight is selected from a flow of many received data entries in the input map. The selected weight and the selected data entry in the input map form a pair of factors of one product of the plurality of products that are generated and stored on processing elements of at least one parallelogram set. To achieve this, the first received factor (e.g. the weight to be selected or the data entry in the input map to be selected) of the two factors is stored by the storage element 29 for as long as it takes for the second factor to be received. Control signals 222 generated by the global control logic 4 appropriately control the configuration state of the fourth and fifth data selector 351, 352 to this end. The second logical level further comprises a multiplication unit 28, two input of which are respectively coupled to a corresponding output of the storage element 29 (e.g. each input being coupled to an output of a register), for generating a product of the plurality of products associated with each data entry in the output map according to methods of the first aspect of the disclosure. The multiplication unit 28, e.g. a digital multiplier circuit, may generate a product at the end of a loading stage and at the beginning of the accumulation stage, based on the two selected and stored factors, e.g. the particular weight and the matching data entry in the input map stored by the storage element 29. A generated product is applied to an output 36 which connects the second logical level to the first logical level.

It is an advantage of embodiments of the present example that there are only a small number of output registers, e.g. three, for each processing element of the array and that each output register stores a value of one of the unidirectional dataflows. So no larger buffers (realized e.g. by distributed SRAMs) are required for implementing and sustaining dataflows for a 3+1D convolution "tensor". Hence, a distributed form of array memory is provided by each one of the processing elements and each processing element only requires little amount of memory (e.g. registers, but no SRAM or local FIFO buffers), which reduces a surface area of a single processing element. Therefore, an example hardware system may have good scaling behavior and comprise many thousands or tens of thousands of processing elements.

Wire interconnections and electronic elements comprised by the functional blocks 21, 22 may be adapted to support at least 8-bit accuracy of the accumulated data entries in the output map, the applied weights of selected convolution kernels or the addressed data entries in the input map. However, embodiments of the present example are not limited thereto and may, for example, also be adapted to provide an energy-efficient implementation for binary convolutional neural network layers, in which weights of a selected convolution kernel and addressed data entries in the input map are given in a binary representation, e.g. as single bits. For such particular embodiments it may be advantageous to reduce a number of bit lines along data paths, e.g.

along wire interconnection between neighboring processing elements of the array or inside electronic components of each processing element, resulting in a more compact device with less wiring complexity and reduced energy consumption.

While the disclosure has been illustrated and described in detail in the drawings and foregoing description, such illustration and description are to be considered illustrative or exemplary and not restrictive. The foregoing description details certain embodiments of the disclosure. It will be appreciated, however, that no matter how detailed the foregoing appears in text, the disclosure may be practiced in many ways. The disclosure is not limited to the disclosed embodiments.

Figure 8:
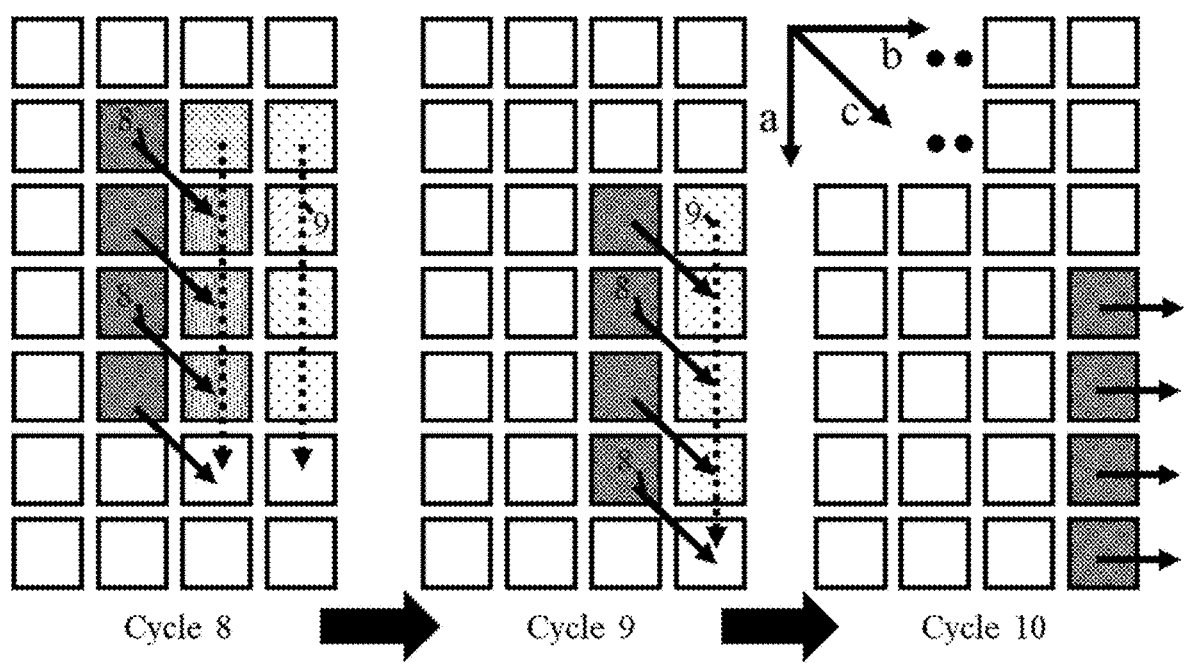
FIG. 7 and FIG. 8 illustrate unidirectional dataflows of the first and second accumulation phases for interleaved parallelogram sets of processing elements and alternative spatial directions of the array, according to an example embodiment.
Figure 7:
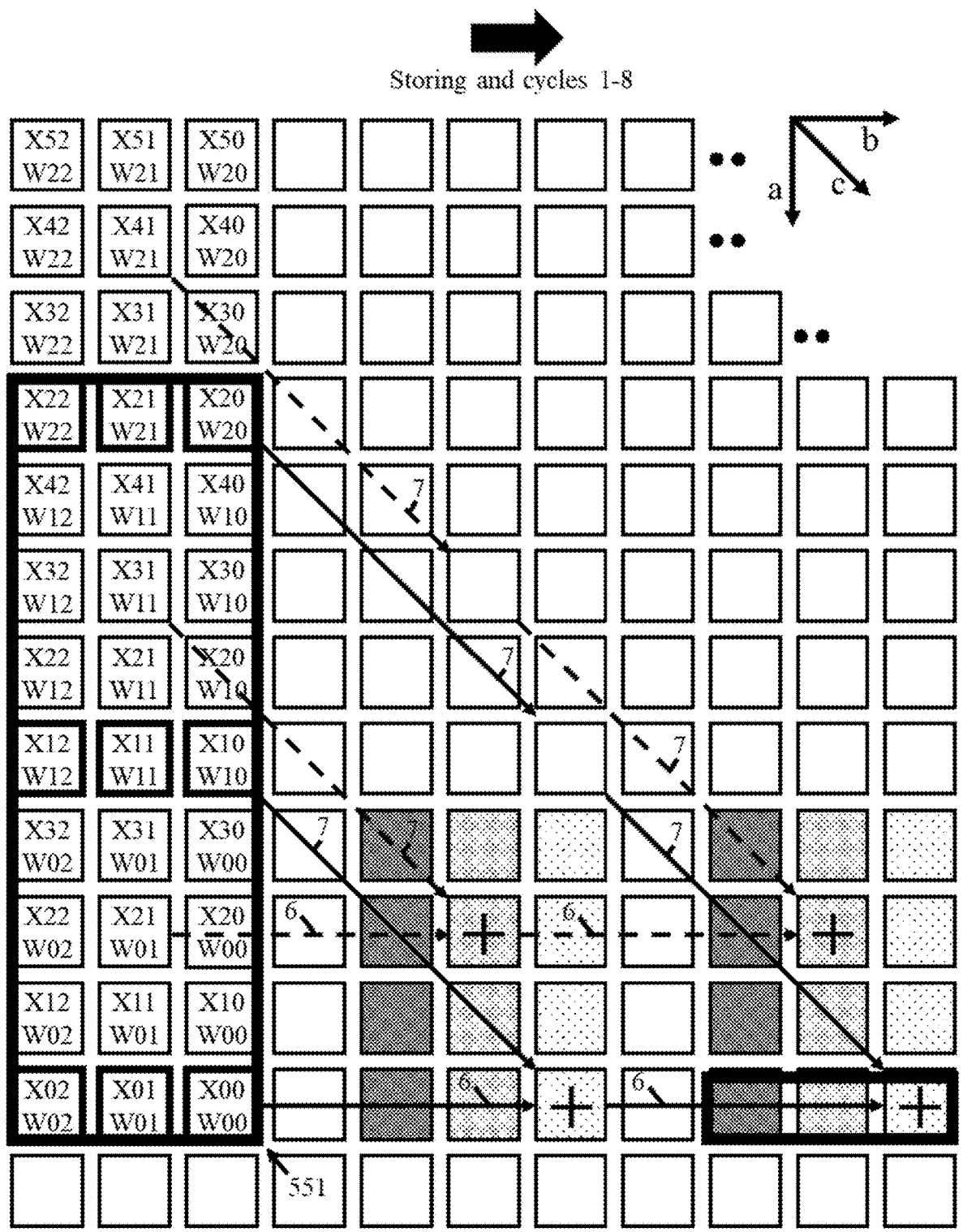

For example, it is possible to perform aspects of the disclosure in an embodiment wherein the spatial distribution of stored products and the unidirectional flow direction on a square grid array are different from the embodiments discussed so far. For example, in the embodiment related to FIG. 7 and FIG. 8, the parallelogram set 551 of processing elements is of rectangular shape and contains nine products, stored in nine processing elements (thick border outline) of the array, which are associated with a single data entry $Y\_11$ in the output map obtained for a two-dimensional input map X and a 1×3×3 convolution kernel W. As for the second case B in FIG. 4, for which dataflows during the accumulation phases are shown in FIG. 5 and FIG. 6, four such rectangularly shaped parallelogram sets are only partially filled and are interleaved along a first spatial direction 'a' of the array for producing four contiguous data entries in the output map at the end of the second accumulation phase. In FIG. 7 too, the products of each parallelogram set that are associated with a first dimension of the convolution kernel, e.g. its rows, are distributed along a first spatial direction 'a' of the array and the products of each parallelogram set that are associated with a second dimension of the convolution kernel, e.g. its columns, are distributed along a second spatial direction 'b' of the array. Whereas the first spatial direction 'a' of the array corresponds to a vertical direction in both the embodiments in FIG. 5 and in FIG. 7, the second spatial direction 'b' for the embodiment related to FIG. 7 corresponds to a horizontal direction and not a diagonal direction as in FIG. 5. These differences are the result of a different choice of spatial mapping directions of the plurality of temporarily stored products (e.g. initial partial sums) during the product loading stage. Although the first and second unidirectional dataflows bear a lot of resemblance between these two embodiments, there are differences concerning their spatial orientation with respect to the directions defined on the array of processing elements. For instance, first and third unidirectional dataflows 6, 8 of the embodiment in FIG. 5 and FIG. 6 are oriented along the third spatial direction 'c' of the array, whereas first unidirectional dataflows 6 and third unidirectional dataflows 8 of the embodiment in FIG. 7 and FIG. 8 are oriented along the second spatial direction 'b' and along the third spatial direction 'c' of the array, respectively. While second unidirectional dataflows 7 of the embodiment in FIG. 5 are oriented along the second spatial direction 'b' of the array, second unidirectional dataflows 7 of the embodiment in FIG. 7 are oriented along the third spatial direction 'c' of the array. New data entries of the input map and/or new weights of a selected convolution kernel or even pre-generated products may be applied, e.g. streamed in, at a subset of processing elements located at the boundary of the array, and thereafter, be delivered to the processing elements of the at least one parallelogram set where they are stored and/or used for generating the plurality products. Existing interconnections between processing elements for unidirectional dataflows along the second spatial direction 'b' of the array may be used for delivering the pre-generated products or product factors. Alternatively, dedicated, different interconnections between processing elements may be used if they support unidirectional flows of data along the second spatial direction 'b' of the array for the purpose of data loading and data distribution to the storing processing elements of the array. Compared to the embodiment in FIG. 5, the embodiment in FIG. 7 provides a more regular version of the parallelogram sets which simplifies their stacking, interleaving and tiling. By contrast, the data movements during the second accumulation phase of the embodiment in FIG. 8, as compared to the embodiment in FIG. 6, are such that they lead to final output locations of the accumulated data entries in the output map which are slightly more difficult to plan or schedule for a variety of convolutional layer mappings. Moreover, the embodiment in FIG. 5 has the advantage of being more energy-efficient in terms of the number of control signals being sent to the processing elements of the array at the end of the first accumulation phase to configure them correctly for the starting third and fourth unidirectional dataflows 8, 9 at the beginning of the second accumulation phase. For example, the processing elements temporarily storing the initial values of the incomplete data entries in the output map at the beginning of the second accumulation phase, e.g. the leftmost sets of patterned processing elements storing the completed partial sums and associated with the vertices of the four (collapsed) interleaved parallelogram sets at the eighth computation cycle, are already having the right configuration for the embodiment in FIG. 6; the third unidirectional dataflows 8 are oriented along the third spatial direction of the array 'c' and, therefore, may simply continue the first unidirectional dataflows 6 at those processing elements. For the embodiment of FIG. 8, however, the situation is such that third dataflows 8, despite being oriented along the third spatial direction 'c' of the array too, do not coincide with an orientation of the first unidirectional dataflows 6 that were present at those processing elements at the end of the first accumulation phase.

Previous embodiments of the present example showed regularly interleaved parallelogram sets, in which the corresponding member processing elements are iterated sequentially with a spatial period along the first spatial direction 'a' of the array, the spatial period being equal to the number of interleaved parallelogram sets, e.g. four. For instance, starting from the base of the first out of four parallelogram sets, the following sequence of products of period four may be observed when stepping along consecutive processing elements in a first spatial direction 'a' of the array: product P0R0–P1R0–P2R0–P3R0–P0R1–P1R1–P2R1–P3R1–P0R2– . . . . Here the shorthand notation 'P#R#' refers to products associated with one of the four parallelogram sets and a particular row of the selected convolution kernel, e.g. 'P1R0' refers to the stored product that is associated with the second parallelogram set (counting from zero) and a weight of the first row of the selected convolution kernel W. One recognizes that this specific way of distributing the stored plurality of products has the advantage that weights of a selected convolution kernel, e.g. $W\_00$, are constant over one spatial period of processing elements storing the corresponding products, e.g. associated with row 'R0' of the selected convolution kernel. This is of advantage in embodiment for which the product factors, e.g. the weights and data entries in the input map, are first sent to the processing elements which then generate the products locally and in a distributed manner before storing them. Being capable of providing a local fan-out for weights at a boundary of the array, where they are applied to processing elements for generating a product or passing them to a connected next processing element along a second spatial direction 'b' of the array, reduces wiring complexity, I/O control complexity and energy per area overhead. Moreover, a sequence of data entries in the input map, distributed for product generation and storage along consecutive processing element in a first spatial direction 'a' of the array, may be conveniently provided in a vectorized way, e.g. an data entry input vector of length four corresponding to input data entries of a same column and four consecutive rows in the input map. However, a vectorized input of data entries in the input map repeats some of the data entries in each vector at different spatial locations on the grid, e.g. 'P1R0' and 'P0R1' both contain a factor X_10 as can be seen in case B of FIG. 4, but X_10 of 'P1R0' will be member of a first vector of input data entries V0=[X_00, X_10, X_20, X_30], whilst X_10 of 'P0R1' will be member of a second vector of input data entries V1=[X_10, X_20, X_30, X_40]. Therefore, providing a good local fan-out for data entries in the input map at a boundary of the array too, proves to be more difficult to achieve and typically involves more wiring complexity and I/O control complexity. This difficulty is overcome in the exemplary embodiment of FIG. 9. In comparison to previous embodiments, the present embodiment related to FIG. 9 is distributing the plurality of stored products differently over the processing elements along the first spatial direction 'a' of the array, e.g. the distribution of stored products associated with selected convolution kernel rows is changed, but still in accordance with embodiments of the present example.

Figure 9:
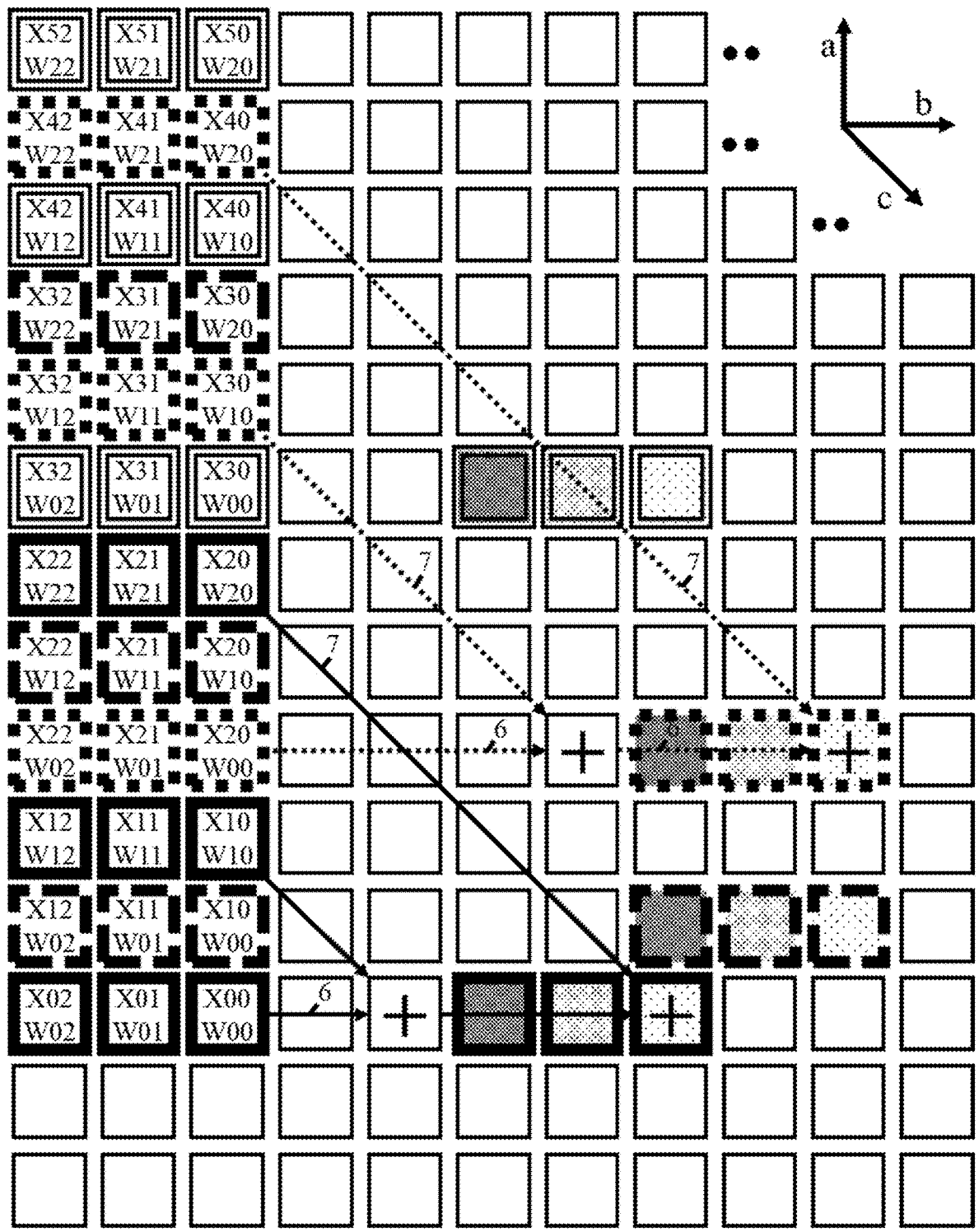
FIG. 9 and FIG. 10 illustrate unidirectional dataflows of the first accumulation phase for alternatively interleaved parallelogram sets and two different choices of parallelogram bases, according to an example embodiment.

FIG. 9 illustrates an embodiment of the present example for which the processing elements of the two-dimensional array are arranged on the sites of a regular square lattice serving as a regular grid. The plurality of products stored on a larger parallelogram set are obtained by interleaving four partially filled parallelogram sets (e.g. the four parallelogram sets in FIG. 9 whose members are identified by their shared border outline style) of processing elements. It is observed that for the square lattice/grid, the parallelogram sets take a rectangular shape. Four contiguous data entries in the output map are associated with the plurality of stored products, each of the products being generated (e.g. by the processing element used for storing the product) based on an input pair comprising a weight of a selected convolution kernel and a data entry in the input map. In the present example, the input map, X, and the selected convolution kernel, W, are two-dimensional, W being of size 1×3×3. Stored products of the plurality of generated products associated with a first dimension of the selected convolution kernel, being its rows, are distributed along a first spatial (e.g. vertical) direction 'a' of the array and stored products of the plurality of generated products associated with a second dimension of the selected convolution kernel, being its columns, are distributed along a second spatial (e.g. horizontal) direction 'b' of the array. A pre-determined first flow direction for the first unidirectional dataflows 6 is oriented along the second spatial direction 'b' of the array and a pre-determined second flow direction for second unidirectional dataflows 7 is oriented along the third spatial (e.g. oblique/diagonal) direction 'c' of the array. The way the stored plurality of products are distributed in FIG. 9 has the effect that addressed data entries in the input map, e.g. X_30, are constant over a number of processing elements storing the corresponding products, e.g. the products associated with rows 'R0', 'R1' and 'R2' of the selected convolution kernel. This is of advantage in embodiment for which the product factors, e.g. the weights and data entries in the input map, are first sent to the processing elements which then generate the products locally and in a distributed manner before storing them. Being capable of providing a local fan-out for data entries in the input map at a boundary of the array, where they are applied to processing elements for generating a product or passing them to a connected next processing element along a second spatial direction 'b' of the array, reduces wiring complexity, I/O control complexity and energy per area overhead. However, it is understood from FIG. 9 that the locality of a repeated data entry in the input map is accompanied by a more complex spatial distribution of the completed partial sums at the end of the first accumulation phase. Whereas embodiments related to FIG. 7 and FIG. 8 demonstrate that contiguous data entries in the output map may be obtained for a column of processing elements of the array that are contiguous in space (e.g. a sequence of grid points), which has the merit that the contiguous data entries in the output map (e.g. four) are easily read out in a vectorized manner as well (e.g. as data output vectors of length four), applying the same unidirectional dataflows of the second accumulation phase to the embodiment shown in FIG. 9 leads to completed data entries in the output map obtained at four non-adjacent processing elements of the array. An efficient collection of the computed data entries in the output map at a boundary of the array, in this case, may involve the generation and distribution of more control signals during a readout stage.

Figure 10:
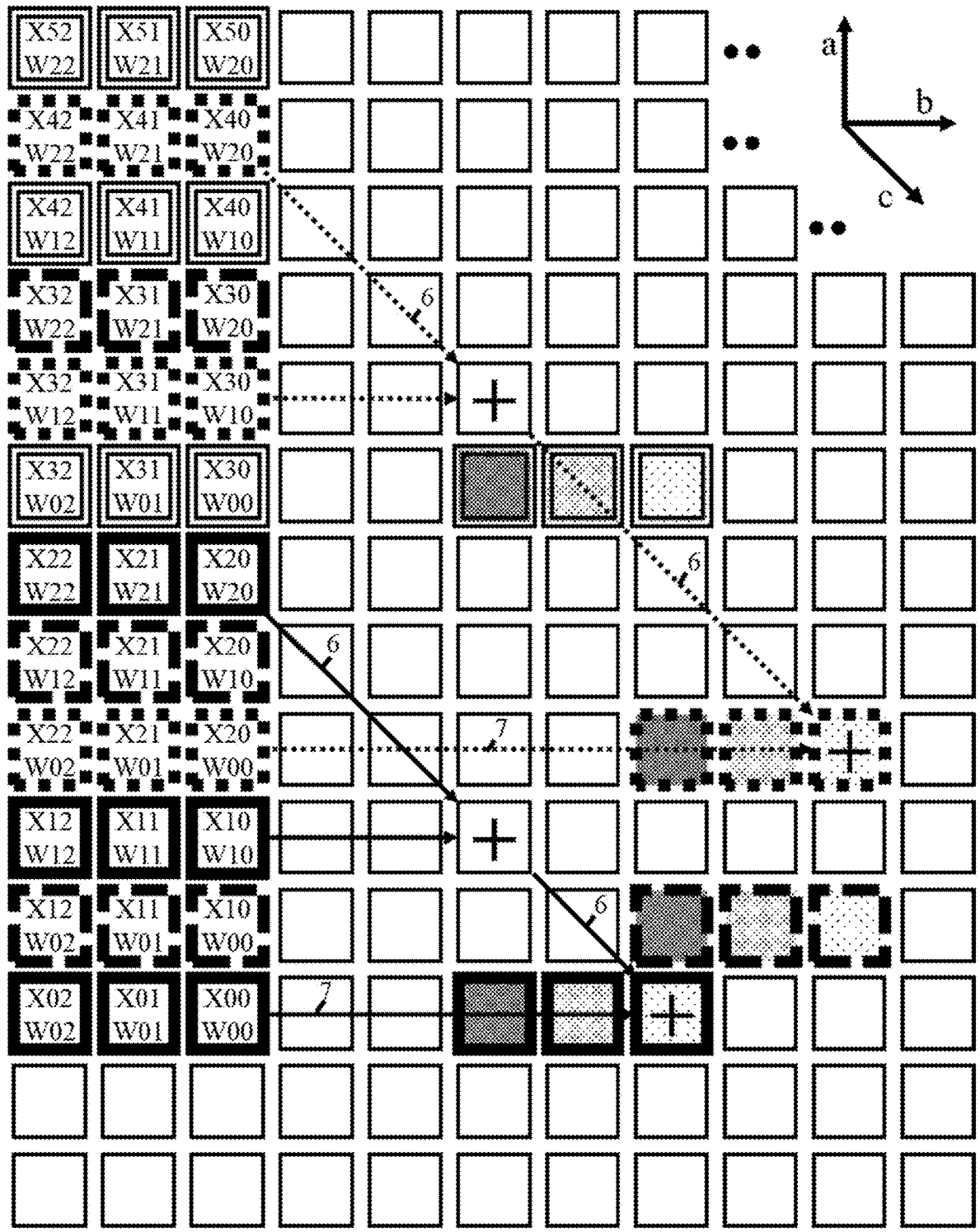

FIG. 10 illustrates a variation of the aforementioned embodiment of FIG. 9. It is different in that the first and second flow direction for the first and second unidirectional dataflows 6, 7 are interchanged, e.g. first unidirectional dataflows 6 are now oriented along the third spatial direction 'c' of the array and second unidirectional dataflows 7 are oriented along the second spatial direction 'b' of the array. Furthermore, the processing elements, associated with one of the parallelogram bases, for which first unidirectional dataflows 6 are started, are now determined by the other one of the two sides of a side pair of each parallelogram as new parallelogram bases. Remarkably, this reconfiguration of the processing elements of the array at the start of the first accumulation phase does not affect the locations at which the completed partial sums are obtained at the end of the same.

Figure 11:
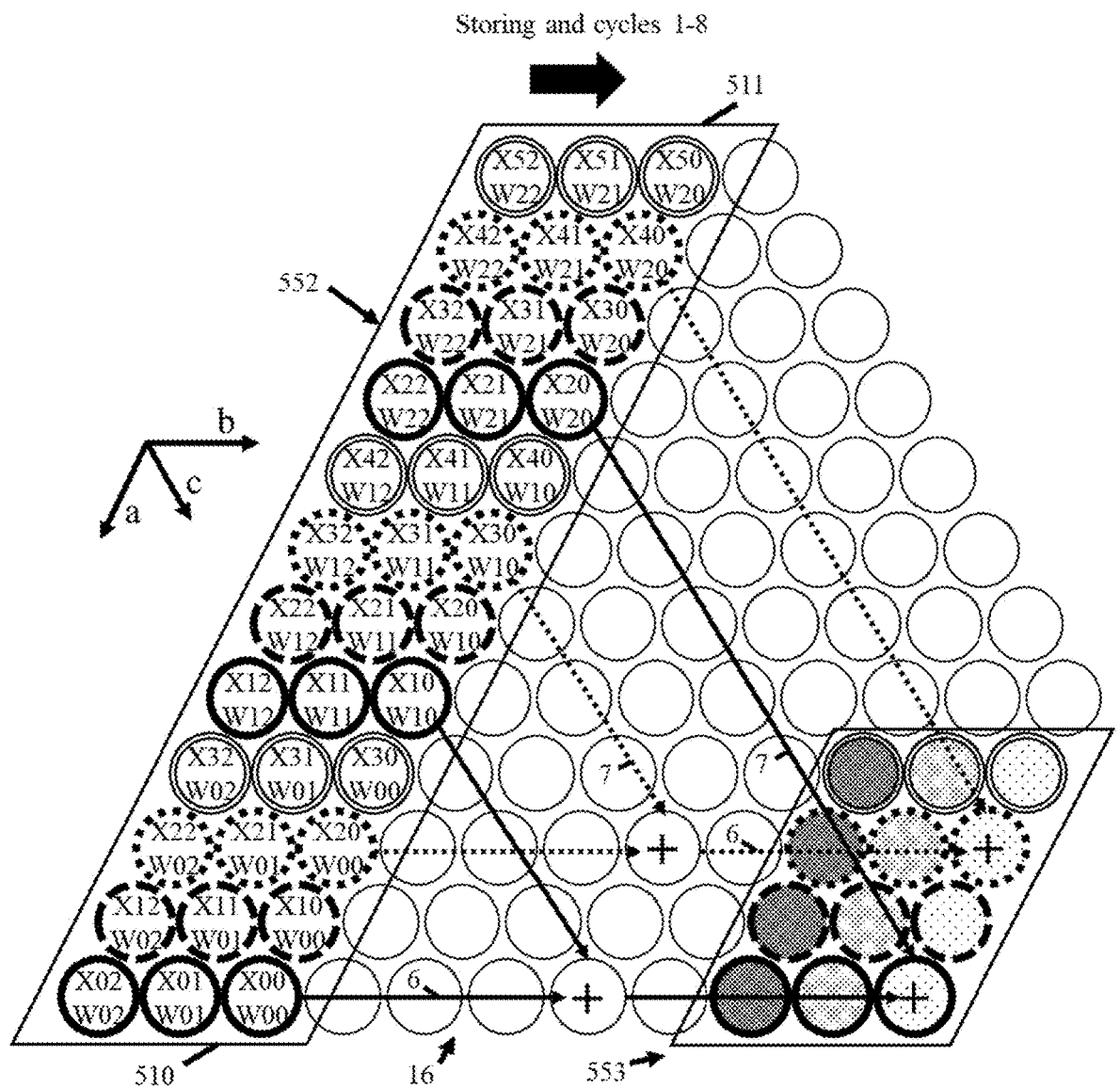
FIG. 11 and FIG. 12 illustrate the distribution of temporarily stored products, unidirectional dataflows and accumulation phases in another topology based on a hexagonal array of processing elements for mapping data entries of an input map to a data entry of an output map in a convolutional layer of a neural network, according to an example embodiment.
Figure 12:
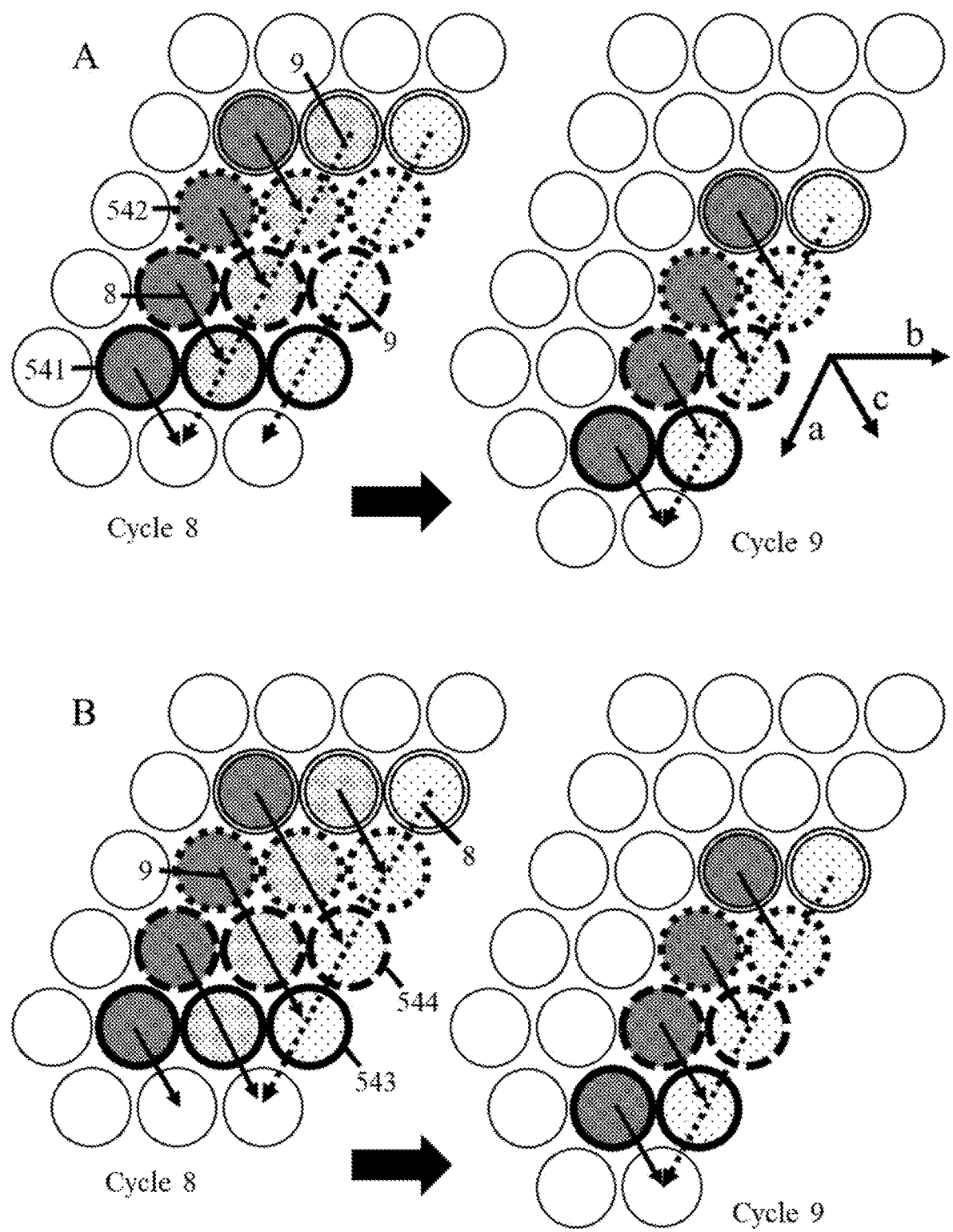

FIG. 11 and FIG. 12 illustrate an embodiment of the present example for which the processing elements of the two-dimensional array are arranged on the sites of a regular hexagonal lattice 16 serving as a regular grid. The plurality of products stored on a parallelogram set 552 are obtained by interleaving four partially filled parallelogram sets (e.g. the four parallelogram sets in FIG. 11 whose members are identified by their shared border outline style) of processing elements. Four contiguous data entries in the output map are associated with the plurality of stored products, each of the products being generated (e.g. by the processing element used for storing the product) based on an input pair comprising a weight of a selected convolution kernel and a data entry in the input map. In the present example, the input map, X, and the selected convolution kernel, W, are two-dimensional, W being of size 1×3×3. Stored products of the plurality of generated products associated with a first dimension of the selected convolution kernel, being its rows, are distributed along a first spatial (e.g. oblique) direction 'a' of the array and stored products of the plurality of generated products associated with a second dimension of the selected convolution kernel, being its columns, are distributed along a second spatial (e.g. horizontal) direction 'b' of the array. A pre-determined first flow direction for the first unidirectional dataflows 6 is oriented along the second spatial direction 'b' of the array and a pre-determined second flow direction for second unidirectional dataflows 7 is oriented along the third spatial direction 'c' of the array. Here, spatial directions 'a', 'b' and 'c' of the array are separated by a 60 degree angle or a 120 degree angle. Under the action of the first and second dataflows 6, 7, e.g. their respective updating and shifting actions on values carried by the first and second dataflows, the larger parallelogram set 552 has shrunk in size, e.g. by the collapse of its four interleaved constituent parallelograms to their respective bases along 'b', to a smaller parallelogram 553 at the end of the eight computation cycle terminating the first accumulation phase. FIG. 12 shows the result after one computation cycle of the second accumulation phase starting with the final configuration of the unidirectional dataflows at the end of the first accumulation phase. Four contiguous data entries in the output map are obtained after another one computation cycle of the second accumulation phase. In a first case A of FIG. 12, the pre-determined third flow direction for third unidirectional dataflows 8 is along the third spatial direction 'c' of the array and the pre-determined fourth flow direction for fourth unidirectional dataflows 9 is along the first spatial direction 'a' of the array. For case A, third unidirectional dataflows 8 are started at the leftmost vertices of the four collapsed parallelogram bases, e.g. at vertex 541 and vertex 542, corresponding to vertices of the initially stored, four partially filled parallelograms before accumulation that have a 60 degree angle associated with it. However, for a second case B of FIG. 12, the pre-determined third flow direction for third unidirectional dataflows 8 is along the first spatial direction 'a' of the array and the pre-determined fourth flow direction for fourth unidirectional dataflows 9 is along the third spatial direction 'c' of the array. For case B, third unidirectional dataflows 8 are started at the rightmost vertices of the four collapsed parallelogram bases, e.g. at vertex 543 and vertex 544, corresponding to vertices of the initially stored, four partially filled parallelograms before accumulation that have a 120 degree angle associated with it. A person who is skilled in the art will recognize that the same shrunk parallelogram 553 may be obtained by interchanging a first and second flow directions for the first and second unidirectional dataflows 6, 7 (e.g. a pre-determined first flow direction along the third spatial direction 'c' for first unidirectional dataflows 6 and a pre-determined second flow direction along the second spatial direction 'b' for second unidirectional dataflows 7) and at the same time selecting the upper parallelogram base 511 instead the lower parallelogram base 510 as a reference line for starting first unidirectional dataflows 6. Such a configurational change, similar to the one explained in respect of FIG. 9 and FIG. 10, would take benefit of the most recent flow direction at each processing element when stepping from the first accumulation phase to the second accumulation phase. For instance, in case A of FIG. 12, and even more in case B, several processing elements temporarily storing the completed partial sums obtained at the end of the first accumulation phase would then already support unidirectional dataflows along the third spatial direction 'c'. Hence, less control signals for reconfiguring flow directions at these processing elements will be required.

Figure 13:
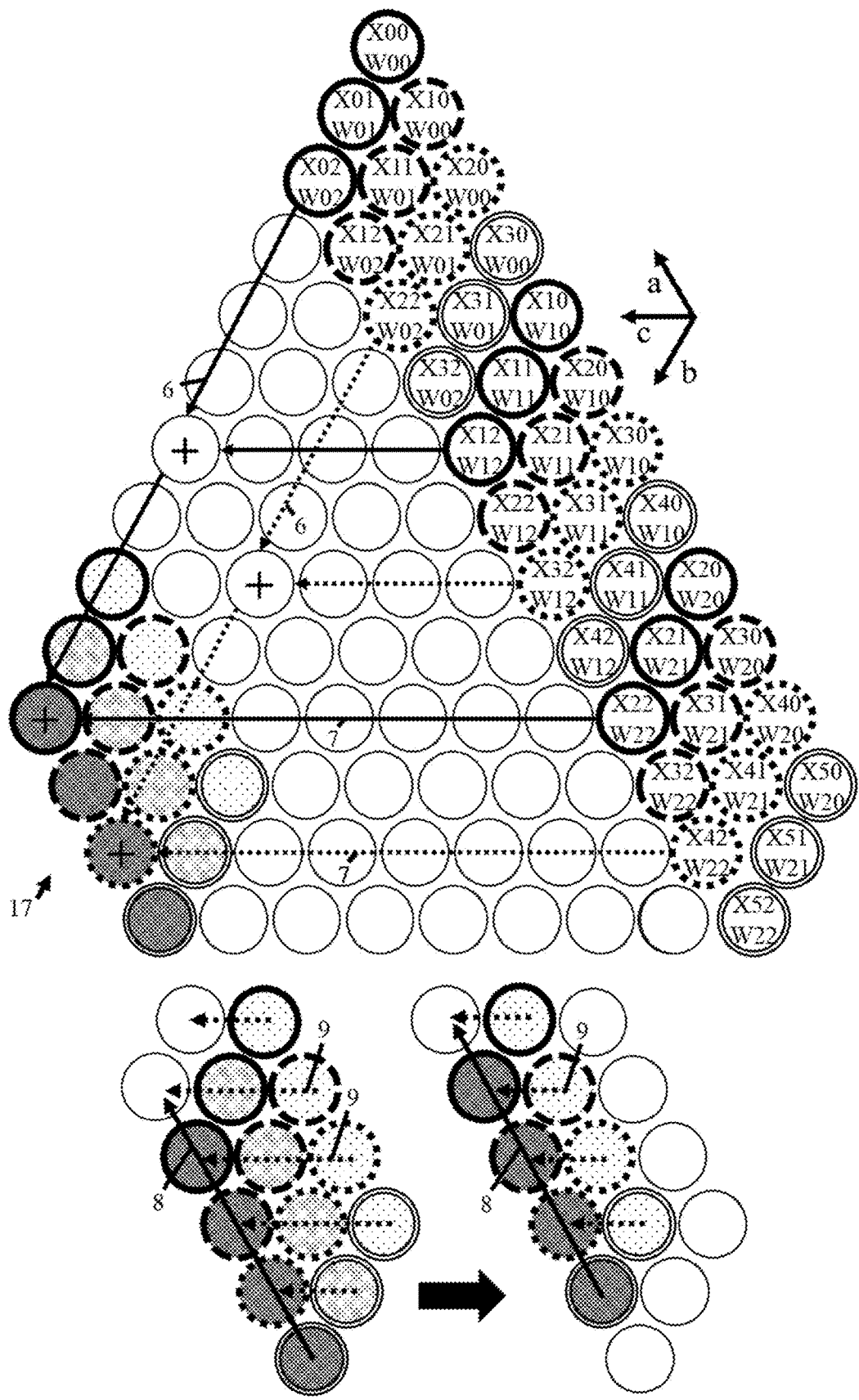
FIG. 13 shows an alternative distribution of temporarily stored products, unidirectional dataflows and accumulation phases on a hexagonal array of processing elements, according to an example embodiment.

FIG. 13 shows an alternative embodiment comprising an array of processing elements arranged on the sites of a regular hexagonal lattice 17, which has the same initially generated products as the embodiment related to FIG. 11, but for which the first and second spatial directions 'a', 'b' of the array, serving as orientation indicators for the distribution of generated and stored products over the array, are corresponding to two different oblique directions enclosing a 120 degree angle. In this particular embodiment, the first unidirectional dataflows 6 are oriented along the second spatial direction 'b' (e.g. an oblique direction) and the second unidirectional dataflows 7 are oriented along the third spatial direction 'c' of the array, e.g. a horizontal direction. Third unidirectional dataflows 8 are oriented along the first spatial direction 'a' of the array and 7 are fourth unidirectional dataflows 9 are oriented along the third spatial direction 'c' of the array. As compared to the embodiment related to FIG. 11, the final data entries in the output map, for the embodiment shown in FIG. 13, will be obtained at processing elements of the array whose location on the hexagonal grid is more predictable in view of the many supported input map and convolution kernel dimensions.

Figure 23:
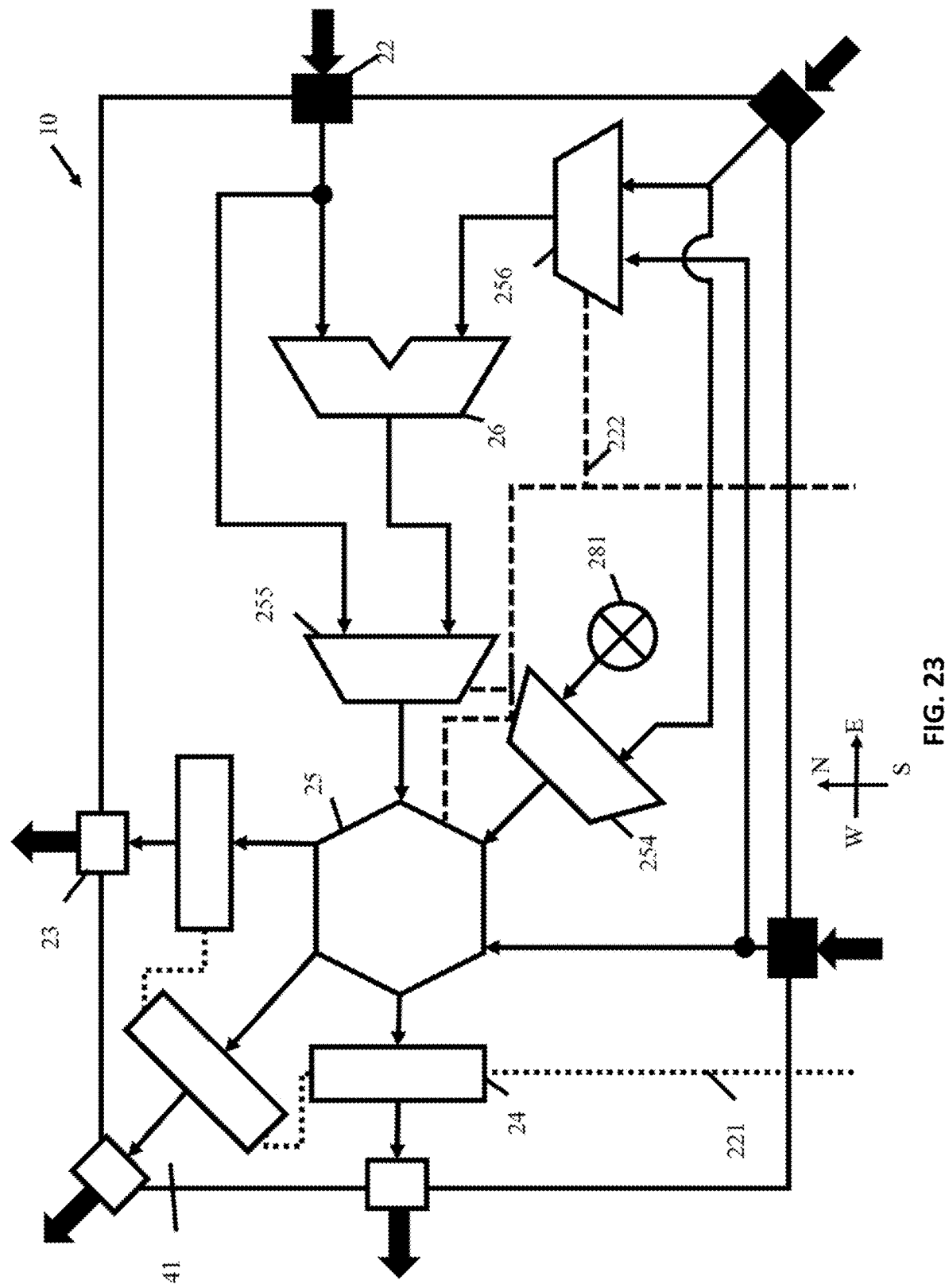
FIG. 23, FIG. 24 and FIG. 25 show alternative embodiments of a first logic level, according to an example embodiment.

FIG. 23 shows an alternative embodiment of a first logical level of a processing element 10 of the array, comprising a functional block 41, e.g. a digital circuit, similar to the functional block 21 in FIG. 21. In the present example, however, at least three inputs 22 are arranged at different edges of the functional block 41, e.g. at an 'east' edge, at a 'south' edge and at a 'south-east' edge. Outputs 23 are arranged at a 'west' edge, at a 'north' edge and at a 'north-west' edge. In consequence, processing elements 10 including a functional block 41 are supporting unidirectional dataflows passing through the processing elements along a horizontal direction 'E-W', along a vertical direction 'S-N' or along an oblique direction 'SE-NW'. Output selection means comprise a first data selector 254 for selecting partial results of the accumulation stage from either a generated product 281 or a received dataflow value at the 'south-east' input 22. Output selection means also comprise a second data selector 255 for selecting partial results of the accumulation stage from either a further completed/accumulated partial result output by the addition unit 26 or a received dataflow value at the 'east' input 22. A combined value of two of the received dataflow values at the inputs 22 is only routed by one data selector 255 before reaching a segmented bus node 25, also included in the output selection means. A third data selector 256 select which one of the received dataflow values at the 'south' input 22 or the 'south-east' input 22 is combined with a received dataflow value at the 'east' input 22.

Figure 24:
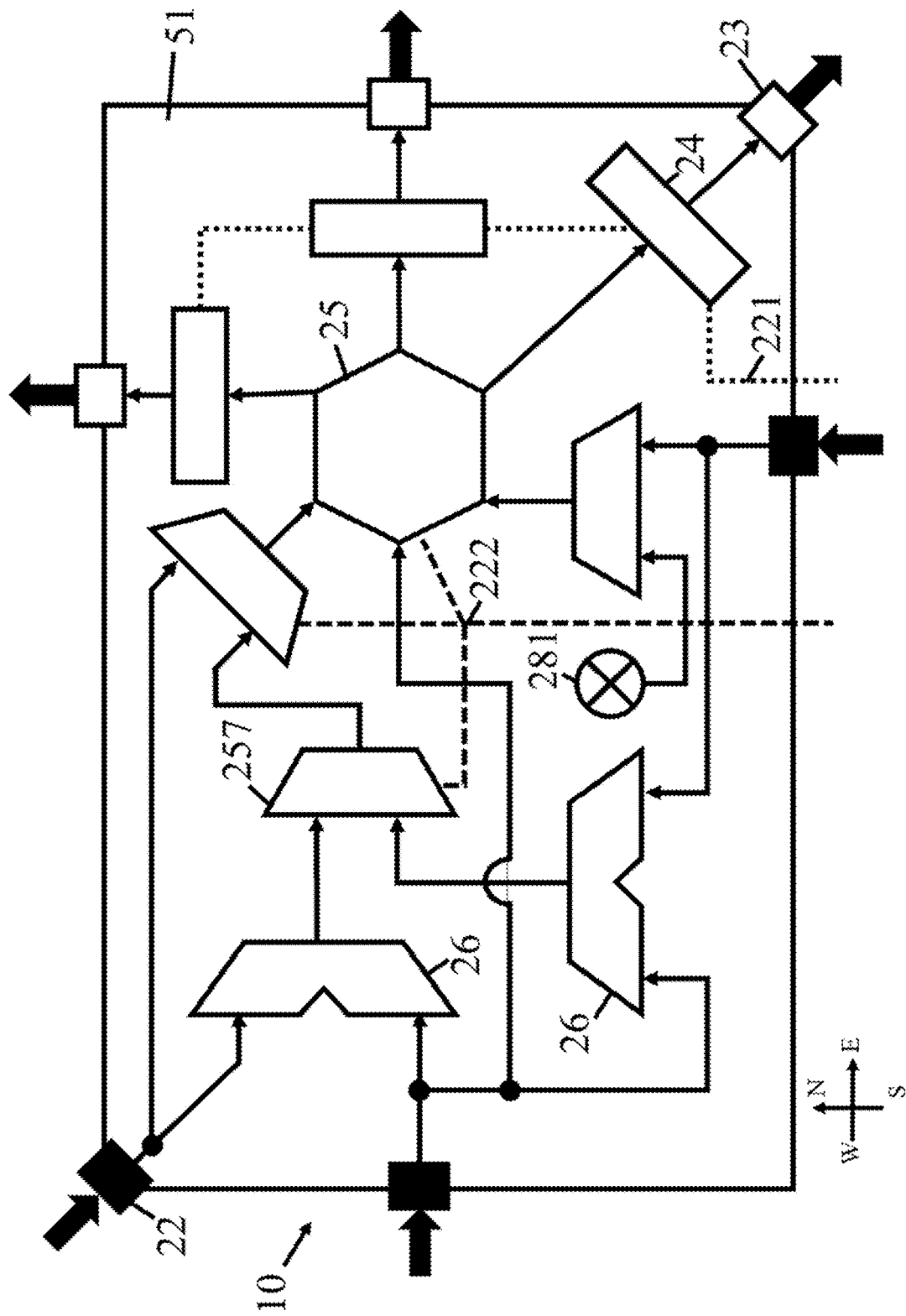

FIG. 24 shows an alternative embodiment of a first logical level of a processing element 10 of the array, comprising a functional block 51, e.g. a digital circuit. In this particular embodiment, an addition unit 26 consists of two adders. One adder provides the combined result of a dataflow value received at a 'west' input 22 and a dataflow value received at a 'north-west' input 22, the other adder provides the combined result of a dataflow value received at a 'west' input 22 and a dataflow value received at a 'south' input 22. Output selection means also comprise a data selector 257 for selecting one of the two combined results to be routed, via another data selector and a segmented bus node, to one or more of the output registers 24. In consequence, inputs to the two adders of the addition unit 26 are selectable and do not require reconfiguration.

Figure 25:
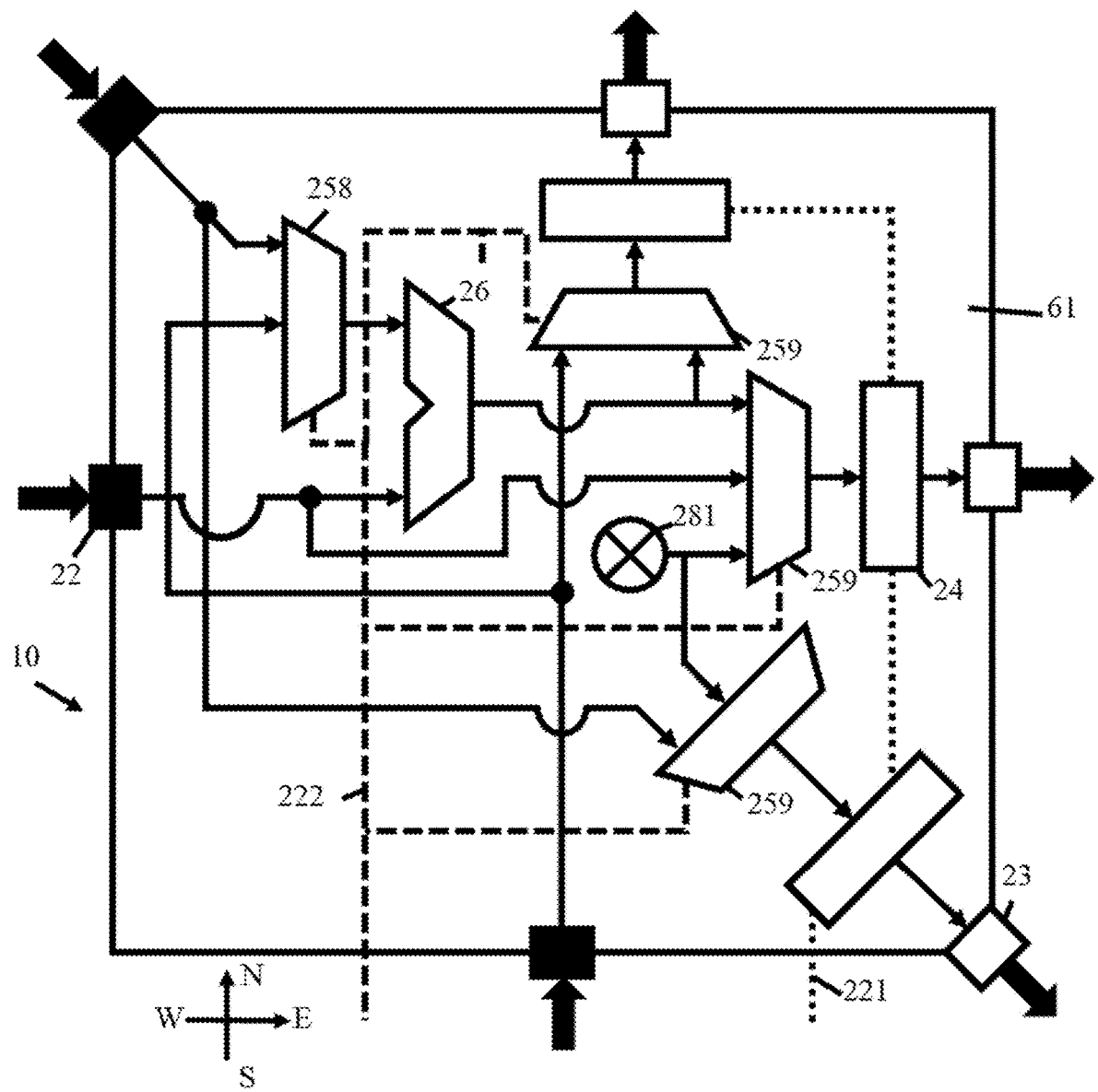

FIG. 25 shows an alternative embodiment of a first logical level of a processing element 10 of the array, comprising a functional block 61, e.g. a digital circuit. In this particular embodiment, a segmented bus node is absent, but output selection means comprise an aggregate data selector 259 instead. The aggregate data selector 259 may consist of three (or more) multiplexers, as shown in FIG. 25. Owing to its characteristic functional behavior of selecting one or more of its applied input signals for storage in at least one of the output registers 24, the aggregate data selector 259 may also be provided as a reconfigurable (e.g. via control signals 222) switching matrix, e.g. a crossbar. In this particular embodiment, the aggregate data selector 259 may be configured (e.g. via suitable control signals 222 of the global control logic 4) to store either a generated product 281 or a dataflow value received at the 'north-west' input 22 in the 'south-east' output register 24. The aggregate data selector 259 may also be configured to store either a generated product 281, a dataflow value received at the 'west' input 22, or a combination of two received dataflow values, obtained at an output of the addition unit 26, in the 'east' output register 24. Eventually, the aggregate data selector 259 may be configured to store either a dataflow value received at the 'south' input 22 or a combination of two received dataflow values, obtained at an output of the addition unit 26, in the 'north' output register 24.

In yet another embodiment of a first logical level of a processing element of the array, similar to the one referred to in FIG. 25, more than three output registers are provided, e.g. five output registers for storing received values of three unidirectional dataflows, of a generated product and of a combination of received dataflow values as delivered by the addition unit. In this case, external reconfigurable output selection means associated with each processing element are provided and may comprise an aggregate data selector for each processing element of the array, e.g. a switching matrix, which is located in an interstitial region between processing elements of the array and adjacent to the processing element it is associated with. Alternatively, an external reconfigurable output selection means associated with each processing element may comprise a network-on-chip infrastructure provided on the array or on and around the array, e.g. provided in the interstitial regions between adjacent processing elements of the array. It is noted that such alternative embodiments of the disclosure are not characterized by direct point-to-point interconnects between neighboring processing elements, but are indirect, configurable interconnects.

Other variations to the disclosed embodiments can be understood and effected by those skilled in the art in practicing the claimed example embodiment, from a study of the drawings, the disclosure and the appended claims. In the claims, the word "comprising" does not exclude other elements or steps, and the indefinite article "a" or "an" does not exclude a plurality.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A method for mapping an input map of a convolutional neural network layer to an output map using a set of convolution kernels, comprising:
providing an array of locally interconnected processing elements, the processing elements being arranged on a regular two-dimensional grid, the grid defining at least three different spatial directions of the array along which unidirectional dataflows on the array are supported, each processing element being adapted to:
store, during at least one computation cycle, a value carried by each unidirectional dataflow traversing or originating at the processing element, and
combine values carried by unidirectional dataflows traversing the processing element in different spatial directions into a new value carried by at least one of the supported unidirectional dataflows;
providing, for each data entry in the output map to be computed, a plurality of products from pairs of weights of a selected convolution kernel and data entries in the input map addressed by the weights, a data entry position in the output map determining the selected convolution kernel and its position relative to the input map;
arranging, for each data entry in the output map, the plurality of products into a plurality of partial sums to be computed, each partial sum including at least the products associated with a first dimension of the selected convolution kernel, different partial sums being associated with at least a second dimension of the selected convolution kernel; and
computing the data entries in the output map by performing at least once the steps of:
determining at least one parallelogram set of processing elements, corresponding to at least one data entry in the output map, each parallelogram set comprising a first side pair, being parallel to a first spatial direction of the array, and a second side pair, being parallel to second spatial direction of the array, one side of the second side pair defining a parallelogram base,
storing each product of the plurality of products associated with at least one data entry in the output map in a processing element of the at least one corresponding parallelogram set, stored products associated with a same partial sum being distributed along a first spatial direction of the array, different partial sums being distributed along a second spatial direction of the array,
accumulating, in a first accumulation phase, products associated with a same partial sum on the array by performing the steps of:
starting first unidirectional dataflows by moving, once per computation cycle, the values stored in the processing elements associated with each parallelogram base to the next connected processing element along a pre-determined first flow direction;
starting second unidirectional dataflows by moving, once per computation cycle, the values stored in the remaining processing elements of each parallelogram set to the next connected processing element along a pre-determined second flow direction; and
combining, once per computation cycle, an incomplete partial sum, corresponding to a value of a first unidirectional dataflow passing through a processing element of the array, with a product, corresponding to a value of a second unidirectional dataflow also passing through the same processing element, into a new value for the first unidirectional dataflow if the product belongs to and further completes the partial sum,
wherein partial sums are completed if the first and second unidirectional dataflows have collapsed each parallelogram set to its base, and wherein the first and second flow direction are selected from a third spatial direction and one of the first or second spatial direction; and accumulating, in a second accumulation phase, partial sums on the array into at least one data entry in the output map by performing the steps of:
  starting third unidirectional dataflows by moving, once per computation cycle, the values stored in the processing elements associated with one of the parallelogram base vertices of each collapsed parallelogram to the next connected processing element along a pre-determined third flow direction;
  starting fourth unidirectional dataflows by moving, once per computation cycle, the values stored in the remaining processing elements of each collapsed parallelogram to the next connected processing element along a pre-determined fourth flow direction; and
  combining, once per computation cycle, an incomplete data entry in the output map, corresponding to a value of a third unidirectional dataflow passing through a processing element of the array, with a partial sum, corresponding to a value of a fourth unidirectional dataflow also passing through the same processing element, into a new value for the third unidirectional dataflow if the partial sum belongs to and further completes the data entry in the output map,
  wherein each data entry in the output map is completed if the third and fourth unidirectional dataflows have reduced each collapsed parallelogram to one of its vertices, and wherein the third and fourth flow direction are selected from the third spatial direction and the other one of the first or second spatial direction, not selected for the first and second flow direction.

2. The method according to claim 1, wherein a plurality of products of more than one data entry in the output map are stored in the processing elements of the corresponding parallelogram sets, each parallelogram set of processing elements being partially empty, further comprising the step of interleaving different parallelogram sets into at least one larger, non-empty parallelogram set for computing a pre-determined number of contiguous data entries in the output map associated with a same selected convolution kernel.

3. The method according to claim 2, wherein different parallelogram sets are interleaved into a plurality of larger, non-empty parallelogram sets, each of the larger, non-empty parallelogram sets being associated with a different selected convolution kernel.

4. The method according to claim 1, wherein providing a plurality of products comprises generating each product by the processing element storing the same product.

5. The method according to according to claim 4, each processing element further being adapted for storing a weight factor and an input data factor for generating a product, wherein generating each product comprises:
  applying a weight of a selected convolution kernel and/or a data entry in the input map associated with the product to a processing element at a boundary of the array;
  starting a unidirectional dataflow along a second spatial direction of the array by moving the applied weight and/or data entry in the input map to next connected processing elements along the second spatial direction; and
  storing the weight and/or the data entry in the input map carried by the unidirectional dataflow at the processing element generating the product.

6. The method according to claim 5, wherein generating products is performed concurrently with steps of the accumulation phases, using a computation pipeline for synchronization.

7. The method according to according to claim 1, wherein a regular two-dimensional grid is provided as a square lattice with a first spatial direction being vertical, a second spatial direction being diagonal and a third spatial direction being horizontal, or wherein a regular two-dimensional grid is provided as a square lattice with a first spatial direction being vertical, a second spatial direction being horizontal and a third spatial direction being diagonal, or wherein a regular two-dimensional grid is provided as a hexagonal lattice with a first and second spatial direction being two different oblique directions enclosing an angle of 120 degree and a third spatial direction being horizontal, or wherein a regular two-dimensional grid is provided as a hexagonal lattice with a first and second spatial direction being an oblique direction and a horizontal direction enclosing an angle of 120 degree and a third spatial direction being a different oblique direction.

8. The method according to according to claim 1, wherein a first dimension of the selected convolution kernel corresponds to kernel rows and a second dimension corresponds to kernel columns.

9. The method according to according to claim 1, wherein each partial sum also includes the products associated with a third dimension, being a depth, of the selected convolution kernel or wherein different partial sums are also associated with a third dimension, being depth, of the selected convolution kernel.

10. The method according to according to claim 1, wherein the processing elements are interconnected according to a two-dimensional torus topology to support circular unidirectional dataflows on the array.

11. A hardware system for performing mappings in convolutional neural network layers, comprising:
  a synchronized, two-dimensional array of locally interconnected processing elements regularly organized on a grid, the grid defining three different flow directions of unidirectional dataflows between connected neighboring processing elements on the array, each processing element comprising:
    a first logical level comprising:
      three inputs for receiving partial results of incoming unidirectional dataflows,
      an addition unit adapted for accumulating received partial results of two different unidirectional dataflows, thereby providing updated partial results,
      at least three synchronized output registers for temporarily storing partial results during a computation cycle, stored partial results of three output registers corresponding to values of outgoing unidirectional dataflows, and
      output selection means for selecting, for each output register, a partial result to be stored from one of a received partial result, an updated partial result or a generated partial result, and
    a second logical level comprising
      a storage element for selectively storing a received weight and selectively storing a data entry in the input map, the storage element being adapted to propagate a stored weight and/or a data entry in the input map to the storage element of a neighboring connected processing element, and
a multiplication unit for generating a partial result based on the stored weight and the stored data entry in the input map,
a global control logic for generating synchronization signals and control signals for each processing element;
global input means for receiving, at most once per neural network layer, data entries in the input map and weights of selected convolution kernels and for applying them to a subset of processing elements at a boundary of the array, the applied weights being stored in the storage element of the processing elements for reuse for as long as new data entries of the input map are applied, received data entries in the input map being reused for a plurality of data entries in the output depending thereon; and
global output means for reading out, from a subset of processing elements at a boundary of the array, fully accumulated results as data entries in the output map of a convolutional neural network layer.

12. The hardware system according to claim 11, wherein the array is characterized by a 2D-torus interconnection topology.

13. The hardware system according to claim 12, wherein the processing elements of the array are folded and interleaved along on or two spatial directions of the array.

14. The hardware system according to claim 11, wherein each processing element is characterized by a vertical 3D structure extending in a direction perpendicular to the array plane.

15. The hardware system according to claim 11, wherein the output selection means comprise a reconfigurable routing unit being a segmented bus node.

16. The hardware system according to claim 11, further comprising the array comprises a two-dimensional, planar array of locally interconnected processing elements, regularly organized on a grid.

17. The hardware system according to claim 11, wherein the planar array of locally interconnected processing elements are centered at corresponding sites of a square lattice.

18. The hardware system according to claim 11, wherein the global output means and the global input means comprise one or more vector registers.

19. The hardware system according to claim 11, wherein the global output means and the global input means are arranged at opposite boundaries of the array.

20. The hardware system according to claim 11, further comprising a control plane configured to support wave-pipelining for moving a weight and/or a data entry in the input map to the second logical level of an addressed processing element.

* * * * *